US006353406B1

(12) United States Patent
Lanzl et al.

(10) Patent No.: US 6,353,406 B1
(45) Date of Patent: Mar. 5, 2002

(54) DUAL MODE TRACKING SYSTEM

(75) Inventors: Colin Lanzl, Nashua, NH (US); Jay Werb, Newton, MA (US)

(73) Assignee: R.F. Technologies, Inc., Brookfield, WI (US)

( * ) Notice: Subject to any disclaimer, the term of this patent is extended or adjusted under 35 U.S.C. 154(b) by 0 days.

(21) Appl. No.: 09/339,740

(22) Filed: Jun. 24, 1999

Related U.S. Application Data

(63) Continuation-in-part of application No. 09/244,600, filed on Feb. 4, 1999, which is a continuation-in-part of application No. 08/953,755, filed on Oct. 17, 1997, now Pat. No. 6,150,921

(60) Provisional application No. 60/130,163, filed on Apr. 20, 1999, provisional application No. 60/102,843, filed on Oct. 2, 1998, provisional application No. 60/090,556, filed on Jun. 24, 1998, provisional application No. 60/044,321, filed on Apr. 24, 1997, provisional application No. 60/044,245, filed on Apr. 24, 1997, and provisional application No. 60/028,658, filed on Oct. 17, 1996.

(51) Int. Cl.[7] .............................. G01S 13/75; H04Q 5/22
(52) U.S. Cl. ..................... 342/118; 342/42; 342/44; 340/10.1; 340/825.49; 340/573.1
(58) Field of Search ........................ 342/42, 44, 118, 342/125, 126, 127, 133, 139, 140, 146; 340/10.1, 5.8, 573.1, 825.49, 573.4

(56) References Cited

U.S. PATENT DOCUMENTS 5,119,104 A   6/1992   Heller .......................... 342/450
5,420,883 A   5/1995   Swensen et al. ............. 375/200
5,774,876 A   6/1998   Woolley et al. ................ 705/28

FOREIGN PATENT DOCUMENTS

| EP | 0 779 520 A2 | 6/1997 | ........... G01S/13/82 |
| EP | 0 851 230 A1 | 7/1998 | ........... G01S/13/87 |
| WO | WO 89/05549 A | 6/1989 | |
| WO | WO 96/18913 A | 6/1996 | |
| WO | WO 97/49972 | 12/1997 | |

OTHER PUBLICATIONS

Internet reference address http://www.tagmaster.se/products/index.htm, TagMaster Mark Tag™ S1255.

*Primary Examiner*—John B. Sotomayor

(57) ABSTRACT

System for tracking mobile tags. Cell controllers with multiple antenna modules generate a carrier signal which is received by the tags. Tags shift the frequency of the carrier signal, modulate an identification code onto it, and transmit the resulting tag signal at randomized intervals. The antennas receive and process the response, and determine the presence of the tags by proximity and triangulation. The recursive-least squares (RLS) technique is used in filtering received signals. Distance of a tag from an antenna is calculated by measuring the round trip signal time. The cell controllers send data from the antenna to a host computer. The host computer collects the data and resolves them into positional estimates. Data are archived in a data warehouse, such as an SQL Server. Also disclosed is an article tracking system that supports both active and passive tags with a cell controller able to read both passive and active tag signals.

27 Claims, 26 Drawing Sheets

TAG RF BLOCK DIAGRAM

TAG RF BLOCK DIAGRAM

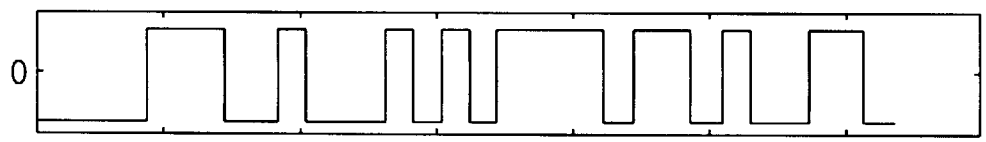
500 ➔  FIG. 5A
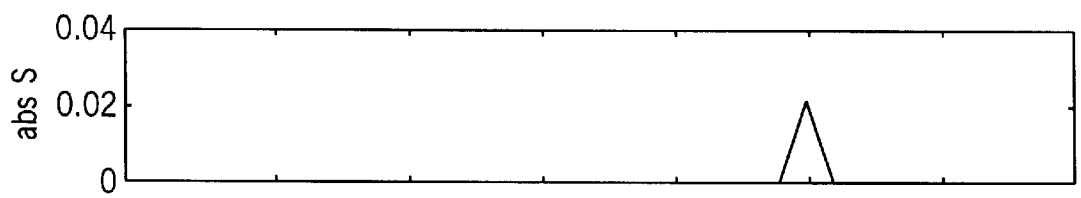
510 ➔  FIG. 5B
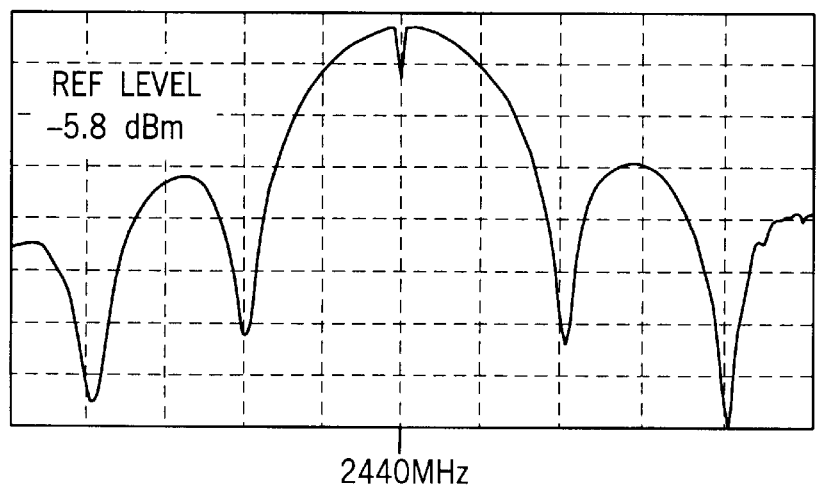
520 ➔  FIG. 5C

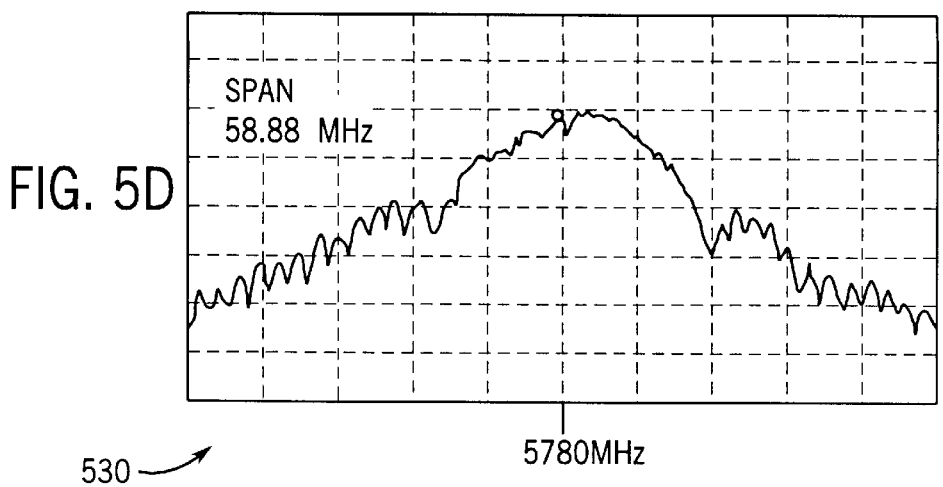
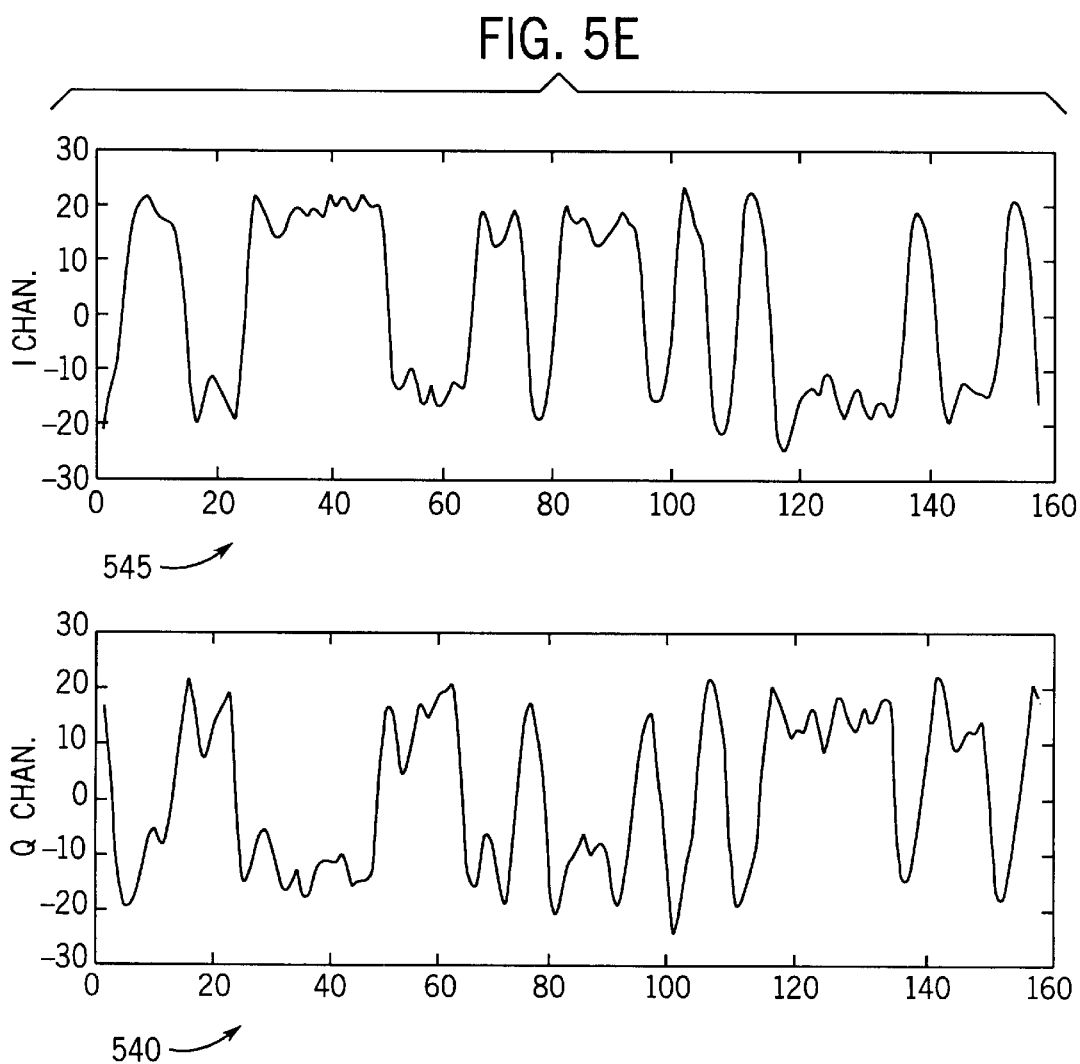

CELL CONTROLLER ACTIVE ANTENNA PHYSICAL LAYER ARCHITECTURE

MODULATOR RF BLOCK DIAGRAM

CABLE EXTENDER MODULE

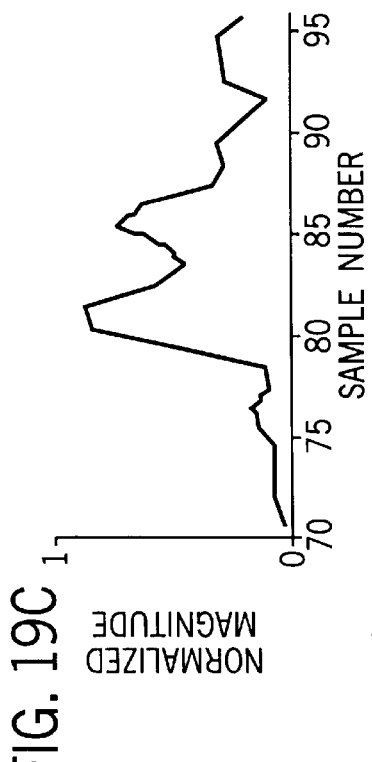
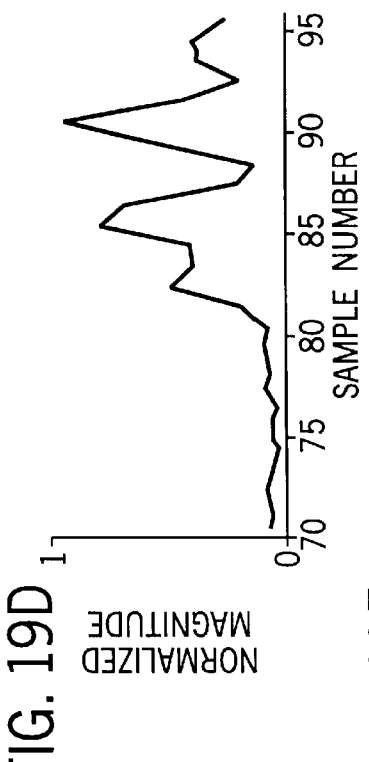
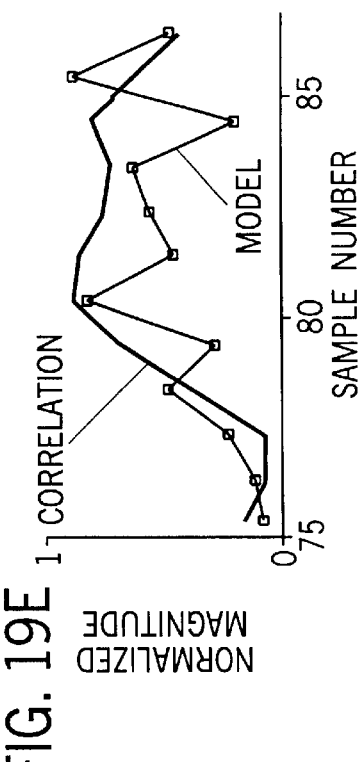
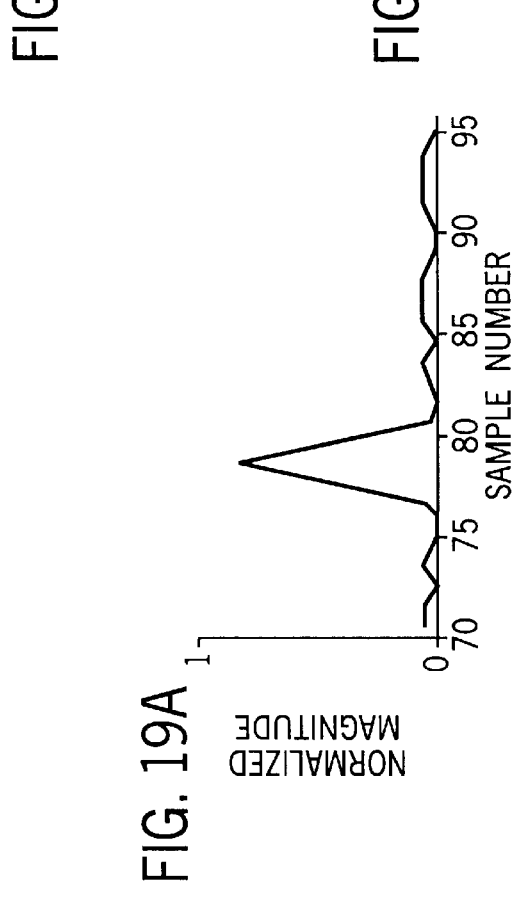
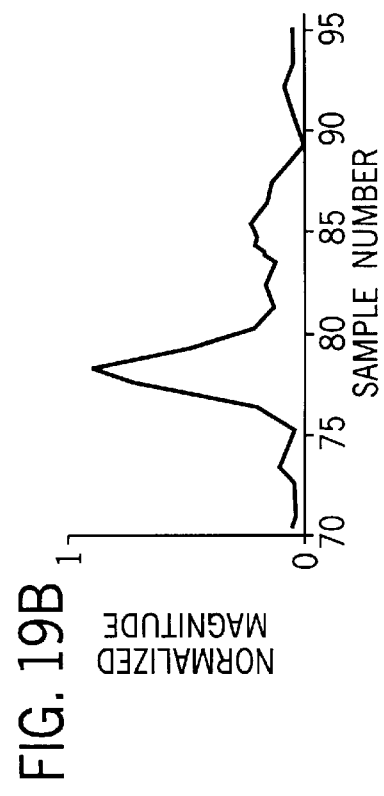

CELL CONTROLLER BLOCK DIAGRAM

FIG. 22 CELL CONTROLLER ACTIVE ANTENNA RF BLOCK DIAGRAM

Tag RF Specifications

| Parameter | Min. Value | Nom. Value | Max. Value | Units | Comments |
|---|---|---|---|---|---|
| Rx Signal Center Frequency | | 2442 | | MHz | |
| Rx Input Signal Level | -45 | | -5 | dBm | |
| Rx Signal Bandwidth | | 80 | | MHz | @ -3dB points |
| Rx Noise Figure | | | 6 | dB | |
| Tx Signal Center Frequency | | 5800 | | MHz | |
| Tx Signal Bandwidth | | 80 | | MHz | @ -3dB points |
| Linear RF Gain | 30 | 35 | | dB | @ input of -45dBm with no AGC |
| Tx Output Signal Level | -10 | | -5 | dBm | With normal AGC operation |
| Crystal Frequency | | 6.5000 | | MHz | nominal |
| LO turn-on time | | | 3.5 | msec | 2msec xtal, 0.75msec PLL |
| Modulator Phase Accuracy | | | ±3 | ° | |
| Modulator Amplitude Accuracy | | | ±0.5 | dB | |
| Current Consumption During Transmit | | | 55 | mA | Including 2mA for microcontroller |
| Current Consumption During Sleep | | | 40 | μA | RF shut down; microcontroller sleep |
| Tag Linearity | | | -50 | dBm | EIRP, radiated at tag output, ±75MHz from nominal center frequency, consistent with FCC Part 15.249, for any input level |

FIG. 24

DUAL MODE TRACKING SYSTEM

REFERENCES TO RELATED APPLICATIONS

This application claims priority from U.S. provisional patent application No. 60/090,556, filed Jun. 24, 1998, U.S. provisional patent application No. 60/130,163, filed Apr. 20, 1999, and is a continuation in part of U.S. application Ser. No. 09/244,600 filed on Feb. 4, 1999 (pending) which claims priority from U.S. provisional patent application No. 60/102,843, filed Oct. 2, 1998, and is a continuation in part of U.S. application Ser. No. 08/953,755, filed Oct. 17, 1997 (pending), now U.S. Pat. No. 6,150,921, which claims priority to U.S. provisional patent application No. 60/028,658, filed Oct. 17, 1996, U.S. provisional patent application No. 60/044,321, filed Apr. 24, 1997, and U.S. provisional patent application No. 60/044,245, filed Apr. 24, 1997.

BACKGROUND OF THE INVENTION

1. Field of the Invention

The invention relates to RFID (Radio Frequency Identification) systems and, more particularly, to an RFID system designed to continuously track articles and personnel.

2. Background of the Invention

RFID systems are broadly divided into two categories: active and passive. Passive RFID systems operate without a battery, and may draw their power from a field emitted by interrogation devices or "readers." Power is available only if the reader is close to the tags, for example, less than 2 meters. Therefore, passive systems can only be read at a limited number of fixed locations. Generally, passive readers include a powering element and a reading element in the same integrated unit.

Active RFID tags incorporate a battery, and therefore are capable of operating at much longer distances. In some premium products the "tags" are full super-heterodyne radios. More typically, active tags operate at ranges up to about 5 meters. Other RFID technologies are designed to work at longer ranges, such as 30–100 meters. The intent is generally to enable the tag to be seen anywhere in an indoor facility, and an infrastructure is installed to provide total indoor coverage.

Thus, there is required a technique and system for combining active and passive tags into a single architecture, allowing very inexpensive passive tags to be used where high volume or unlimited life is required, and more expensive active tags to be used for lower volume applications where continuous tracking is required. By leveraging the long-range infrastructure, the passive subsystem can enjoy various cost, coverage, and performance improvements over a stand-alone passive RFID system.

SUMMARY OF THE INVENTION

In accordance with one aspect of the invention is a system and method for locating an object. A cell controller transmits a first signal at a first frequency. A first tag associated with the object receives the first signal and transponds the first signal at selected times at a second frequency as a second signal. The first tag is one of a passive tag or an active tag in which the passive tag has power from an external power source to transpond the second signal. The active tag has power from an internal power source to transpond said second signal. The cell controller includes a receiver for receiving said second signal.

Thus, there is provided a technique and system for combining active and passive tags into a single architecture, allowing very inexpensive passive tags to be used where high volume or unlimited life is required, and more expensive active tags to be used for lower volume applications where continuous tracking is required.

BRIEF DESCRIPTION OF THE DRAWINGS

The above-mentioned and other features of the invention will now become apparent by reference to the following description taken in connection with the accompanying drawings, in which:

FIGS. 5A–5G are diagrams of a signal as it passes through various stages of the system;

FIGS. 19A–19E are diagrams of sample waveforms in embodiments of the system of FIG. 1.

FIG. 24 is an example of an embodiment of tag specifications;

DETAILED DESCRIPTION OF PREFERRED EMBODIMENT(S)

The local positioning system described in paragraphs that follow is an article tracking system that may be used, for example, to track and locate objects indoors. This system may be characterized as a radio-frequency identification system. Generally, such a system may also be used in a variety of other local positioning applications, such as outdoor tracking of objects or locating personnel indoors as well as outdoors. Limitations specific to the embodiments described herein are not meant to imply limitations to the claimed invention.

Figure 1:
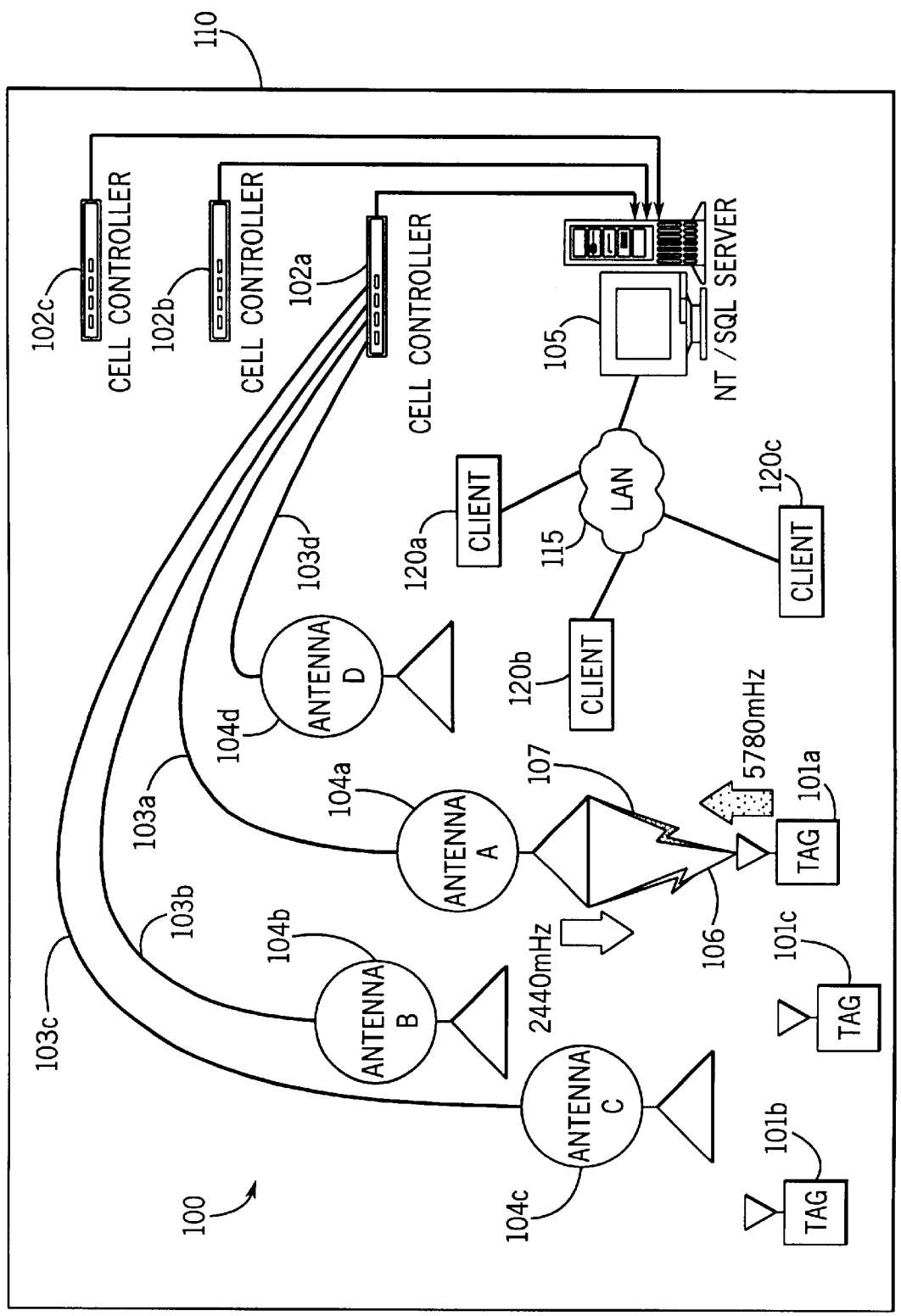
FIG. 1 shows an overview of a system configured according to the invention.

Referring to FIG. 1, an article tracking system 100 contains the following general components:

Tags: Inexpensive miniature radio frequency transponding tags 101a–c are attached to people and/or items being tracked. Tags 101a–c "wake up" periodically, and "chirp" (transmit) a radio-coded unique identity code (UID). The tags 101a–c are designed so that their range is 15–30 meters in a typical indoor environment, the range mostly being limited by a need to conserve the life of the tag battery, and the requirement that the tag 101a and tag battery be small and thin.

Cell Controllers: Cell controllers 102a–c detect the chirps of tags 101a–c and calculate the distances of those tags 101a–c to active antenna modules 104a–d connected to the cell controllers 102a–c. Each antenna module preferably has a transmit antenna and a receive antenna. In FIG. 1, the antenna modules connected to cell controllers 102b and 102c are omitted for simplicity. A cell controller 102a is typically contained in a case and is mounted behind a hung ceiling. The cell controller 102a can receive power from a conventional wall outlet or the equivalent. The cell controller 102a is attached through coaxial cables 103a–d to the antenna modules 104a–d, respectively, which provide coverage of an area of the indoor facility 110. A tag signal 107, transmitted by a tag 101a, is received by one or more antenna modules 104a–d, and is processed by chips in the cell controller 102a, such as digital signal processing (DSP) chips as may be included in the signal processing hardware. The information resulting from this processing is used to identify both the identity of the transmitting tag 101a and the distance between the tag 101a and each, for example, of the receiving antenna modules 104a–d.

Host Computer: Cell controllers 102a–c are in data communication with a host computer 105, which collects data and information available from the cell controllers 102a–c and archives the data into an open format database, such as an SQL Server.

User Application: In a preferred option, client workstations 120a–c communicate with the host computer 105 over a network, such as a LAN 115. A client application running on each of the client workstations 120a–c can access the SQL Server and presents the data in a way that is useful to an end-user.

The tag 101a does not generate its own radio signal. Rather, an antenna module, for example antenna module 104a, continuously transmits a direct sequence spread spectrum interrogator signal 106 at a first frequency, for example 2440-megahertz. The tag 101a receives this signal 106, modulates its UID code onto the signal 106, and immediately transmits back a frequency-shifted signal 107 at, for example, 5780-megahertz to, for example, antenna 104a. The distance from the antenna module 104a to the tag 101a can then be determined by the cell controller 102a from the round trip time of transmission, accounting for fixed and known delays in the wiring and electronics. The cell controller 102a can quickly switch among antenna modules 104a–d to obtain the distance from the tag 101a to each of antenna modules 104a–d (which receive the return signal 107), and from that information determines the tag's location by triangulation techniques.

Figure 2:
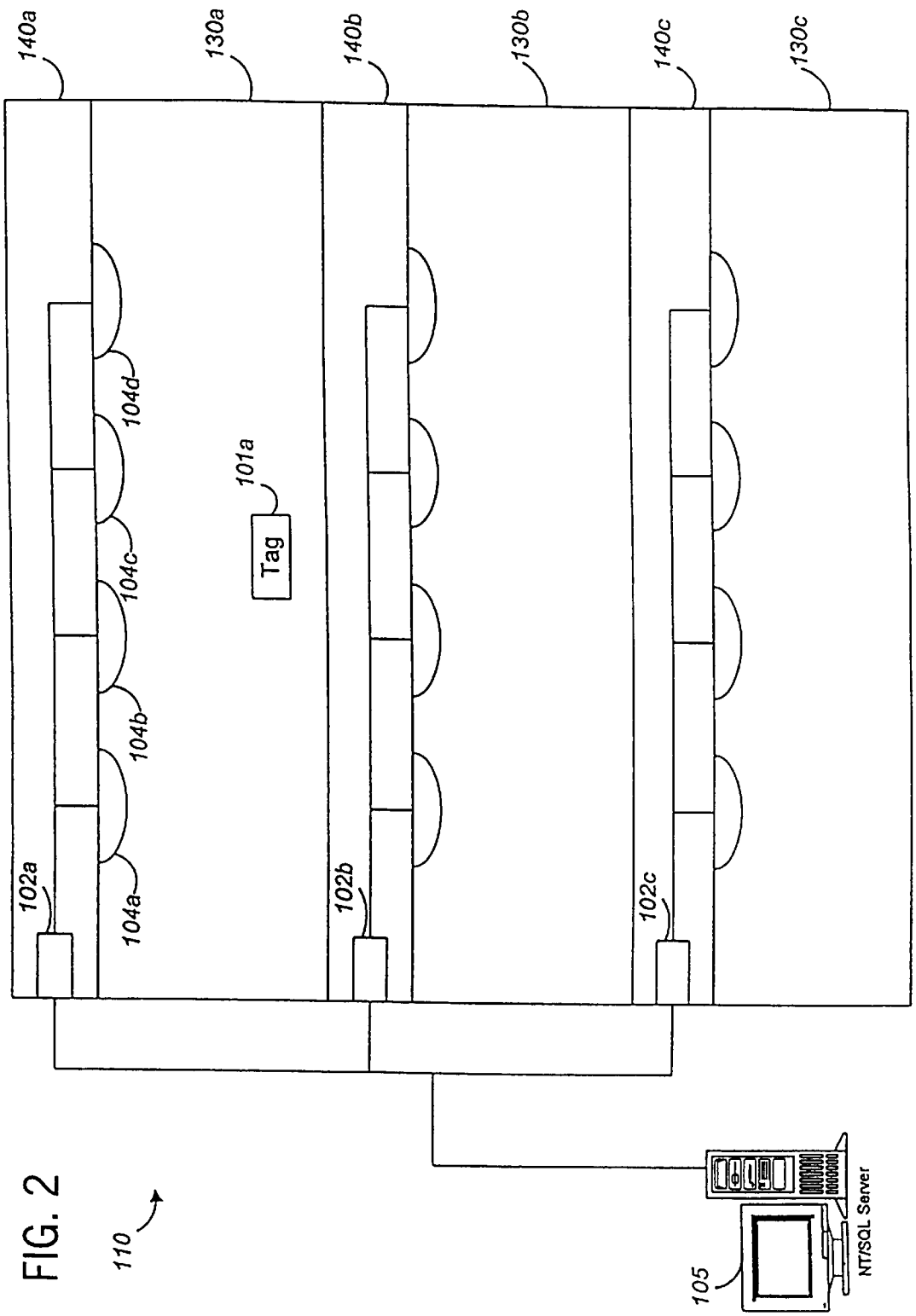
FIG. 2 shows several cell controllers deployed in a multi-story building.

The system 100 is designed to be scaleable, allowing addition of cell controllers to existing cell controllers 102a–c and antenna modules to existing antennas modules 104a–d to improve the precision with which tag location is determined. FIG. 2 shows how a collection of cell controllers 102a–c can be deployed in the large multistory building 110. As shown in FIG. 2, multiple cell controllers 102a–c feed data to a single host computer 105, typically through a TCP/IP communications network. A variety of data protocols and transfer mechanisms can be used in preferred embodiments. For example, if a local area network is not available, connection to the host can be accomplished via RS485, RS232, RS422, power line modem, or a dedicated phone line. Alternatively, specialized modems designed for use on such cables can be employed.

Each of the cell controllers 102a–c can be installed to cover a separate floor 130a–c, respectively, with the exact configuration being modifiable by a system administrator. On floor 130a, cell controller 102a, with its collection of antenna modules 104a–d, is installed in the ceiling 140a. The same configuration of equipment is used on the remaining floors 130b–c. Antenna modules 104a–d are designed to provide good gain downwardly and horizontally, and poor gain upwardly, so that a vertical location (that is, the floor) of a tag 101a can be determined by noting which antenna modules 104a–d receive the strongest signals from the tag 101a. Structurally, a ground plane is placed behind each antenna to reflect signals downward. The horizontal location of a tag 101a is then roughly determined by noting which antenna modules 104a–d receive a strong signal from the tag 101a. The horizontal location of the tag 101a with respect to an antenna module 104a can be determined more precisely by estimating the distance from the tag 101a to each antenna module 104a–d, based on the combined time of flight of the interrogation signal 106 and the tag signal 107. Each "cell," consisting of a cell controller 102a and its antenna modules 104a–d, covers several thousand square feet of floor space. Each cell operates independently, enabling more cells to be added without affecting the performance of existing cells.

If a user desires to locate tags by "zone," one antenna per zone can be installed. Users wishing to track one or more tags 101a–c moving down hallways, can install antenna modules 104a–d every 20 or so meters along a hallway 130a–c, and calculate the linear location of a tag 101a by measuring the distance from the tag 101a to those antenna modules 104a–d. Customers wishing to triangulate upon the location of a tag 101a must install enough antenna modules such that the tag 101a will be in range of at least three of the antenna modules. A typical installation will cover a complete facility 110 with a combination of "zone" and "hallway" coverage at a relatively low cost per square foot, and, over time, upgrade certain areas with enough antenna modules to triangulate upon a tag's position.

Other preferred embodiments may include a wall mounted antenna radiating generally horizontally, rather than vertically. The selection of antenna type may be based on a variety of functional factors familiar to one of ordinary skill in the art.

Tag RF Design

Figure 3:
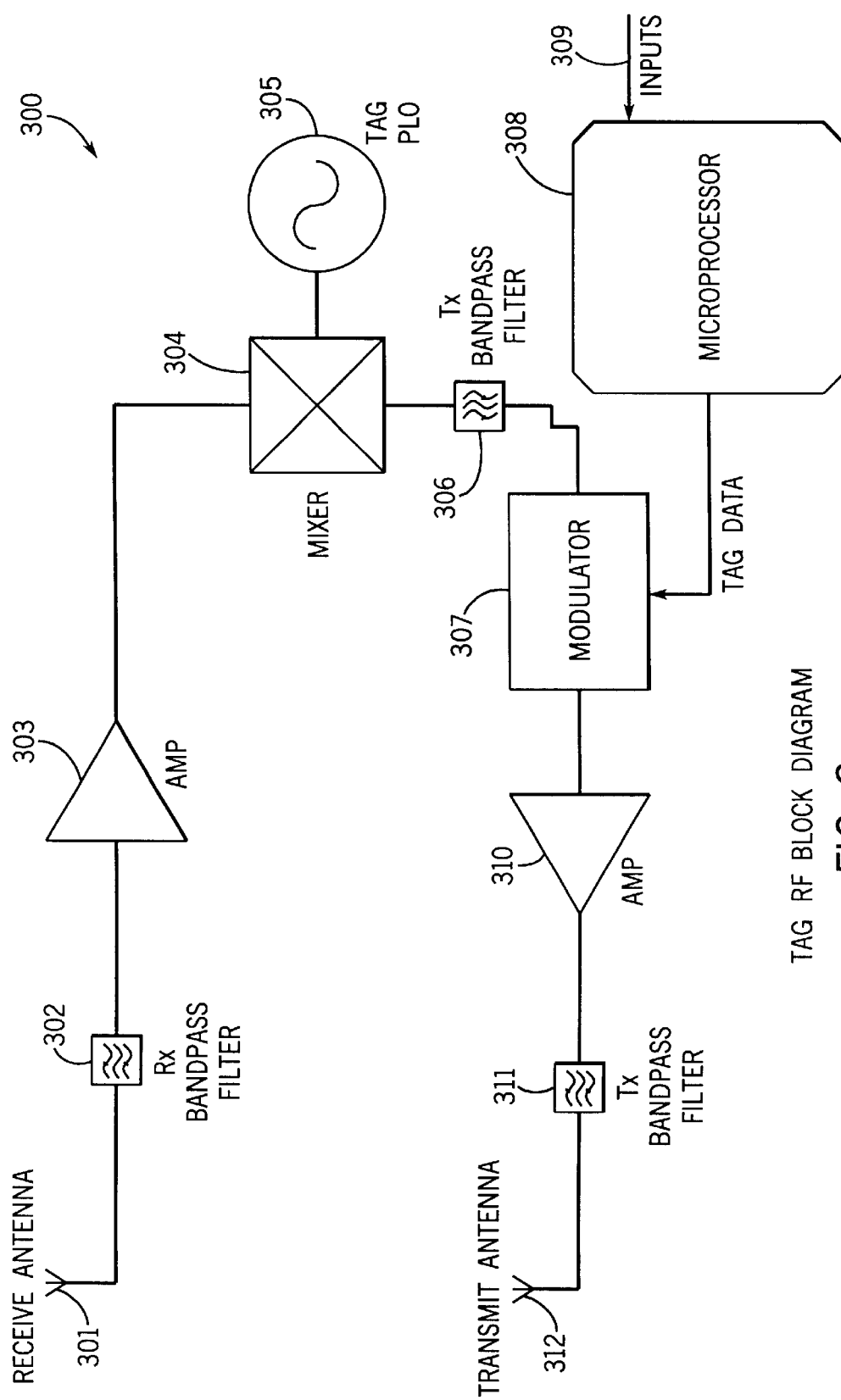
FIG. 3 is a block diagram of a tag RF design according to the invention.

Referring to FIG. 3, a tag RF circuitry 300 receives signal 106 at a tag receive antenna 301 and transmits tag signal 107 at a tag transmit antenna 312. The function of the tag RF circuitry 300 is to transpond the incoming spread spectrum signal 106 by frequency translation. The secondary function of the tag RF circuitry 300 is to modulate tag data onto the emitted tag signal 107, under the control of a microprocessor 308. The information emitted on the tag signal 107 includes, in a preferred embodiment of the invention, the serial number of the tag, datagram headers, and tag data 309 such as that derived from a motion indicator or a low power indicator.

The incoming signal 106 is preferably a direct sequence spread spectrum signal, biphase or quadrature modulated from the cell controller 102*a*, in the 2440 megahertz band. The signal 106 is received by the tag receive antenna 301, which collects the signal 106 and feeds it into the tag RF circuitry 300.

After the signal 106 is received by the tag receive antenna 301, an Rx (receive) bandpass filter 302 ensures that the tag is receiving signals only in the 2440 megahertz ISM band, rejecting radar signals, electronic newsgathering signals, and the like. In one embodiment, the filter 302 is implemented as an etched coupled stripline filter embedded in the circuit board. The signal 106 is then amplified by an amplifier 303 to ensure that the received signal can be mixed, in a frequency mixer 304, without degrading the signal to noise ratio (SNR).

The frequency mixer 304 translates or shifts the carrier frequency from 2440 megahertz to 5780 megahertz. The incoming signal, with a center frequency of 2440 megahertz, is mixed with the output of a phase locked oscillator (PLO) 305 with a center frequency of 3340 megahertz. This results in a sum frequency of 5780, along with a difference frequency and a variety of harmonics and subharmonics which are removed with a bandpass filter 306. In one embodiment, the PLO 305 consists of a phase locked loop (PLL) chip with three inputs: (1) a sampled output from a voltage controlled oscillator (VCO); (2) a reference tone from a 10 megahertz oscillator; and (3) a frequency programming interface to a microprocessor 308. This generates a pure tone with good phase noise at the 3340-megahertz tag LO frequency. In an alternative embodiment, the PLO 305 outputs a 1670-megahertz tone, which is then doubled to give the desired 3340-megahertz result.

Figure 8:
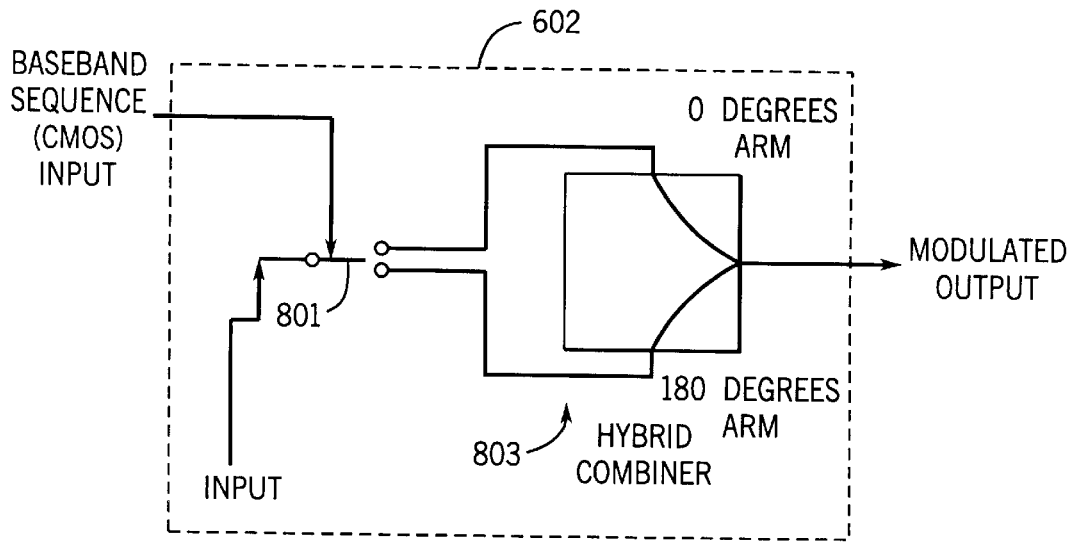
FIG. 8 is a block diagram of a modulator RF design.

The next element of the tag RF circuitry 300 is a biphase modulator 307 which, under control of the microprocessor 308, can either pass the 5780-megahertz signal unaltered, or change the phase of the signal by 180 degrees. The modulator 307 is implemented as a single pole double throw RF switch 801 that feeds a 180 degree hybrid, as shown in FIG. 8. Several forms of modulation can be used, including on-off keyed (OOK) modulation, binary phase-shift keyed (BPSK) modulation, multiple phase-shift keyed (MPK) modulation, and quadrature amplified (QAM) modulation. BPSK is the preferred form of modulation. The output from the modulator 307 is fed into an amplifier 310, then is filtered by a transmitter bandpass filter 311, and the output of filter 311 is emitted from a transmit antenna 312 as the tag signal 107. Since the amplifier 310 operates at high frequency, it consumes significant power, and alternative embodiments (such as that shown in FIG. 4) that make this amplifier 310 unnecessary are preferred. The Tx Filter 311, implemented as a 5-pole filter, is necessary to ensure tag compliance with FCC Part 15 requirements.

Figure 4:
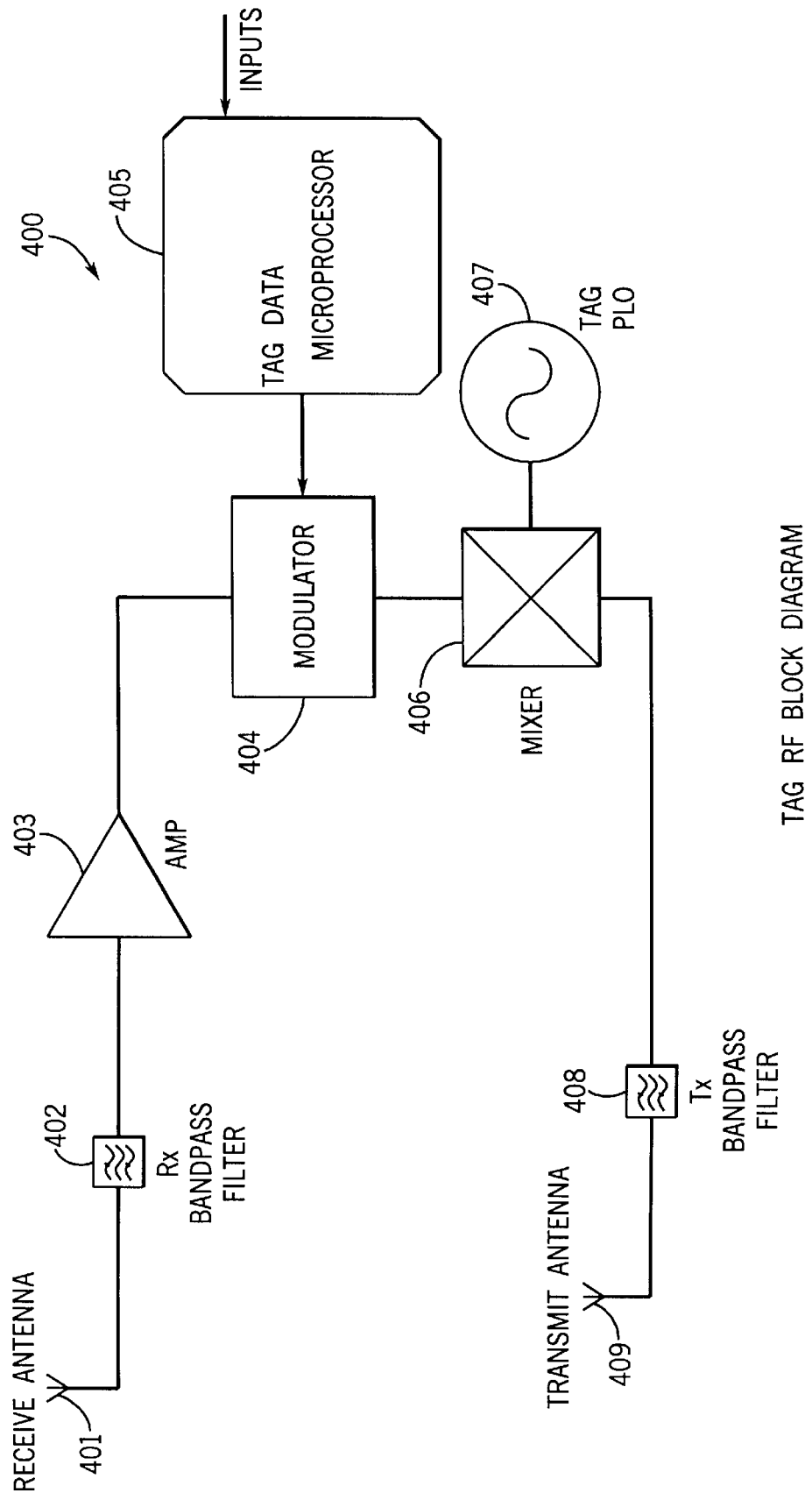
FIG. 4 is a block diagram of an alternative embodiment of a tag.

The tag RF circuitry 300 shown in FIG. 3 is intended to illustrate the general functions of a tag 101*a–c*, with an embodiment that is workable and self-explanatory. Those skilled in the art will be able to combine multiple functions into single elements in order to conserve power and take full advantage of available parts, or implement the same functions with a custom ASIC. FIG. 4 shows an alternative embodiment 400 which fulfills the same basic functions as that shown in FIG. 3, but with fewer components and using less power. The essential difference between the circuitry 400 shown in FIG. 4 and the circuitry 300 shown in FIG. 3 is that the modulator 404 in FIG. 4 is placed before the frequency mixer 406 in order to reduce the number of components (for example, the amplifier 310 is eliminated) and to conserve power.

In the place of the frequency mixer 304 (FIG. 3) or the time delay element 1505 (FIG. 13), other signal transmission discriminators may be used to transpond by other methods. For example, a tag, such as the tag 101*a*, can transpond using backscatter, frequency translation by mixing, frequency translation by taking a harmonic, frequency translation by taking a subharmonics, or by signal delay (such as via a SAW device).

Not shown in FIG. 4, but desirable for the tag RF circuitry, is the use of a common crystal reference for both the PLO 407 and clock timing in the microprocessor 405. Accurate timing is an important, if not critical, feature of the system, enabling the cell controllers 102*a–c* to predict when a tag 101*a* will transmit a tag signal 107. Using the same crystal reference in the PLO 407 and in the microprocessor 405 clock timing allows the cell controller 102*a* to accurately calibrate the source by measuring phase shifts in the received signal (as described hereinafter), and to synchronize its clock timing accordingly.

Not shown in FIG. 4, but desirable for some applications, is an embodiment where the transmit antenna 409 and receive antenna 401 are combined into a single element, and which uses a diplexer with the single antenna structure.

The manner in which the tags 101*a–c* are powered depends on the application. (Note that FIGS. 3 and 4 omit the tag power source.) Typically, a tag 101*a* will be battery powered, with the RF stage turned on and off under control of the microprocessor 405. In a preferred embodiment, the microprocessor 405 goes into a low power state, where it merely waits until it is time to power up the tag 101*a* again. In an alternative embodiment, all tag circuitry 400 cycles on and off under analog control, using an RC time constant in the circuit 400 as the timing source.

Using the tag RF circuitry 300 or 400 of FIG. 3 or 4, if a tag 101*a* is in range of two of the cell controllers 102*a–c*, and those cell controllers are sending pseudonoise with low cross correlation characteristics, the tag 101*a* will correctly transpond both signals simultaneously.

Tags 101*a–c* require a period of time, on the order of a millisecond, to charge up and charge down. During these brief periods, typically, the tags 101*a–c* will not be stable enough to use, but will nonetheless emit RF into the radio channel through the transmit antenna 409. For high-performance applications, where radio bandwidth is limited, a microprocessor-controlled switch can be added to the tag's transmit chain to eliminate such spurious emissions.

The tag RF circuitry 300, 400 shown in FIGS. 3 and 4 can be used in conjunction with different pairs of frequencies. The general approach described above works for any two allowable FCC spread spectrum bands. For example, the following combinations are permissible for license-free radio under FCC regulation Part 15.247:

915 megahertz translated to 2440 megahertz.
915 megahertz translated to 5780 megahertz.
2440 megahertz translated to 915 megahertz.
5780 megahertz translated to 915 megahertz.

5780 megahertz translated to 2440 megahertz.

Spread spectrum operation, however, is not required; two licensed narrow bands can be used. However, spread spectrum operation in the 2440 and 5780 megahertz bands is assumed for the remainder of the discussion.

Tag With Time Delay

Figure 13:
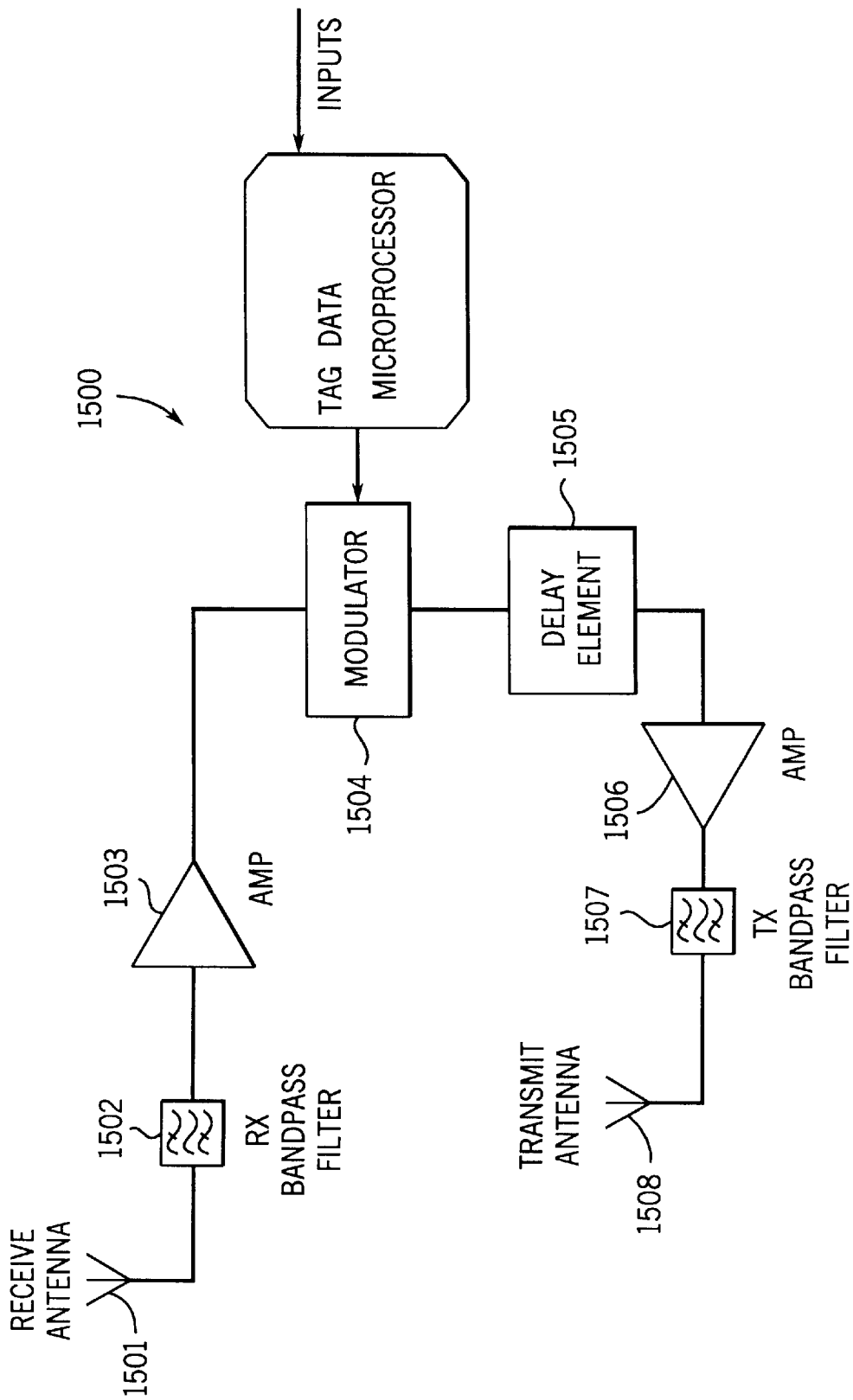
FIG. 13 shows a tag incorporating a delay element.

The tag RF circuitry 300, 400 shown in FIGS. 3 and 4 use frequency division multiple access, i.e., the tag circuitry 300, 400 receives and emits signals on different frequencies. An alternative embodiment 1500 uses time division multiple access, as shown in FIG. 13. For illustrative purposes, assume that the tag circuitry 1500 shown in FIG. 13 takes as an input at a receive antenna 1501 a signal at one frequency, such as 915 mHz, and emits the same signal through a transmit antenna 1508 at the same frequency after a delay of a microsecond. Assume that a cell controller, such as cell controller 102a, transmits an interrogation signal 106 in bursts every 2 microseconds. A tag, such as tag 101a, takes this signal as an input through the receive antenna 1501. The signal then passes through elements 1502–1504, as in FIGS. 3 and 4. A time delay element 1505 is then used to delay for a microsecond. The signal then passes through a transmit bandpass filter 1507 and is emitted from the transmit antenna. A SAW device can be used as the time delay element 1505. During the period of the delay, the cell controller ceases transmission, and reflections of the interrogation signal 106 in the environment die down to a minimal level. This half-duplex approach allows single frequency operation, although with lower bandwidth than with a full-duplex frequency shifting approach. As in the frequency-changing tag, the delay-based tag is capable of modulating the response signal by a 180-degree phase shift. In other respects, the tag design 1500 shown in FIG. 13 is similar to those shown in FIGS. 3 and 4.

Cell Controller RF Design

Figure 6:
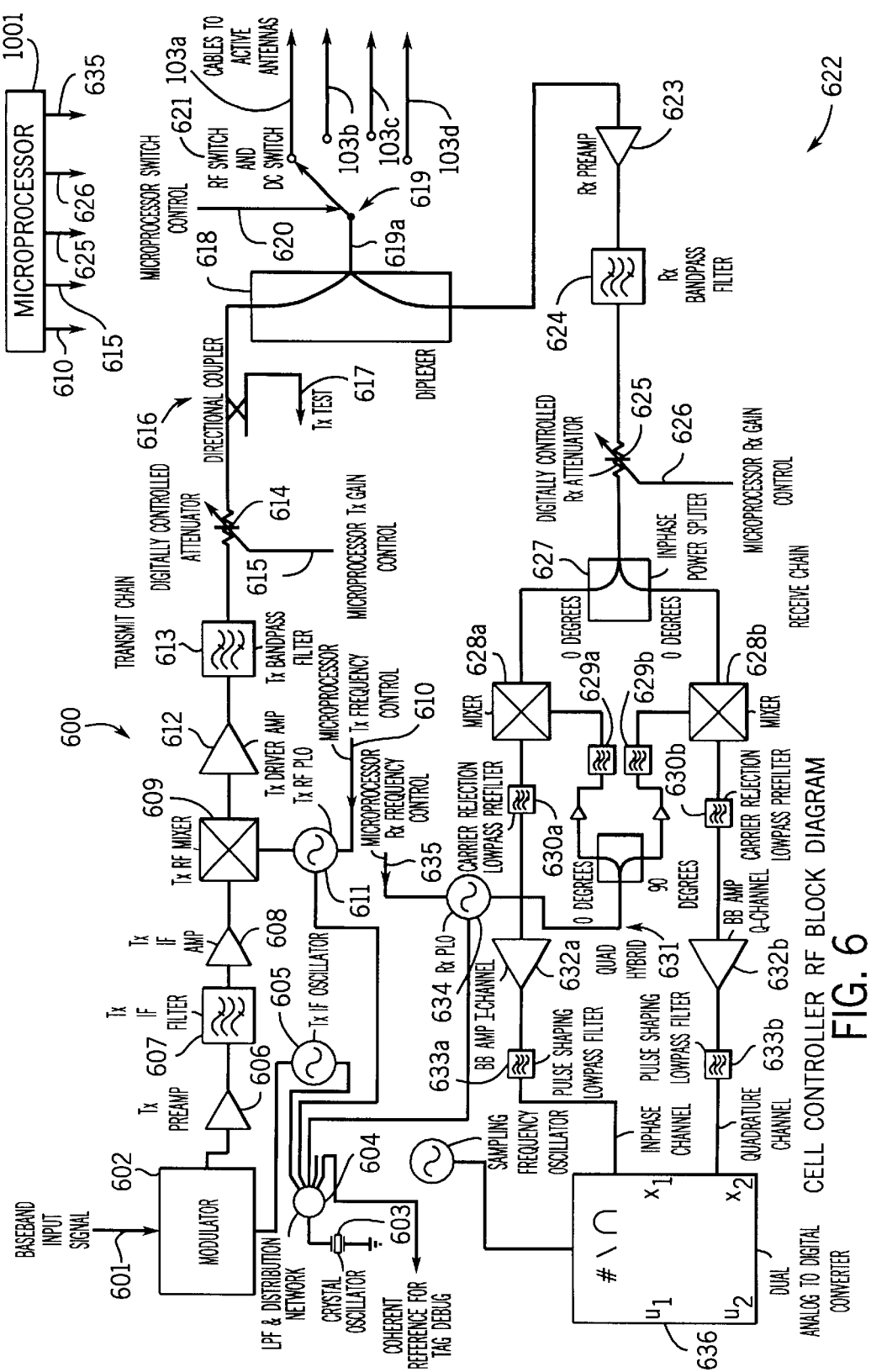
FIG. 6 is a block diagram of the cell controller RF design.
Figure 7:
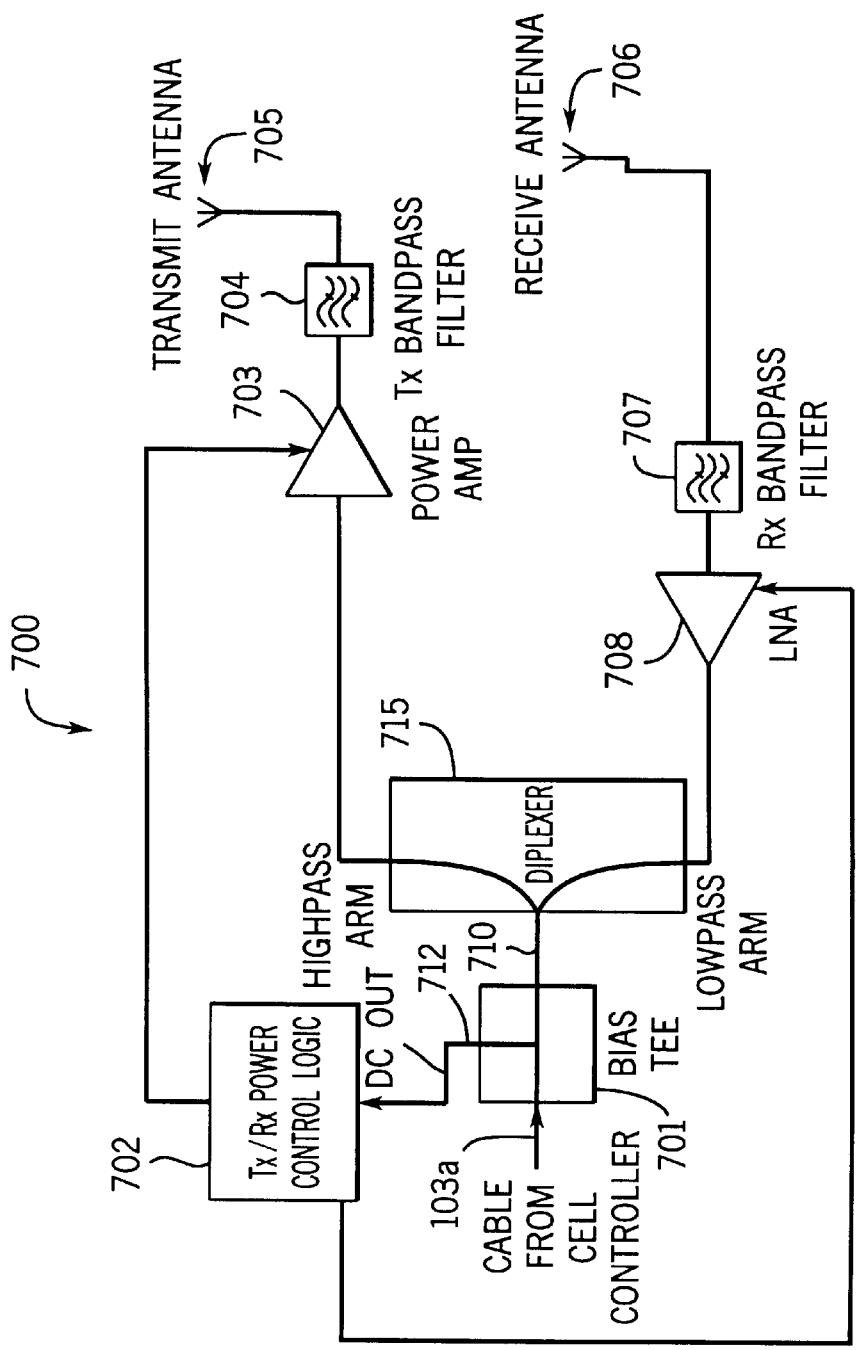
FIG. 7 is a block diagram of a cell controller active antenna module.

FIG. 6 shows the radio stage of a cell controller 102a. The architecture of an antenna module, such as the antenna module 104, is shown in FIG. 7. Together, the cell controller 102a and its remote antenna modules 104a–d modulate a baseband square wave input onto a 2440-megahertz carrier, filter the resulting 2440 megahertz signal to comply with FCC transmission requirements, transmit that filtered 2440-megahertz signal through a selected antenna module, receive a returning 5780-megahertz tag response through the same antenna module, extract the I (Inphase) and Q (Quadrature) components of the demodulated baseband signal, and digitize the result for subsequent processing.

Figure 10:
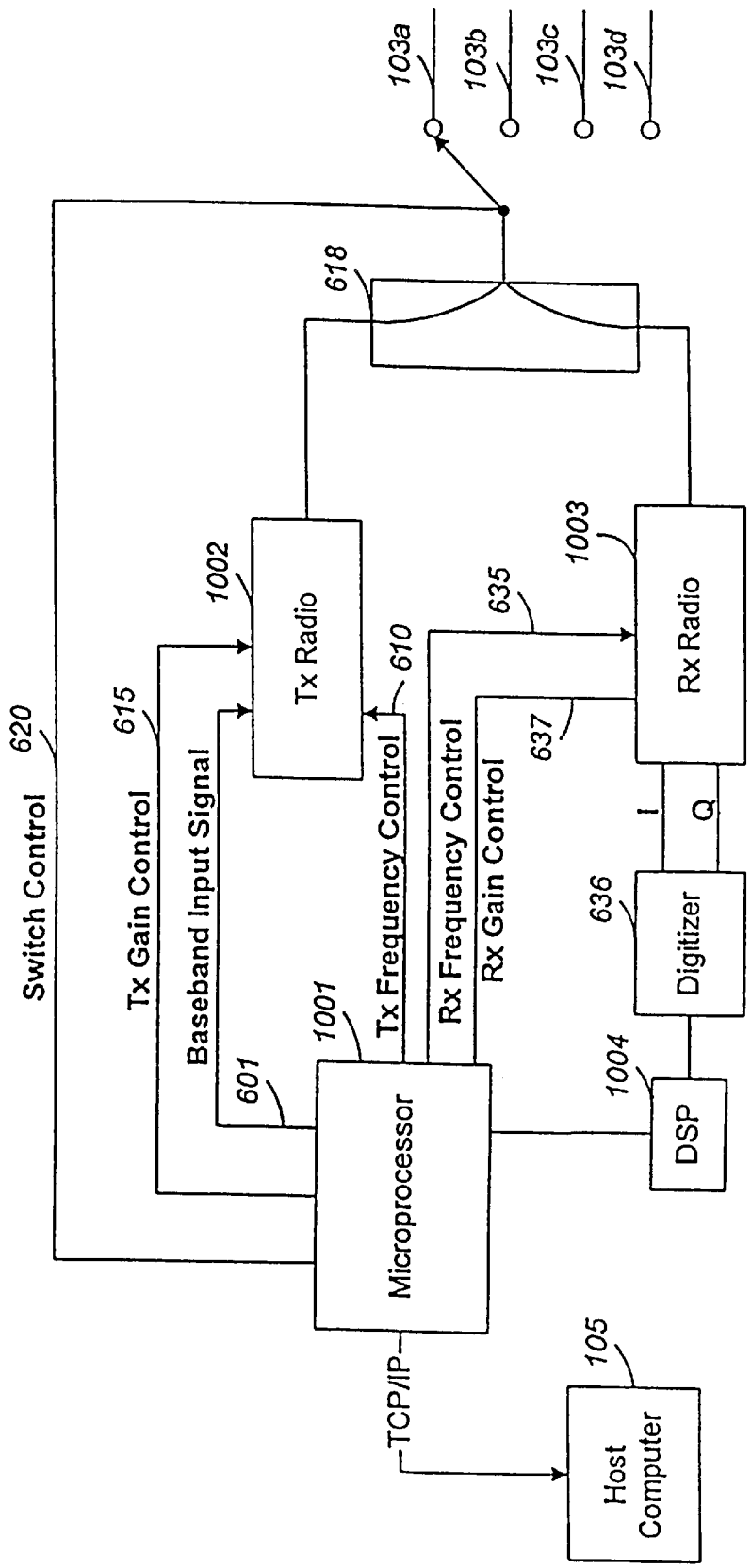
FIG. 10 is a block diagram of a cell controller.

FIG. 10 shows the main components of the cell controller digital subsystem 650. In summary, the digital subsystem 650 provides a baseband input signal 601, and some number of nanoseconds later receives a demodulated response 107 from a tag 102a. The microprocessor 1001, as noted above, can change the behavior of the radio system by (a) modifying the baseband input signal 601; (b) modifying the chip rate, pseudonoise sequence length, and/or the pseudonoise sequence code; (c) modifying the transmit frequency 610 of radio transmitter 1002 and the receive frequency of radio receiver 1003 within a narrow range; (d) modifying the transmit gain of radio transmitter 1002 and the receive gain of radio receiver 1003; and (e) by switching antenna modules 104a–d.

The demodulated response 107 from the tag 102a is split into I (Inphase) and Q (Quadrature) components by the receiver Radio 1003, and digitized by a digitizer 636. Signal processing hardware 1004, for example a combination of DSP and FPGA components, reduces the output from the digitizer 636, performing correlation operations at high speed. If binary phase-shift keyed (BPSK) modulation is used on the transmitting side, the I and Q channels are correlated separately and combined. For quadrature phase-shift keyed (QPSK) modulation, each channel must be correlated twice, once with each sequence. The correlated data from the signal processing hardware 1004 is processed by a microprocessor 1001, such as a Pentium processor. Communications between the microprocessor 1001 and the host computer 105 is accomplished using a TCP/IP protocol, with Ethernet being preferred.

The data that is input to the transmit chain is a baseband input signal 601 which is a pseudonoise spreading sequence. The length of the sequence and the code encoded in the sequence are set by a cell controller microprocessor 1001, and can be varied depending on signal processing requirements. Thirty-one or 127 bit sequences are typical, giving about 15 dB and 20 dB of compression gain, respectively. The 2440 megahertz and 5780 megahertz bands can support a 40 megahertz baseband input signal 601, and the cell controller 102a is designed to enable this full bandwidth to be utilized.

Figure 5F:
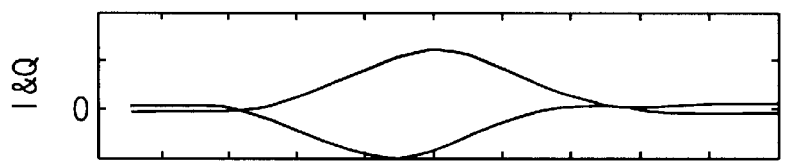
Figure 5G:
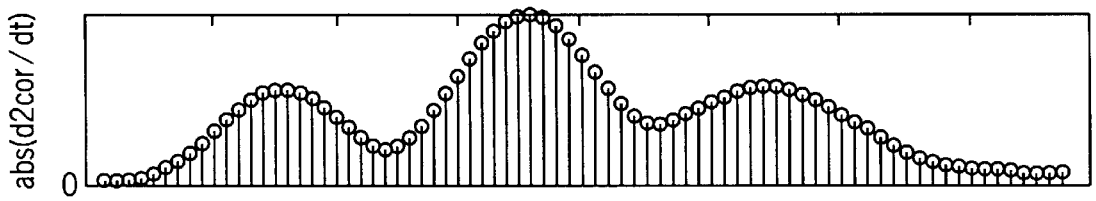

FIGS. 5A–5G show an interrogation signal 106 as it passes through various stages of the cell controller RF circuitry 600. FIG. 5A shows a square wave baseband input to the modulator 500. FIG. 5B shows this baseband input digitally correlated 510. FIG. 5C shows an output 520 from a-modulator 602, viewed through a spectrum analyzer centered at 2440 megahertz. FIG. 5D shows a spectrum analyzer view 530 of the tag signal 107, centered at 5780 megahertz. FIG. 5E shows the demodulated response from tag 107, separated into its I (Inphase) 545 and Q (Quadrature) 540 components. FIG. 5F shows the I and Q components, digitally correlated 550. FIG. 5G shows the negative of the second derivative of the correlated waveform, combining the I and Q components 560.

The modulator 602 (FIG. 6) modulates the baseband input 601 onto a 2440 megahertz carrier. Various forms of modulation are available and well-known to those skilled in the art. For BPSK modulation, the modulator 602 is implemented as a single pole double throw RF switch 801 that feeds a 180-degree hybrid combiner 803, as shown in FIG. 8. The modulator 602 is preferably implemented as a QPSK modulator, which duplicates the BPSK modulator with one channel offset by 90 degrees from the other, each channel driven by a different baseband sequence with acceptable cross-correlation characteristics. Higher order modulation is also possible. Modulation by the modulator 602 results in sidelobes extending for hundreds of megahertz, which need to be filtered to comply with FCC requirements. The 2440 megahertz band has an adjacent band, which imposes very strong filtering requirements, best addressed using in the illustrated embodiment using a SAW filter 607 that combines wide passbands with tight stopbands. A wider passband supports a faster chipping rate in the baseband input signal 601, but a narrower passband provides an opportunity to use a wider range of frequency diversity to avoid jammers and/or support advanced signal processing techniques. The modulator 602 must operate at the same frequency as the available IF filter 607, typically in the range of 200 megahertz to 400 megahertz. A preamplifier 606 is necessary prior to the SAW IF filter 607, and the output of the filter needs to be amplified by an amplifier 608.

A transmit IF oscillator 605, like all other RF oscillators in the cell controller circuitry 600, is phase locked to a 10 megahertz crystal source 603, which is distributed through a filter and splitter network 604 to each of the oscillators. The 10 megahertz source 603 needs to be within a few kilohertz of the 10 megahertz sources on the tags to avoid excessive baseband phase shift.

The output from the IF filter 607 (from amplifier 608) is then mixed by a mixer 609 with the output from a phase locked oscillator (PLO) 611 and is converted to a carrier frequency of 2440 megahertz. The frequency of the PLO 611 can be modified within a narrow range under microprocessor control 610, in order to provide the frequency diversity needed to avoid jammers and/or for various advanced signal processing techniques. The degree of frequency diversity available is related to the specifications of the IF filter 607, with narrower filters permitting a slower chip rate but having more frequency flexibility. Not shown in FIG. 6 is a filter typically needed to remove undesirable harmonic and difference frequencies from the output of the mixer 609.

Following the mixer 609 is a driver amplifier 612 which raises the power level of the signal 106, so that it can be driven down the cable 103a to the remote antenna module 104a, and which buffers the output of the mixer 609 for a bandpass filter 613. The RF bandpass filter 613 is needed to remove FCC non-compliant outputs from the mixer 609. A directional coupler 616 provides a port to examine the signal 106 before it is transmitted to the remote antenna modules, for example antenna modules 104a–d.

An attenuator 614 under microprocessor control 615 allows the signal processing software to decrease output power when a tag 101a–d is known to be nearby. This is helpful in circumstances when a nearby tag is known to be over-driven by the cell controller, and/or the signal processing software needs the tag to operate in a more linear range.

The signal is then fed into a diplexer 618, which combines the transmitted 106 and received 107 signals onto a single wire. The diplexer 618 is a highpass/lowpass filter combination 619a that attenuates a received signal 107 relative to the transmit side and attenuates the transmit signal 106 relative to the receive side. Because of the presence of the Tx and Rx bandpass filters 613, 624, the specifications of the diplexer 618 are not very stringent.

The cell controller RF stage 600 shown in FIG. 6 supports one remote antenna module 104a–d at a time. In order to support multiple antennas from the same cell controller, the system needs a switch 619, which enables a microprocessor control 620 to rapidly switch from one antenna to the next. The switch 619 takes RF and passes it into one of n cables, where n is, for example either 8 or 16. The switch 619 also provides DC power to the selected line. The RF signal is coupled into the cables with a capacitor (not shown), which provides DC isolation, and the DC power is coupled into the cables with RF chokes to provide RF isolation. Thus, the DC and RF travel together through a single coaxial cable to the selected antenna.

The rise time of the DC in an antenna is in the range of 20 microseconds, limited by the effective resistance of the circuitry in and characteristics of the antenna and the capacitors needed for operation. To provide antenna switching time in the microsecond range, the DC power to an antenna is preloaded before the RF is switched.

Referring to FIG. 7, in an antenna system 700, the combined DC and RF signals arrive through a coaxial cable, such as the cable 103a from the cell controller 102a. A bias-tee 701 separates the RF signal 710 from the DC signal 712. The DC signal 712 is sent to Tx/Rx power control logic 702 which, in the simplest embodiment is a filter to remove noise from the line and provide a clean 5 volt power source. The RF output 710 from the bias tee 701 is fed into a diplexer 715, which is identical to the diplexer 618 in the cell controller 102a. This is then amplified by an amplifier 703 to the power level allowed by the FCC, and filtered by a filter 704 to remove line and amplifier noise in compliance with FCC regulations. The resulting signal is then sent to a transmit antenna 705.

The transmit antenna 705 and receive antenna 706 are, in this embodiment, wall mounted patch arrays, providing reduced energy in the vertical direction and spreading energy laterally, so that power is not wasted in the floor and ceiling, and so that minimal power is radiated upward. The 5780-megahertz response 107 from the tag 101a is filtered by a filter 707, amplified by an amplifier 708, and sent back down the cable 103a to the cell controller 102a.

Figure 9:
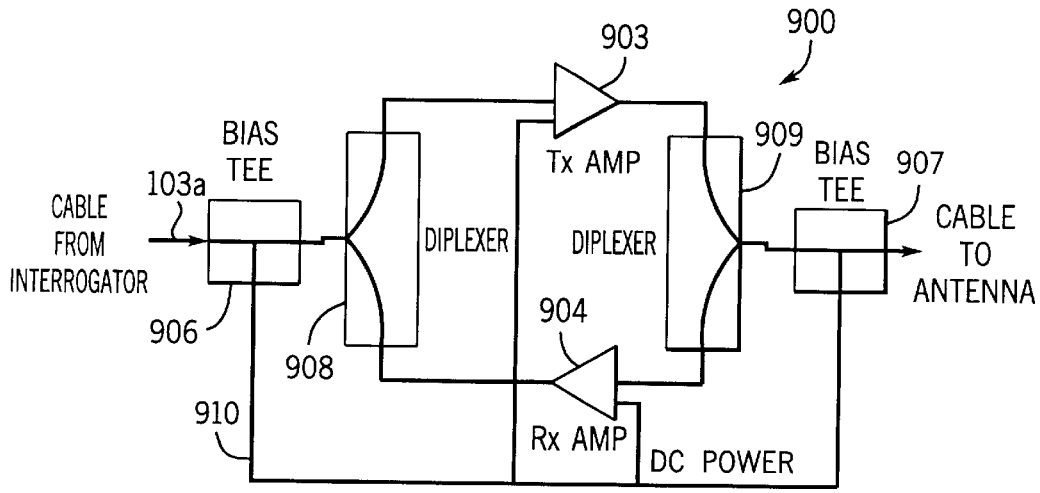
FIG. 9 is a block diagram of a cell controller cable extender module.

The system is designed to use cables 103a–d of a standard length, for example, 20 meters. A cable extender module 900 connects two lengths of cable and supports an extended cable length. Referring to FIG. 9, the elements of the module 900 use the DC power 910 from the cable 103 to drive low noise amplifiers 903, 904, which provide enough gain to drive the next section of cable. Bias tees 906, 907 separate the DC power 910 from the RF signals, and diplexers 908, 909 operate to separate the transmit signal 106 from the receive signal 107.

Referring to FIG. 6, the signal returning from the antenna module 104a to the cell controller 102a passes through the switch elements 621, 619 and diplexer 618 to the cell controller receive RF chain 622. The signal passes through a combination of a preamplifier 623 and bandpass filter 624, the exact arrangement of which varies based on the parts selected. A digitally controlled receive attenuator 625 under microprocessor control 626 is used to avoid saturating the receive chain when the tag 101a is known to be nearby. This is necessary to avoid losing the relationship between the I and Q components of the received signal 107, necessary for proper correlation and other signal processing.

The signal then enters an I-Q zero IF demodulator circuitry 627–633. As noted previously, the microprocessor Rx frequency control 635 must be set in tandem with its counterpart in the transmit chain. The resulting signal, an example of which is shown in FIG. 5E, is fed into a digitizer 636 (FIG. 10) in preparation for digital signal processing.

The embodiment described above is simplified, based on an assumption that the cell controller can send and receive from only one antenna at a given time. Improved performance can be achieved by selecting send and receive antennas independently of each other. Software in the cell controller determines which antenna module receives the best signal from the tag. For example, if a particular tag, such as tag 101a, is close to an antenna, such as antenna 104a, then the antenna 104 will receive a strong signal from the tag 101a. The cell controller 102a can then transmit a signal, such as signal 106, from antenna 104a, and receive the transponded response 107 at antennas 104b, 104c, and 104d in turn. This can result in a stronger signal received at the antennas 104b–d, compared to the signal the antennas 104b–d would have received had the signal 106 been transmitted and the signal 107 received from each of the antenna modules 104b–d independently.

Figure 14:
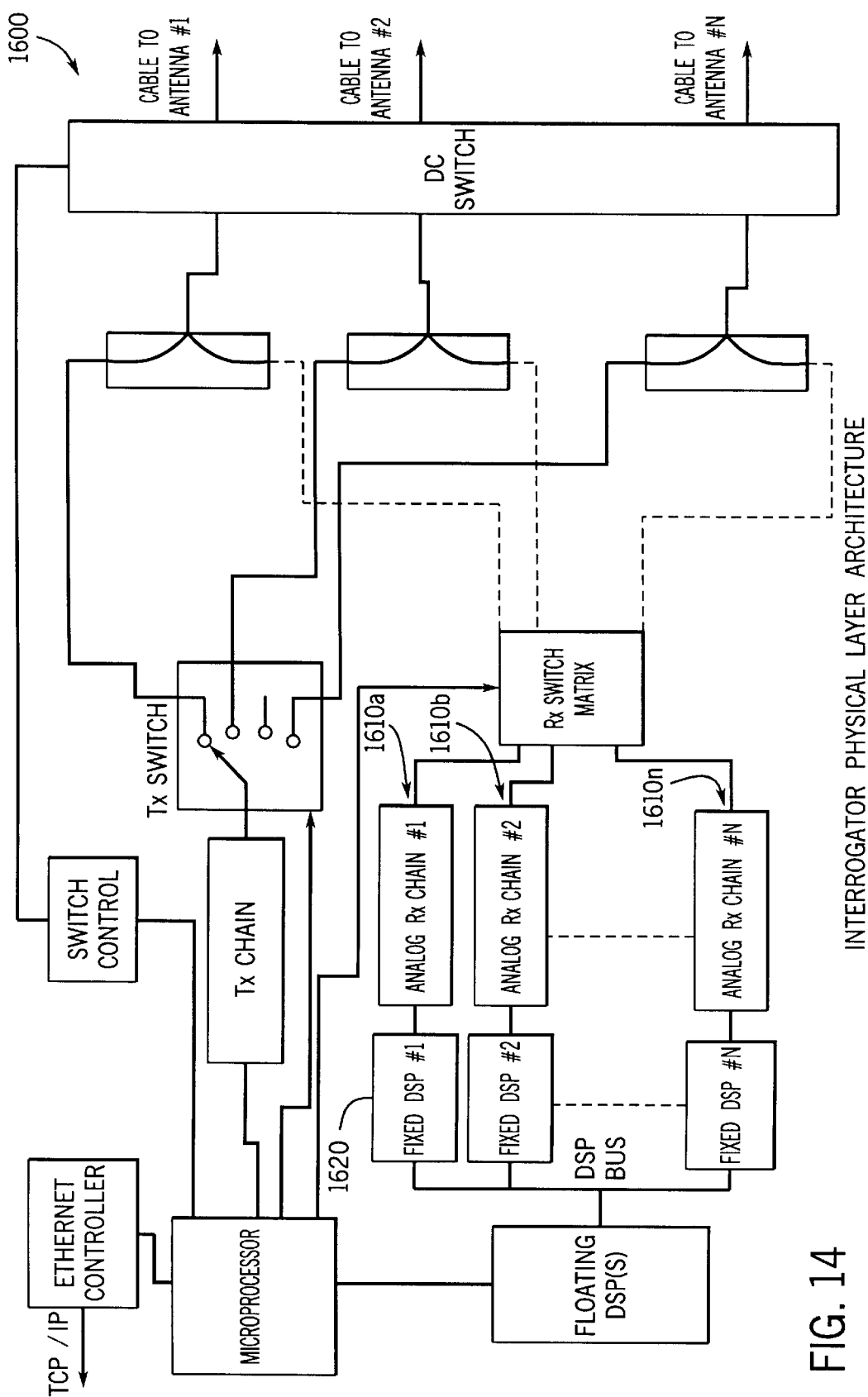
FIG. 14 shows several cell controller receive chains operating in parallel.

The design 1600 shown in FIG. 14 provides multiple receive chains 1610a–1610n operating in parallel. Each of the receive chains 1610a–1610n includes an IQ demodulator, a digitizer, and a correlating element, shown as integer DSPs, for example, integer DSP 1620. Implementing each receive chain on a separate card provides scaleability. The use of multiple receive antenna modules for the same transmitted signal allows the cell controller signal processing software to employ spatial processing techniques to isolate multipath effects. These techniques take advantage of the fact that the multipath-corrupted response will have different characteristics at each antenna.

Bit Detection

Figure 11:
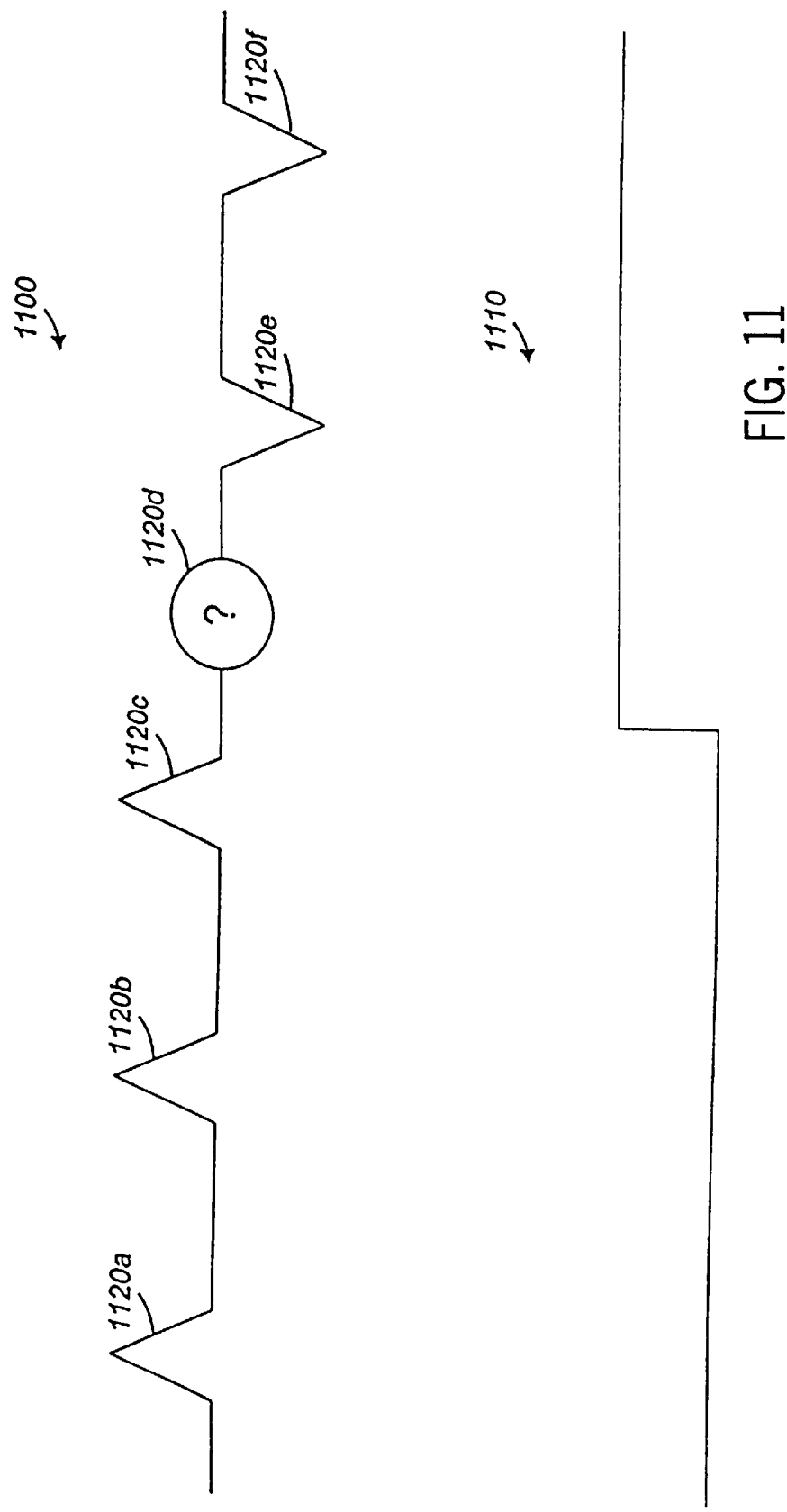
FIG. 11 illustrates extraction of tag data from a series of correlations.

In an ideal environment, a simple triangular correlation peak can be derived from a received tag signal 107, as shown in FIG. 5B. Distortions introduced in the radio chain, particularly caused by indoor multipath effects, result in a distorted but nonetheless distinct correlation peak, a function of which is shown in FIG. 5G. For the purpose of bit detection, the essential point is to reliably detect the existence of a series of correlations, which indicates the operation of a tag. FIG. 11 shows how tag data is extracted from a series of correlations. In the left half of the chart 1110 shown in FIG. 11, the tag is transmitting a "zero." This is accomplished by setting the tag's modulator 307 to pass the interrogator signal 106 unaltered. When the received tag signal 107 is correlated with the transmitted pseudonoise sequence, essentially identical correlation peaks result. Three such peaks 1120a–c are illustrated here. During the time of the fourth correlation 1120d, the tag flips the phase of the modulator by 180 degrees, indicating a "one," as shown in the chart 1110. Since the modulation is changed in the middle of a bit, the fourth correlation data peak 1120d is corrupted, and is best ignored. The fifth and sixth correlation peaks 1120e–f cleanly reflect the 180-degree shift.

Pseudonoise sequences can be varied under microprocessor control at the cell controller when a tag's presence is first detected, relatively short sequences must be used, as shown in FIG. 11. Once the tag's bit timing is ascertained, it is possible to use longer sequences for improved SNR, which is helpful in distance measurement.

An important consideration, not shown in FIG. 11, is that the balance between the Inphase and Quadrature components of the received signal will drift over time. This is because the 10-megahertz sources in the cell controller 102a and the tag 101a will differ typically by a few kilohertz. This factor can be calibrated by noting the phase difference between contiguous correlations, detectable at the baseband by noting changes in Inphase and/or Quadrature components of the received signal. As noted previously, this same calibration process can be used to calibrate the tag clock in reference to the cell controller clock, allowing for precise prediction of tag chirping time, without needing to precisely measure the timing of tag bit transitions.

Interaction Between Cell Controllers and Tags

Each tag is a stand-alone unit that is unaware in any way of the outside world. Each tag has a Unique Identifying Code (UID) associated with the tag when it is manufactured. A tag wakes up periodically and, for a short period of time, converts any incoming 2440-megahertz signal 106 to an outgoing 5780-megahertz signal 107, while modulating its UID and other data onto the outgoing signal 107 which it chirps (transmits). The tag does not communicate with other tags. The tag does not explicitly respond to an interrogation signal, but merely transponds any incoming signal 106 in the 2440-megahertz band, which may or may not include a pseudonoise sequence from a nearby cell controller antenna module 104a. This approach greatly simplifies the design and fabrication of the tag 101a.

Some portion of the time, two or more tags will transpond simultaneously. In many cases, one of the two tags will return a stronger signal than the other tag and some data will be lost in such a collision. To avoid collisions occurring in a repeating pattern, tags "wake up" and chirp their UIDs at randomized times, which can be calculated (by both the tag and the cell controller) based on a pseudorandom number generator which incorporates the tag's UID. For to example, for a tag which chirps approximately every 5 seconds, the tag generates pseudorandom numbers between 0.0 and 2.0, and adds these to a 4.0-second minimum delay time, resulting in a sequence of delay times uniformly distributed between 4.0 and 6.0 seconds.

It is possible to use analog inputs, such as an input from an internal clock or the delay of an RC circuit, to the pseudorandom number generator to vary the seed over time, but a purely digital scheme is preferred to enable the cell controller 102a to accurately forecast a known tag's chirping time. A typical pseudorandom number generator has the form:

$$N = \text{rand}(\text{seed}) \qquad \text{Formula 1}$$

The resulting N is used as the seed for the next pseudorandom number in the pseudorandom number sequence. When using a pseudorandom number generator of this kind, it is possible that two tags will use the same seed, resulting in their tag signals repetitively colliding. Further, with small differences in tag clocks, all pairs of tags will eventually drift through this synchronized state for some amount of time. To avoid these conditions it is desirable to incorporate each tag's UID, as noted above, into the delay time for that tag, resulting in a different pseudorandom sequence for each tag, that is:

$$\text{Delay} = f(N, \text{UID}) \qquad \text{Formula 2}$$

One simple example of such a function is:

$$\text{Delay} = \text{Xor}(N, \text{BitRotate}(\text{UID}, \text{AND}(N, 1111_2))) \qquad \text{Formula 3}$$

Referring to Formula 3, it is possible to reconstruct seed from UID, Delay and And($N,1111_2$), by calculating $N = \text{Xor}(\text{Delay}, \text{BitRotate}(\text{UID}, \text{And}(N, 1111_2)))$.

Figure 12A:
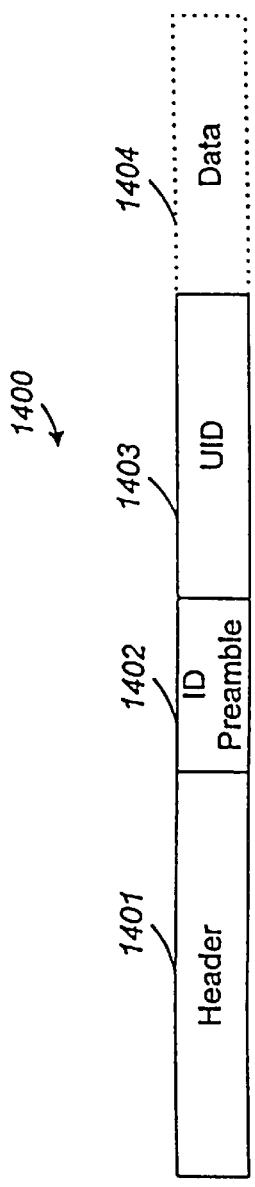
FIGS. 12A–C are diagrams of tag datagrams.

Referring to FIG. 12a, one embodiment of the tag datagram 1400 contains a header 1401 to enable the cell controller to detect the tag's presence, followed by an identifier preamble 1402, followed by the tag's UID 1403. The header 1401 can be of zero length. The identifier preamble 1402 can be implemented, for example, as a validity check such as a cyclic redundancy check (CRC). Given a sufficiently simple Delay function and high clock stability, the cell controller can infer the tag's chirping sequence by noting the timing of a series of chirps of the datagram 1400.

Figure 12B:
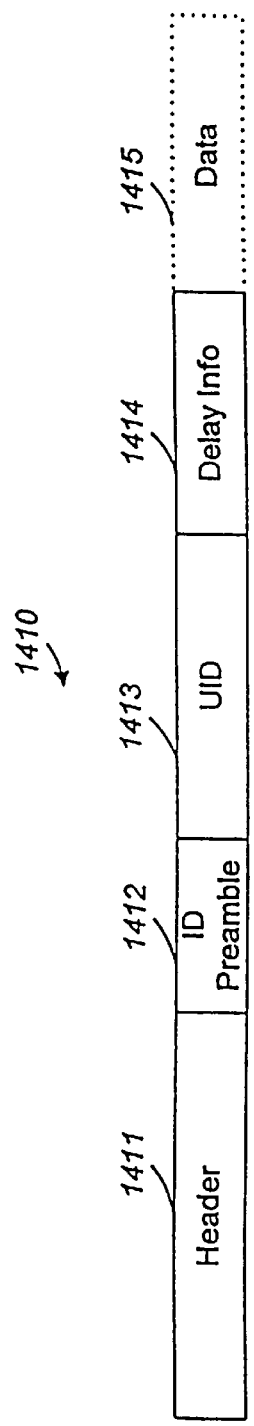

Referring to FIG. 12b, in another embodiment of the tag datagram 1410, the tag adds Delay information 1414, thus enabling the cell controller to forecast the transmission time of the tag's next and subsequent chirps of the datagram 1410. In the example of Formula 3, this information would include the data: Delay and And($N,1111_2$).

Figure 12C:
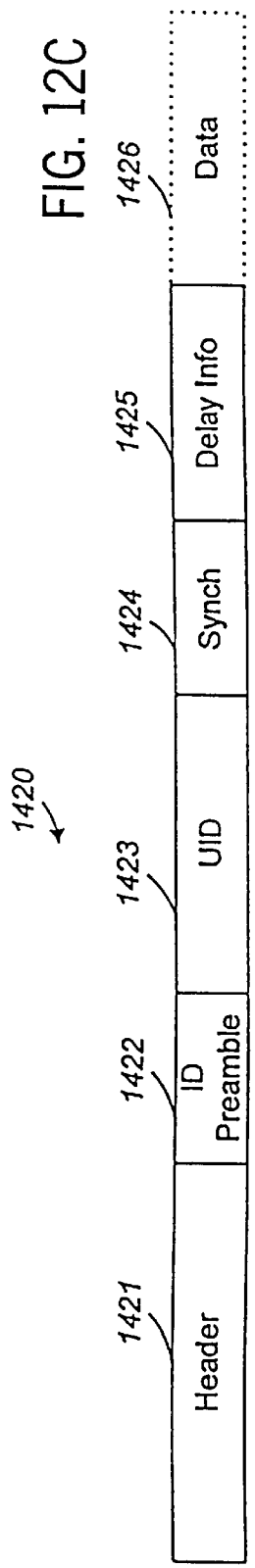

Referring to FIG. 12c, in another embodiment of the tag datagram 1420, a shorter header is used than in the datagrams 1400, 1410 of FIGS. 12a and 12b, such that the cell controller is not guaranteed to have enough time to detect the tag's presence before the UID 1423 contained in the tag datagram 1420 is transmitted. Appended to the datagram 1420 is the transmission delay 1425 of the next chirp, enabling the cell controller to anticipate the time that the tag will next chirp its datagram 1420, even if the cell controller does not have enough time to identify the identity of the tag from the first received chirp of the datagram 1420. The cell controller can then anticipate this next chirp and ascertain the identity of the tag at that time. Once the tag is identified, the cell controller can duplicate the tag's pseudorandom number generator to calculate the times of all future chirps by the tag. In the tag datagram 1420 of FIG. 12c, a series of special synchronization bits 1424 are inserted between the UID 1423 and the delay information 1425, to reliably determine when the UID 1423 ends; in this case, the UID 1423 must be defined so that it does not include the synchronization sequence or its inverse.

FIGS. 12*a*, 12*b*, and 12*c* include optional data sections 1404, 1415, 1426, which allow a tag to transmit data to the cell controller. These sections 1404, 1415, 1426 can include data from within the tag, such as from a motion detector or a low power indicator, or from an external device attached to the tag, such as metabolic information for medical telemetry if the tag is attached to a person.

An identifier preamble, related to the tag UID, precedes the tag UID. This identifier preamble enables the cell controller to quickly verify that a tag is chirping as expected, without needing to decode the tag's complete UID. This frees the cell controller for other activities, such as communicating with different tags in proximity to other antennas. The identifier preamble 1402, 1412, 1422 and tag UIDs 1403, 1413, 1423 are set externally, and if appropriate can be defined to include error correction bits.

The UID of a tag may be hardcoded into the tag (e.g., as a serial number). Tags may be grouped based on their UIDs, and different groups may be associated with different cell controllers. Each cell controller contains information (received from another source) about which tags are in the group associated with the cell controller. When a cell controller receives a tag signal, the cell controller can extract the UID information from the tag signal to determine whether the tag signal was sent by a tag in the group associated with the cell controller.

In the tag datagrams 1400, 1410, 1420 of FIGS. 12*a–c*, the delay information fields to 1414, 1425 and data fields 1404, 1415, 1426 can also include error correction bits. For simplified processing, data can be reduced to a stream of half-bytes. To determine what value to send for a particular half-byte, the tag can look up the half-byte's value in a table which contains, for example, 8-bit values, which represent the value of the half-byte plus error correction information. A single cell controller can handle all three types of datagrams 1400, 1410, 1420 shown in FIGS. 12*a–c*. The choice of datagram type would depend on the application requirements for a particular tag.

The amount of time it takes for a cell controller to detect the presence of a tag may vary depending on the nature of the cell controller design. For example, a 100-microsecond time to switch antennas may be significant when the cell controller is cycling among 16 antennas. In order to be assured that a tag will be identified the first time its tag signal is received by the cell controller, the tag datagram header must be long enough to give the cell controller time to try all of its antennas. If the performance requirement is in the range of 100 tags per second, 2 or 3 extra milliseconds in the header can be tolerated. But for higher performance requirements, or when tag power consumption must be minimized, it is necessary to either improve the performance of the cell controller or to use a tag datagram 1420 of the type shown in FIG. 12*c*.

By anticipating time of transmission from a particular tag, the cell controller can collect tag information from a variety of antennas in an organized way, in order to better calculate tag location by using antenna and/or frequency diversity. If a tag is responding exactly when it is expected to respond, it is not necessary for a cell controller to detect every bit transmitted in the tag datagram in order to be reasonably certain that it is receiving a signal from the correct tag. A correct identifier preamble arriving exactly on schedule is almost certain to be from the expected tag. This provides an opportunity for the cell controller to try a variety of antennas that may or to may not be able to communicate with the tag.

If it is necessary to track tags between the tag datagram transmissions, the tag can be configured to send shorter transmissions more frequently. For example, if a tag is configured to chirp its datagram on average every 10 seconds, it may also be configured to transmit a much shorter code more frequently, such as every half-second. This shorter code might be as short as one bit long, and take just a few microseconds to transmit. Thus, even hundreds of such transmissions per second would consume only a small percentage of the communication channel. The cell controller can anticipate the exact timing of each such transmission, thus matching each signal with the originating tag based on the time of the transmission. Error correction codes can be arranged such that long chirps from one tag will not typically be corrupted by quick chirps from other tags. The cell controller has the data to forecast most of such collisions.

When a tag is first introduced into a cell controller's range, collisions between datagram transmissions of different tags will occur in an unpredictable way. Transmission by a tag newly introduced into the area, or by a tag which spontaneously increases its transmission rate (such as in response to a motion detector or "panic button"), cannot be forecast by the cell controller 102*a*, and might cause data corruption. However, once the tag is identified, previous collisions can be modeled and questionable data discarded. Alternatively, if signals from two tags collide, the cell controller can select an antenna such that the signal the antenna receives from one tag will be stronger than the signal the antenna receives from the other tag.

In a more advanced tag design, the cell controller has a means for sending information and instructions to the tag during the times that the tag is known by the cell controller to be in operation. Such instructions can include commands to be passed on to a device attached to the tag. The cell controller is capable of downloading such information, most simply by on-off keying, or for more advanced tags by flipping the pseudonoise bit sequences to indicate one or zero. In general, the downlink (downloading) approach is driven by tag cost and feature requirements, with higher bit downlink transmission rates requiring more expensive receivers that consume more power. Thus, a single cell controller can support read-only tags, read/write tags, and high-speed read/write tags simultaneously, with the cell controller adapting its behavior depending on the features supported in a particular tag.

Timing of transmission from tag to cell controller depends on the item being tagged. Inventory and equipment can be set to transmit relatively infrequently, such as once per minute. More frequent transmissions would be required, for example, for tags on people in a secure facility. For read/write versions of tags, timing of transmission could be modified on command from the cell controller.

Alternative tag designs enable variation in transmission time based on environmental factors. For example, motion detectors may be placed in a tag to decrease the time between transmissions when the tag is in motion. As another example, a tag might transmit more frequently and with higher power when the tag has been tampered with. As another example, a tag might incorporate a slightly modified Electronic Article Surveillance (EAS) device, which would cause the tag to transmit its UID more frequently when in range of a standard EAS detector. More generally, if a tag is attached to another electronic device, transmission interval can be modified under the control of that device.

Tag Power

Tags 101a–c transmit a low RF power level in order to increase their portability and lifespan. In addition, tag signal transmissions 107 are designed to be only a few milliseconds in duration. Therefore, even if a tag transponds its UID every few seconds, careful tag design allows the battery life of the tag to approximate the shelf life of the battery itself. For even lower power usage, a motion detector can be incorporated into the tag so that, for example, transmissions can be less frequent when the tag is stationary.

For some situations, battery replacement may be accomplished by incorporating the battery in an attachment mechanism. For example, re-usable tag electronics may be attached to a disposable patient bracelet, with the battery included in the bracelet. As another example, a battery may be incorporated into the clip of an ID bracelet. More generally, a battery may be incorporated into an inexpensive disposable portion of an active RFID tag, with the electronics in the other, more expensive, portion.

If the item to which a tag is attached is a power source itself, the tag could tap into that power source. This approach is most practical in situations where the tag can he designed into the equipment itself (such as a handheld computer), or where the equipment and power source are large (such as a forklift). A larger power source allows for longer tag range.

Estimating Tag Location

A tag signal 107 is received at a time that is the sum of (1) known fixed delays in the cell controller 102a that transmitted the interrogator signal 106, due to its circuitry and the wiring to and from its antenna modules 104a–d, (2) fixed time delays in the antenna module 104a and tag 101a, and (3) the time for the interrogator signal 106 and tag signal 107 to travel through the air.

Since (1) and (2) are fixed, attention can now be turned to (3), the travel time of the interrogator signal 106 and tag signal 107 through the air. The duration of the pseudonoise sequence modulated onto the 2440 MHz carrier signal 106 by the cell controller 102a must be greater than the combined travel time of the signal 106 and the tag signal 107. Techniques for correlating a pseudonoise sequence are well known in the art. In the absence of multipath effects, the cell controller 102a can derive a simple triangular correlation peak from the received tag signal 107, as shown in FIG. 5B. But in most indoor environments, the actual received tag signal looks more like that shown in FIGS. 5D–5G. Indoor radio signals are subject to substantial multipath effects, due to reflection from a variety of surfaces, such as whiteboards, fluorescent lights, file cabinets, elevator shafts, steel beams, and the like. When a tag 101a transmits a tag signal 107, the sum of the direct tag signal 107 and reflected signals is received at the cell controller antenna module 104a. A variety of approaches can be employed in order to extract a correlation peak from such information, with the particular approach chosen depending on the available signal quality, processing power, and required performance.

A 40-megahertz chip rate results in a correlation peak with a rise time of 25 nanoseconds, corresponding to a rise time distance of about 25 feet. Since tag location is calculated using round-trip travel time, single-chip accuracy therefore allows tag distance to be calculated within about 12 feet, without any advanced signal processing.

Approximate location of a tag can be calculated by noting when correlated signal-to-noise ratio rises above a predefined level. Improved accuracy can be achieved by trying a small variety of carrier frequencies and choosing the one that rises the earliest; such frequency diversity is supported by the radio system shown in FIGS. 4–6. This approach is sensitive to the system signal-to-noise ratio.

An alternative approach finds the peak of the correlation function. For an improved result, the signal delay is measured by taking the negative of the cross-correlation function's second derivative and finding the location of its peak, as shown in FIG. 5G. For highest accuracy, the MUSIC algorithm, known to those in this field, can be used, for which accuracy in the 0.01 chip range has been reported. MUSIC requires frequency diversity, which is supported by the radio system herein disclosed and shown in FIG. 6. The method is based on a decomposition of the eigenvector space of the pseudonoise correlation matrix of the delay profile data vector. Frequency diversity is required, where each distinct frequency provides the information to solve for an additional multipath component. For tags that are mostly stationary, necessary data can be collected and the calculation completed as a background process. For inventory applications, motion detectors can be incorporated into the tag, which would then inform the cell controllers whenever their locations need to be recalculated.

In situations where adequate data collection time, antenna diversity, frequency diversity, or processing power are not available, a variety of heuristic techniques can be used to calculate tag location, even in the presence of severe multipath effects. A variety of techniques well-known in the art can be used to estimate bearing to each antenna, which can be employed as required.

In many circumstances, although precise accuracy in calculating tag location is not required, it may still be important to calculate tag location with reference to a floor or partition. Story-by-story discrimination in a building can be accomplished by mounting antennas in the ceiling that radiate downward (or antennas in the floor that radiate upward), as shown in FIG. 2. Similarly, antennas mounted sideways on horizontal partitions can determine location relative to those partitions. Relatively narrow beamwidth antennas, which are less sensitive to multipath effects, can be directed at doorways and the like.

A cell controller antenna 104a can be mounted near a computer screen, with coverage corresponding to viewing angle of the screen. Software can then be arranged to automatically configure the operating system for the person in range, or to blank the screen for security purposes depending on who is or is not in range. Similar concepts can be used in conjunction with copying machines, microfilm readers, restricted equipment, and the like.

A single antenna module can include three separate antennas placed in a triangle. By comparing phase difference using the Inphase and Quadrature components of the returning signal, an indication of the tag's angle can be determined. In high frequency embodiments, such as at 2.45 gigahertz, such antennas could be within inches of each other and be quite effective.

Heuristic techniques can be used to analyze the correlation profile to estimate the time at which the correlation began, that is, the time at which the correlation peak begins to be distinguishable from the "noise" baseline. Frequency diversity can provide a variety of samples, the best of which can be chosen. Improved estimates can be achieved by pattern matching the correlation peak with one of a vocabulary of well-studied typical correlation profiles. For calibration purposes, tags can be placed at known fixed locations, and tags passing near those locations will likely demonstrate similar correlation profiles. Such fixed tags can also be utilized to detect the presence of jammers (objects which emit, intentionally or unintentionally, interfering signals) and to provide a real-time testbed for trying a variety of antijamming techniques.

Antenna diversity is the most important tool for improving the accuracy of tag location calculation. If low accuracy is required, antennas can be placed so that only one or two antennas are in range of a given tag. In this case there is insufficient data for triangulation, and only enough information to detect tag presence and estimate tag distance from one or two antennas at any one time. Approximate bearing of a tag can be estimated from the signal strength of antennas designed for the purpose and well-known to those skilled in the art; with the caveat that such bearing tends to reflect the strongest signal received, which might include a substantial multipath component. Conversely, for areas requiring high accuracy, a diversity of relatively narrow beamwidth antennas can be installed, for example, at entrances, which together provide a clear picture of location.

Antenna diversity also provides system scaleability. For other facilities, or sections within facilities, that do not require calculation of tag location with high accuracy, substantially omnidirectional and/or ceiling mounted antennas can be installed relatively far from each other, for a relatively low cost per square foot of coverage. For facilities, or sections within facilities, that require high positional accuracy, a diversity of closely-spaced and/or directional antennas can provide high accuracy at an increased cost.

Cell Controller Operation

The design of the overall system, and the fact that the intervals between tag signal transmissions are generated pseudo-randomly, provide an opportunity for secure operation. Tags dispersed at the entrance of a secure facility can be tracked through that facility and a special code can be emitted when the tag is tampered with. Although the tag's code can be determined by monitoring the tag's response, the tag's transmission interval varies according to an algorithm that can be arranged to be known only to the tag and the host, and impossible to directly determine without destroying the tag. The tag may for example, include an element, such as a physical element, for reprogramming its code and transmission interval. For example, a photo ID with an incorporated tag might be reprogrammed each time the person wearing the photo ID passes a security checkpoint, potentially in conjunction with biometrics technology.

For full coverage of a facility, multiple cell controllers can be installed, covering somewhat overlapping areas. Although each cell controller will be operating according to a search and data collection method, rapid movement between antennas, the pseudonoise code, the changing chipping rate, and so forth, will appear as random noise to another cell controller. In addition, codes with known cross-correlation characteristics, such as Gold Codes, can be allocated to various cell controllers by the host computer, particularly the codes used to search for tags. Alternatively, cell controllers can switch choice of pseudonoise codes on a randomized basis.

For tags on the border between two cell controllers, each cell controller reports the tag's distances from its antenna modules. The central host 105 assembles this data to calculate the tag's location.

A variety of pseudonoise codes are available for use by a cell controller. Thus, if one code seems to be receiving interference from other users of the spectrum, the cell controller can choose another code. The tag, being in essence a transponder, does not need to know the particular code being used. Likewise, center frequency can be adjusted somewhat if another user is causing difficulty.

Digital Signal Processing

Referring back to FIG. 10, the signal processing hardware 1004 performs operations upon the output of the digitizer 636. The signal processing hardware 1004 generally functions to perform operations upon the signal from digitizer 636 such as, for example, the previously described correlation. Additionally, signal processing hardware 1004 may perform a filtering process to filter out the noise components of received data signals. Various filtering techniques are known to those skilled in the art, such as the use of an adaptive transversal filter. Following is a description of functions that may be performed by the signal processing hardware 1004 in a preferred embodiment of the article tracking system of depicted in FIG. 1.

Figure 15A:
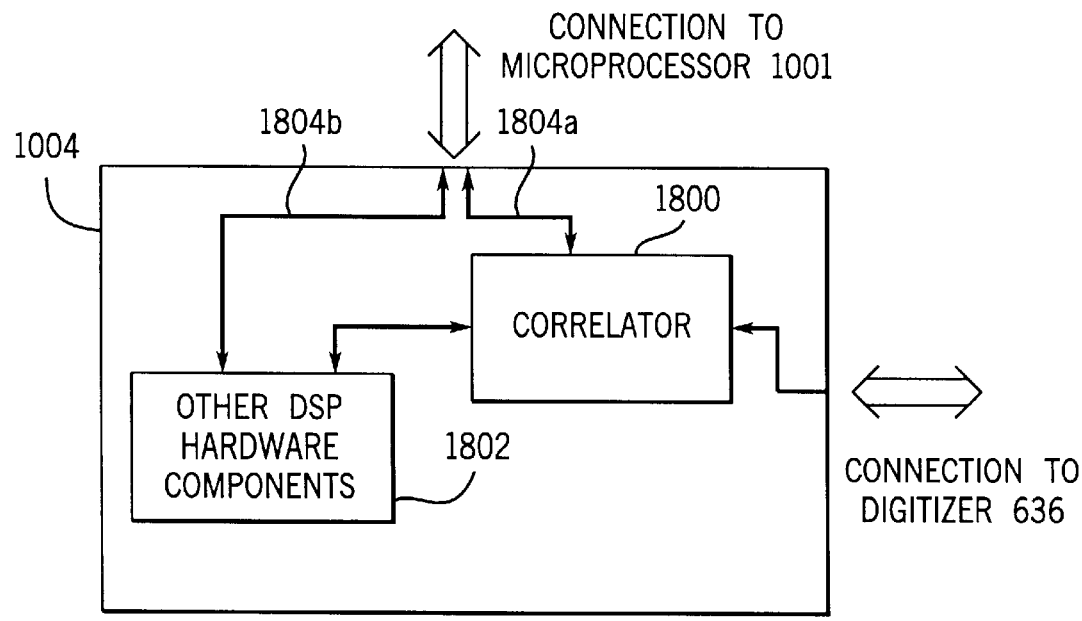
FIG. 15A is a block diagram of an embodiment of the signal processing hardware of FIG. 10.

Referring now to FIG. 15A, shown is a block diagram of a preferred embodiment of the signal processing hardware 1004. Generally, the signal processing hardware may include one or more hardware components that collectively perform digital signal processing of the received signals. Recall that the signal processing hardware 1004 was previously described in connection with FIG. 10. The processing set forth below may be implemented using any combination of conventional off-the-shelf hardware and/or software, utilizing DSP and/or FPGA hardware and/or semi-custom or custom ASICs, that may be configured by one of ordinary skill in the art using the description set forth herein.

Shown in FIG. 15A is signal processing hardware 1004 which is connected to the microprocessor 1001 and the digitizer 636, as previously described in connection with FIG. 10. Included in the signal processing hardware is a correlator unit 1800 connected to other DSP hardware components 1800. The number and type of components that are included in the other DSP hardware components 1802 vary with the type of processing done in each particular implementation. Each of the hardware components included in the signal processing hardware may be controlled by the microprocessor 1001, such as by using connections 1804*a* and 1804*b*. The connections required vary with each particular implementation and associated processing.

Figure 15B:
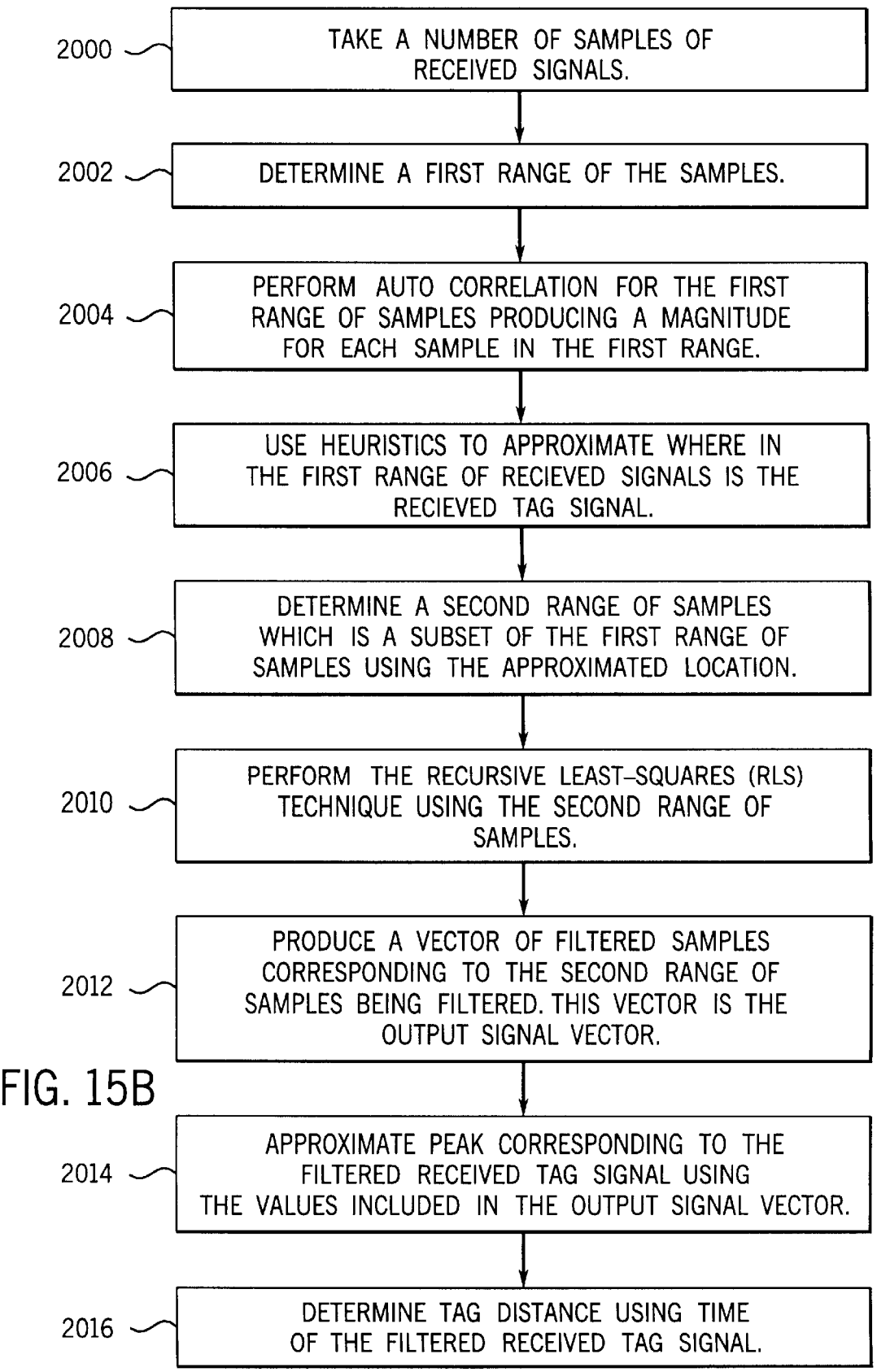
FIG. 15B is a flowchart depicting method steps of one embodiment of the Signal processing hardware unit of FIG. 10.

One embodiment of signal processing hardware 1004 uses only the correlator 1800. In this instance, data is directly output by the correlation unit, as indicated by the path 1804*a*. Generally, the other components 1802 and associated connections, such as 1804*b*, would not be used in this embodiment. As will be described in paragraphs that follow in connection with FIG. 15B, only a portion of the method steps of FIG. 15B are performed by the signal processing hardware in this embodiment. In an alternate embodiment of the signal processing hardware which will also be described in paragraphs that follow, all of the method steps of FIG. 15B are performed as part of digital signal processing.

Referring to FIG. 15B, shown are method steps of an embodiment for filtering received signals to enable determination of when a tag signal has been received. At step 2000, a number of samples of received signals are taken. The number of samples to be taken varies with each particular implementation. Generally, in accordance with well accepted principles known to those skilled in the art, the sampling rate is typically twice the transmission rate. For example, in one embodiment 254 points or received signals are sampled where each of the 254 signals is provided every 12.5 nanoseconds corresponding to the 80 megahertz sampling rate in which the system has a chipping rate of 40 megahertz. In this system, the signal transmitter rate is 127 chips per bit, or rather, every 3.2 microseconds a bit of data is transmitted. Generally, "chipping rate" and "chip time" are described in "The Practical Engineer", IEEE Spectrum, Vol. 35, No. 9, September 1998.

At step 2002, a first range of the sample received signals is determined. The first range is a subset of the samples recorded, as in step 2000. Generally, certain factors which are dependent upon each particular implementation may be considered when determining the starting point and size of the first range of step 2002. One factor that may be considered is the anticipated arrival time of a signal returned by a tag. This relates to, for example, anticipated delays in the transmission circuitry and may be used in determining a starting point of the first range.

Another factor that may be considered relates to the tag transmission range and the distance at which tags may be expected to be located. This may affect both the starting point of the first range as well as the size of the first range. For example, if objects in one system are known to be located within a small range, then the earliest possible time which a signal may be received by an antenna of a cell controller is earlier than a time of a different tag in another system in which objects are known to be located farther away from the transmission source. This may affect how many of the received signals which occur earlier in the sampling may be disregarded.

Generally, the data collection event, the transmission of the signals, and the anticipated hardware delays and other timing delays may be calibrated in accordance with the starting point of the collection or sampling. In one particular embodiment, due to the calibration of the transmitting and the data collection as well as the anticipated delays, approximately the $70^{th}$ sample was determined to be the beginning of the first range because this was one of the earliest points at which a return signal may be expected in a particular embodiment. Also in this embodiment, the actual span or size of the first range is 26 which was determined in accordance with the anticipated range of distances of objects to be located.

At step 2004 auto-correlation is performed for the first range of samples producing a magnitude for each sample in the first range. The performing of auto-correlation upon received signals was previously described. For example, FIG. 5B shows the results of performing auto-correlation upon the wave form 500 as shown in FIG. 5A. However, the waveform 510 of FIG. 5B does not include any "noise" in addition to the originally transmitted signal 500 as shown in FIG. 5A. One preferred embodiment implements the auto-correlation portion using a field programmable gate array (FPGA). The ability of the FPGA to perform massively parallel operations, such as matrix operations, efficiently in hardware is one factor in considering using the FPGA to perform the auto-correlation function of step 2004. Generally, use of particular hardware, such as the FPGA, may reduce the real time calculations and computational costs associated with performing expensive matrix operations, as in the method steps of FIG. 15B.

Generally, in the calculation of the autocorrelation function, 254 consecutive samples of received data ("sample waveform") are compared with an idealized version of the same data ("reference waveform"). If a coherent demodulation is available, then a real correlation may be performed. Otherwise, a complex correlation may be performed. Autocorrelation may generally be defined as the integral:

$$\psi(t) = \int_{-\infty}^{\infty} f(t-r) dt$$

The above equation is a measure of the similarity between a signal and a phase shifted replica of itself. An autocorrelation function is a plot of autocorrelation over all phase shifts (t−r) of the signal, where ▲t, the change in time, is in half-chirp intervals.

For a 127-chip sequence, sampled once every half chip, each correlation calculation takes 254 multiply-and-add operations, and calculating the entire autocorrelation function takes $254^2$ which is approximately 64,000 multiply and add operations. If a complex reference waveform is used, computational complexity is increased by a factor of 4. Even with very fast hardware or specialized signal processing hardware, this number of calculations may cause a "bottleneck" due to the amount of time required to perform the calculations.

A correlator implemented in hardware can generally make a quick estimate of tag location by combining various techniques, some as described above and other which will be described in the paragraphs that follow.

Since the reference waveform generally includes 1's and −1's, 2's complement arithmetic may be used for the multiplication operation. With this simplification, one of ordinary skill in the art may implement the foregoing using a field programmable array (FPGA) and/or semi-custom or custom ASICs, enabling operations to take place in parallel and with generally high throughput.

It is generally not necessary to calculate each interval of the autocorrelation function. Some of the range may be ignored because the tag is low-powered and can only be detected at a limited distance. For example, if the tag's radio has a maximum range of 100 meters, there is no reason to perform the autocorrelation function with phase shifts corresponding to the distances in excess of 100 meters. Additionally, in searching for the leading edge, phase shifts of a full chip or more may be used to search for the signal, and then half-chip intervals may be used in the neighborhood corresponding to the time when the first signal is detected. More generally, a subset of the 254 autocorrelation offsets may be used in the search for the peak or the rising edge of the autocorrelation function This is described in more detail in paragraphs below.

At step 2006, heuristics are used to select a sample point which approximates where in the first range of received signals is the received tag signal. Generally, step 2006 produces a rough estimate as to the timing of the returned signal. This selected sample point is used, in connection with step 2008, to further refine and limit the sampled data points considered in determining the returned signal. One heuristic or technique which may be used to approximate the location in the first range of the received tag signal is related to the strength or magnitude of the signals within the first range. By looking for the autocorrelation peak in the first subset, this corresponding signal may be used in approximating where the received tag signal may be located. Generally, this is based upon the premise that the strongest received signal corresponds to the direct path of the received tag signal.

The rising or leading edge detection technique is a second heuristic that may be used to approximate where in the first range of receive signals is the actual receive tag signal. Generally, the samples are observed until a large or significant change in slope is detected. The actual determination of what is "large" or "significant" is relative to each system and varies with each implementation. One technique used with the rising or leading edge detection may include using a normalized value from 0.0 to 1.0 where 1.0 corresponds to the signal with the maximum amplitude received. When two points are encountered in which the slope of the line formed between these two points is greater than, for example, 20 percent of the normalized value, then this change may be considered large enough to signal a significant change in slope. Generally, the rising edge detection technique is based upon the assumption that the first peak is the line-of-sight returned signal. Note that this is different than the premise or assumption of the first technique which is based upon the assumption that the strongest returned signal is the returned tag signal.

Yet another heuristic is a threshold detection technique. A threshold value is determined, and the first sample point having a magnitude greater than or equal to this threshold is the selected sample point. The threshold value chosen varies with environmental and implementation. Running trials of the system is one suggested method for choosing a threshold value.

At step 2008, a second range of samples is determined which is a subset of the first range of samples using the approximated location as determined in step 2006. In determining the second range of step 2008, the precise starting and end point as well as the size or span of the range must be determined. Both the span of the second range as well as the precise starting and to ending points of the second range may be related to or dependent upon the heuristic used to approximate the location of the received tag signal in step 2006. For example, if the peak or maximum amplitude of the received signal were used in determining the approximate location of the receive tag signal, one common technique would be to take a specified number of equal points to the right and to the left of this peak and use this to correspond to the span and beginning and end points of the second range. If a different technique were used, such as the leading or rising edge detection technique, a varying number of points before and after the rising edge may be used. One preferred embodiment, for example, may use the rising edge detection technique or the threshold detection technique. In this embodiment, a range is determined having a starting point which is three to the left of the rising edge, and eight points to the right of the rising edge.

The second factor to be considered is the actual size of the second range. It should be noted that the size of the second range in one particular embodiment is 12. The reasons and factors that may be considered when choosing the size of the second range will become more apparent in light of following paragraphs describing the different operations which are performed upon the second range of data.

In step 2010, the recursive least squares (RLS) technique using the second range of samples is performed. Generally, the RLS technique is used in the design of adaptive transversal filters and is based upon the least-means square adaptation method, as generally known to those skilled in the art. Functionally, the RLS technique used in step 2010 is used to filter out the noise component of received signals. In this embodiment, the RLS technique is used to filter out the noise components of the second range of sampled receive signals. The precise steps and how the RLS algorithm works are disclosed in the paragraph that follows.

At step 2012, a vector of filtered samples corresponding to the second range of samples being filtered are produced. As previously described, this vector contains values which correspond to filtered received signals.

At step 2014, the approximate peak corresponding to the filtered received tag signal is determined using the values included in the vector. Detail is described in the paragraphs that follow regarding how the peak is approximated using the values included in the vector produced by step 2012.

In step 2016, the tag distance is determined using the time of the filtered received tag signal. The precise details of how to determine tag distance using the time of the filtered received tag signal were previously described based upon the difference between transmission time and receipt time of the tag signal.

One of the functions of the signal processing hardware 1004 is to filter the noise component out of a received signal. Before describing detailed steps of how the RLS technique is used in performing this filtering process, a general description of how the RLS technique is used in a feedback control system to perform this filtering function is described.

Figure 16:
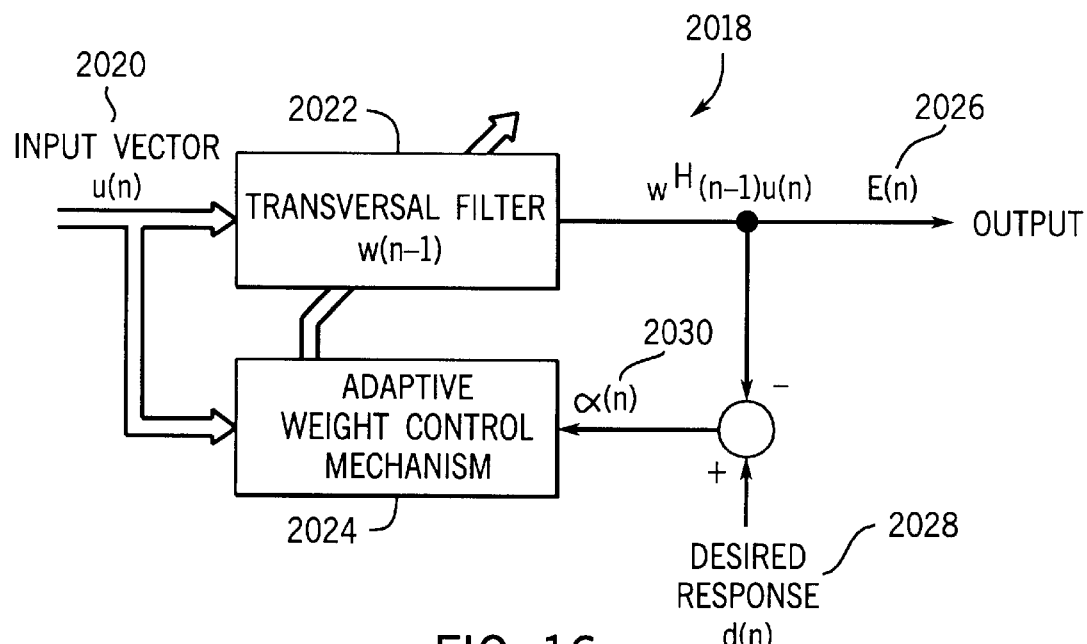
FIG. 16 is a block diagram of an embodiment of a signal filtering technique.

Referring now to FIG. 16, shown is an example of an embodiment of a block diagram of a feedback control system which filters out noise components of received signals. Generally, the function of the block diagrams of FIG. 16 combined filter out the noise components of a received signal. In this particular embodiment, FIG. 16 depicts a feedback control system which includes a transversal filter 2022 and an adaptive weight control mechanism 2024. Generally, the transversal filter 2022 operates upon an input signal u and represented as an input vector u(n) with a varying number of components. The transversal filter produces an output signal E(n) which provides an estimate of the desired response d(n) 2028. In this instance, the desired response or signal d(n) is the actual received signal. The estimated signal E(n) produced by the filter is compared with the desired response signal 2028 to produce an error estimation $\alpha(n)$ 2030. This estimation error $\alpha(n)$ is the difference between the desired response signal d(n) and the estimated signal E(n) 2026 as produced as an output by the transversal filter. This error is value $\alpha(n)$ 2030 is used as an input and feeds back into the adaptive weight control mechanism 2024. The adaptive weight control mechanism 2024 is a mechanism for performing the adaptive control process by varying certain parameters which feed back into the transversal filter 2022.

Generally, the transversal filter 2022 may also be referred to as a tap delay line filter. Further description and details of the transversal filter is described in paragraphs that follow in connection with FIG. 17. In this particular embodiment, the RLS algorithm extends the use of the method of least squares to provide a recursive algorithm for the design of adaptive transversal filter such that, given the least squares estimate of the tap weight vector, w(n−1) of the filter at time n−1, the updated estimate of this vector at time n may be computed. The estimated signal E(n) 2026 is denoted as $w^H(n-1)\,u(n)$. The precise notation of this will be described also in paragraphs that follow.

Figure 17:
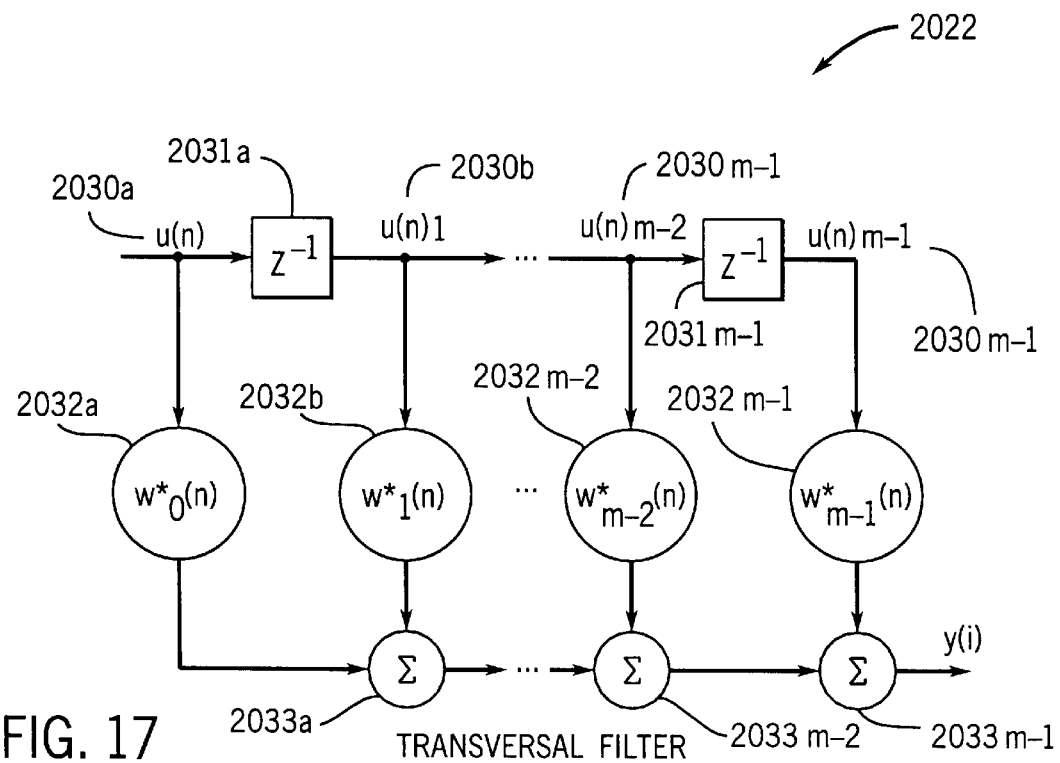
FIG. 17 is a block diagram of an embodiment of the transversal filter of FIG. 16.

Referring now to FIG. 17, shown is an example of one preferred embodiment of a transversal filter 2022. Generally, a transversal filter includes three basic elements: unit delay elements (2031a–2031m), multipliers (2032a–2032m-1), and adders (2033a–2033m-1). In particular, when unit delay operator 2031a operates on input u(n), the resulting output is $u(n)_1$. The role of the multiplier 2032a in the filter is to multiply the tap input 2030a by a filter coefficient referred to as a tap weight denoted $w^*_0(n)$. It should be noted that the asterisk in FIG. 17 denotes complex conjugation which assumes that the tap inputs, and therefore the tap weights, are all complex values. The combined function of the adders in the filter is to sum the individual multiplier outputs and produce an overall filter component denoted y(i). In this particular embodiment shown in FIG. 17, the number of delay elements is shown as m−1. This is commonly referred to as the order of the filter. Each of the components 2031b–2031m-1 operates in a manner similar to 2031a. Similarly, multipliers 2032b–2032m-1 operate similarly to the multiplier 2032a. Generally, the input signal u(n), and the tap weights denoted w(n) are represented as vectors with each element of the vectors corresponding to various components. When the various components are summed, they produce an estimated signal denoted y(i) in FIG. 17. u(n) denotes the tap input vector at a particular time n. The tap weight vector w(n) defines the tap weight vector at a particular time n.

Generally, the recursive least squares or RLS technique attempts to choose a tap vector w(n) which minimizes the expected squared error. The error is determined as the sum of the differences between the expected or actual signal and the estimated signal output from the filter. The adaptive weight control mechanism 2024 of FIG. 17 is used to determine the weighting factor associated with each of the errors at a particular point in time where the error is the difference between the desired response or the actual output signal, and the estimated signal produced by the filter. The use of the weighting factor is intended to ensure that data in the distant past is "forgotten" in order to afford the possibility of following the statistical variations of the observable data when the filter operates in a non-stationary environment. Thus, use of the weighting factor allows additional weight to be given to the error values which are most recent in time, and give less weight to those error values which are earliest in time. The precise use of a weighting factor and how it relates to the measure of the "memory" of the RLS technique will become more apparent in following text.

At Generally, the adaptive weight control mechanism 2024 provides a correction factor which is applied to the tap weights upon subsequent processing of data. In other words, a correction factor determined at time n is applied to the tap weight at a time of n+1. As known to those skilled in the art, a scaled version of the inner product of the estimation error and the tap input denoted u(n−k) is computed for k=0,1,2 . . . to m−1. The result obtained defines this correction factor which is applied to the tap weights. Thus, the error factor provides for adjustment or correction of the various tap weights. This is the nature of the feed back mechanism of the system 2018 of FIG. 16.

The previous descriptions regarding FIGS. 16 and 17 present a general description of the transversal filter and its corresponding adaptive control mechanism as generally known to those skilled in the art of adaptive filter theories as may be used in digital signal processing, for example.

Now what will be described is the RLS algorithm as generally set forth in the textbook entitled "Adaptive Filter Theory", by Simon Haykin, ©1986 by Prentice Hall, Inc.

Figure 18:
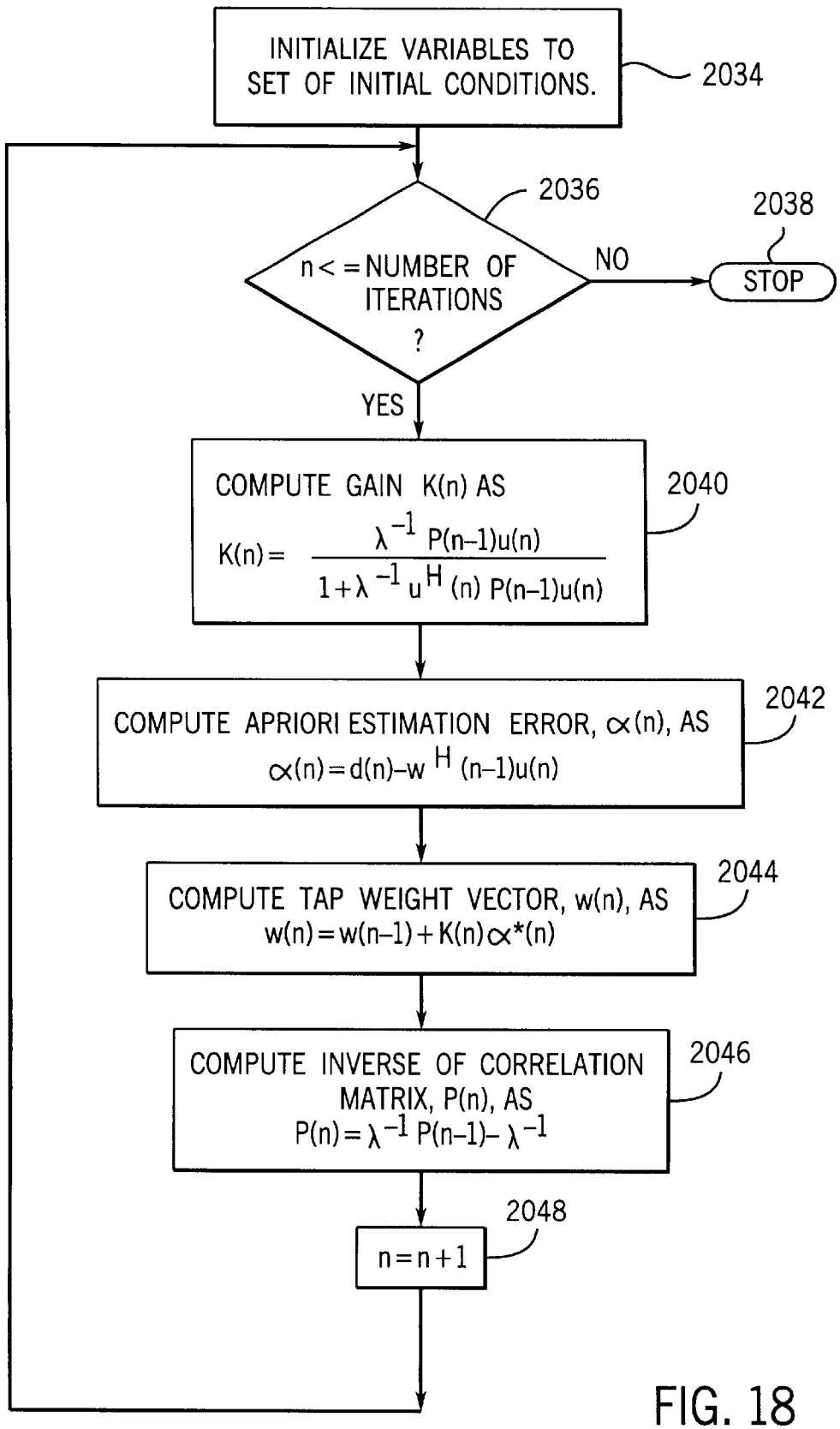
FIG. 18 is a flowchart depicting method steps of one embodiment of the recursive-least to squares (RLS) technique as used in a method step of FIG. 15B.

Referring now to FIG. 18, shown are method steps of an embodiment for performing the recursive least squares (RLS) method. At step 2034, variables are initialized to initial conditions. Generally, this includes variables used in subsequent method steps such as the loop control variable n. Some of the variables used in FIG. 18 processing steps are initialized to a set of initial conditions. Specifically, n is initialized to one in the method described in FIG. 18. The tap weight vector w and the tap input vector u may be initialized to 0. The inverse of the correlation matrix denoted P(0) may be initialized to the inverse of a small positive constant time the identity matrix denoted I. The recommended choice of the small positive constant $\lambda$ is that it should be small when compared to 0.01 times the variance of the data sample u(n).

Generally, $\lambda$ is a small positive constant which may be referred to as the "forgetting factor". Since this constant is between zero and unity, multiplying a variable by $\lambda$ reduces the magnitude of the variable. Using the RLS technique, a weighted sum of square errors is minimized by choosing a vector of coefficients. In this summation, the squared errors in the "past" are weighted by higher powers of $\lambda$ that are more "recent" squared errors. Thus, the coefficients produced by the RLS technique is generally chosen with less regard for errors in the past.

There are many "rules of thumb" for choosing $\lambda$ which may depend upon the variance of the data, the variance of the additive noise, the number of components to be determined, and the rate of change of the underlying system to be estimated. It may generally be helpful to note that the effective number of errors which are not yet forgotten is approximately 1/(1−$\lambda$). A forgetting factor of $\frac{1}{100}$, for example, yields roughly 100 significant errors. If the underlying system to be estimated is time invariant, then $\lambda$ should be set as close as possible to unity. In the instance of a time-varying system, $\lambda$ should generally be chosen such that:

$1/_{1-\lambda} > 3*$(the number of coefficients estimated)

and such that generally:

$1/_{1-\lambda} \leq$ the number of samples for which system is approximately constant.

The former condition generally reflects the fact that the RLS technique provides a converged solution in 3 to 5 times the number of coefficients for cases in which the additive noise is not too severe. The latter condition reflects the fact that the RLS technique attempts to find, for each sample input, a single vector of coefficients which may be used to approximate the last $1/_{1-\lambda}$ outputs of the time-varying system.

In accordance with principles described in the Haykin textbook, certain factors should be considered when initializing values for use with the RLS method. In particular, regarding a starting value for P(0), a starting value should be chosen which assures the non-singularity of the correlation matrix.

After initialization, control proceeds to step 236 where a determination is made whether or not the loop control variable n is less than or equal to the number of desired iterations. If the determination is made that n is greater than the number of desired iterations, meaning that execution of the method steps of FIG. 18 is complete, control proceeds to step 238 where the method depicted in FIG. 18 stops. If a determination is made at step 2036 that n is less than or equal to the number of iterations, then control proceeds to step 2040. At step 2040, the gain denoted k(n) is computed as:

$$k(n) = \frac{\lambda^{-1} P(n-1) u(n)}{1 + \lambda^{-1} u^H(n) P(n-1) u(n)}$$

Control proceeds to step 2042 where the a priori estimation error denoted α(n) is computed. α(n) is computed as:

$$\alpha(n) = d(n) - w^H(n-1) u(n)$$

Control proceeds to step 2044 where the tap weight vector for a particular instance in time denoted w(n) is computed as:

$$w(n) = w(n-1) + k(n) \alpha^*(n)$$

Control proceeds to step 2046 where the inverse of the correlation matrix denoted P(n) is computed as:

$$P(n) = \lambda^{-1} P(n-1) - \lambda^{-1}$$

Control then proceeds to step 2048 where the loop control variable n is incremented by 1. Control proceeds to the top of the loop at step 2036 where a determination again is made whether or not the loop formed by steps 236–248 has been performed the desired number of iterations.

It should be noted that the method step 2044 describes the adaptive operation of this method whereby the tap weight vector w is updated by incrementing its old value by an amount equal to the complex conjugate (denoted by an *) of the a priori estimation error α(n) times the time varying gain vector k(n), hence the name "gain vector". The a priori estimation, denoted α(n) represents the a priori estimation error. Generally the a priori estimation error refers to an estimate of the error based on a tap weight vector that was made at time n−1. The constant λ is a value close to . 1−λ. "represents a measure of the memory of the algorithm". As previously described, this is a weighted value introduced in a definition of the cost function based on the error at time n. Generally, λ is a positive constant close to but less than 1. When λ equals 1, we have the ordinary method of least squares. The inverse of 1 minus λ, generally speaking, is a measure of the memory of the algorithm. The special case where λ equals 1 corresponds to having infinite memory. As previously described in accordance with the use of a weighting factor being associated with the error at each particular point in time, λ is used in determining the actual weight given to particular values of the error determined at different points in time.

It should generally be noted that this algorithm is deemed to be "recursive" for the fact that updating the tap weight vector at time n, a prior value for the tap weight vector at time n−1 is used. This becomes apparent when method step 2044 is examined where the tap weight vector denoted w(n) is computed as being dependent upon the value w(n−1). It should also be noted that in the flowchart of FIG. 18, the asterisk denotes the complex conjugate of a number. Additionally, the superscript of H, as depicted in step 2042 when associated with the tap weight vector w, implies that the tap weight vector w has the Hermitian property. Generally, a complex valued matrix such as the tap weight vector w(n) is Hermitian if it is equal to its conjugate transpose, as known to those skilled in the art.

Referring back to FIG. 15, step 2010 performs the RLS technique just described using the second range of sample receive signals. Also recall that a note was made that the size or span of the second range may generally be related to use of the RLS technique. The RLS technique performs matrix operations which are generally expensive in terms of computing time and resources. Thus, this expense is often a factor to be considered when determining the size of the second range in that the size of the second range affects the dimensions of the matrix and hence the number of matrix operations which are performed in computations of the RLS technique for the second range of samples. Additional factors should also be considered when choosing the size of the second range. Generally, if the number of points considered in the second range is too large, and the noise component of the receive signal includes tonal frequencies or jammers, then the model may follow the peaks of the jammer signals rather than properly fit a curve identifying the filtered received signal. Additionally, if the size of the second range is too small, then enough points may not be considered to properly fit the curve. It should generally be noted that the number of points or data samples to be included in the second range varies with the system and implementation.

The RLS technique used in this embodiment assumes that the observed sequence includes a linear combination of a known number of the data sequence. Generally, the RLS technique attempts to find the combining coefficients for this linear combination which best fits the observation. Generally, the RLS technique assumes a wide-sense stationary process. Generally, the RLS technique also presumes the presence of random additive noise which is uncorrelated with the data sequence. With the presence of "white noise", the sum process remains generally wide-sense stationary. However, with the addition of a tonal frequency or jammer frequency, the sum process is no longer wide-sense stationary. To use the RLS technique when the sum process is not wide-sense stationary, such as may be in the application of this embodiment as used indoors, a corrective factor should generally be considered. One corrective technique that may be considered is in choosing the number of coefficients or taps. In this instance, with the sum process not being wide-sense stationary, care should generally be taken to insure that the number of coefficients are not overspecified when using the RLS technique. In this embodiment, the noise input to the correlator may be modeled as the superimposition of two components: a wide-sense stationary white noise process, and a non-stationary intermittent plurality of tones of unknown frequencies and amplitudes. Based on this model for this particular embodiment, it is found that the number of coefficients or taps should generally span the main peak of the impulse response magnitude. However, the number of taps should generally not span more than this in this particular embodiment.

Generally, the number of taps may vary with embodiment and application. For each application and embodiment, the observed process should be modeled to take into account all factors and a number of taps chosen in accordance with these considerations as described herein.

As just described, factors that may be considered when choosing a size for the second range include consideration of the time complexity regarding computational expense as well as application for real time considerations when performing complex calculations. Additionally, ids the size of the second range varies with the environment in which this application will be used. If there will be tonal frequencies, such as a microwave oven within an indoor environment, this should be considered when choosing an appropriate value for the second range. In one preferred embodiment, a value of 12 was used for the size of the second range for an indoor article tracking system which included the previously described transmission rate of 127 bits per second in a sample of 254 points of received. This indoor system may possibly have tonal frequencies and other jammer signals since it is an indoor application as well as multipath noise. Thus, a range size of 12 for the second range was used considering these factors.

Generally, the steps describing the RLS technique of FIG. 18 may be performed using a different data sample set for each execution or iteration of the loop. In one particular embodiment, one data set of 254 received signals was recorded. Rather than perform the method steps of FIG. 18 with a different set of 254 data samples each time the method steps of FIG. 18 were performed for a particular iteration, the same data set is used for each iteration. Ideally, the number of iterations of the RLS algorithm should be as large as possible in order to meet the mathematical convergence for simulating when n goes to infinity. However, in one preferred embodiment, the method steps of FIG. 18, as described in the loop formed by steps 236 through 248, are performed for 84 iterations. Through experimentation for this particular embodiment, it was determined that this was an optimal value to be used in the tradeoff of real time application, computational complexity, and accuracy of locating an object. For other systems and other applications, this number may vary.

As an output of the RLS method performed in step 2010, a vector of filtered samples is produced in step 2012. Each element in this vector corresponds to a component of a received signal which represents a filtered signal. In other words, each element of the vector corresponds to a filtered signal with the noise portion removed. The vector produced in step 2012 is a vector of filtered signals in which each element of the vector corresponds to an element of the second range. The RLS technique performed in step 2010 removes the noise component and returns a filltered signal.

At step 2014, using the data points included in the vector of step 2012, a technique is applied which approximates the peak corresponding to the filtered received tag signal. A more detailed description of step 2014 is set forth in paragraphs that follow in connection with FIG. 20.

Referring now to FIGS. 19A–19E, shown are sample waveforms of received signals for a number of sample points. In FIG. 19A, shown is an example of a correlated received signal with a small amount of "white noise". It should be noted that the waveform of FIG. 19A generally does not include a multipath component, as would be seen in the system of the embodiment described herein. FIG. 19B shows a waveform with a low degree of indoor multipath components as may be included in a received signal. FIG. 19C illustrates a waveform that includes a medium degree of severity of indoor multipath noise in addition to a transmitted signal, and FIG. 19D shows a severe amount of indoor multipath noise added to a transmitted signal. Each of the waveforms shown in FIGS. 19B–D are waveforms that may be received in different environments within which a preferred embodiment of the invention operates. Shown in FIG. 19E is a correlated waveform, labeled "correlation", which is also typical as the output waveform after performing step 2004 of FIG. 15. The second waveform, labeled "model" in FIG. 19E, is an example of a waveform resulting from graphing the 12 points included in the second range of samples which is output from the RLS technique in one preferred embodiment. As previously described, this vector may be produced in step 2012 after performing the RLS technique in step 2010. The peak of the actual waveform, for example, may be approximated in step 2014, as the $4^{th}$ data point of the "model" waveform of FIG. 19E.

In this particular embodiment, the transmission rate is 127 chips per data bit. In other words, the bit pattern of the transmitted signal repeats itself every 127 bits. A lesser number bit sequence such as 31 chips, may also be used in a particular implementation which requires less processing time and less number of samples to be taken. However, the gain is lost as you decrease the number of patterns in the bit sequence. A longer bit sequence generally allows for a greater distribution of energy over a larger period of time. A longer sequence generally enables a stronger signal at the output of the correlator than that produced by a shorter sequence. The processing gain indicates this signal strength enhancement and refers to the number of bits in the sequence.

Other factors regarding a bit sequence which should be considered when implementing the techniques described herein relate to the properties of the bit sequence regarding auto-correlation and cross-correlation. For example, a maximal sequence has good auto-correlation but bad cross-correlation. Thus, a transmitted signal which is a maximal sequence would produce an idealized peak waveform, for example as shown in FIG. 5A. However, the cross-correlation of such a sequence may not be desirable in an embodiment where better cross-correlation is required. For example, in an embodiment where one is required to detect or reduce the interference between multiple transmitted signals, good cross-correlation is often needed. For applications such as this where one is required to distinguish between multiply transmitted signals, a sequence such as the Gold code may also be used. It should be noted that the precise sequence length as well as the various properties of the sequence sent in the transmission signals may vary with application and each particular implementation.

In the previously described embodiment, a local positioning system was described in which the assumption is made that the articles or persons being tracked by the system may be at a different position at any particular point in time. In other words, there is no assumption that the person or object will remain stationary for a majority of time. In an application of a system which includes the local positioning system and the techniques described herein, if the objects being located are primarily stationary for a majority of the time, then special processing may be performed in the atypical case when an object is determined or sensed to have moved, as by a motion detector. When motion of a primarily stationary device has been detected, special processing may be performed using the techniques previously described. Since it is the atypical case in which the location of an object is to be determined, in the small number of instances when the location of an object or person needs to be determined, the system may devote additional processing time to locating the object. Thus, in an application of article tracking in which the objects tend to remain stationary, minimizing the amount of computational time to the extent as previously described may not be a factor in selecting, for example, the size or span of the second range.

It should be noted that various portions of the signal processing hardware 1004 may be implemented in varying combinations of software and/or hardware dependent upon the particular application and system implemented. For example, in one preferred embodiment, the auto-correlation function performed in step 2004 on a first range of samples is implemented in a FPGA, as previously described. Dependent upon each particular system, application, and requirements of each system, other functions of the signal processing hardware 1004 as described herein may be implemented in varying combinations of software and/or hardware.

In one of the previously described embodiments, the same data set was used when performing multiple iterations of the RLS algorithm of FIG. 18. As an alternative to using the same data set for each iteration, a single data set set may be "reused" on subsequent iterations with slight modifications, such as rotating or shifting to the right or to the left by one data element for each iteration.

Figure 20:
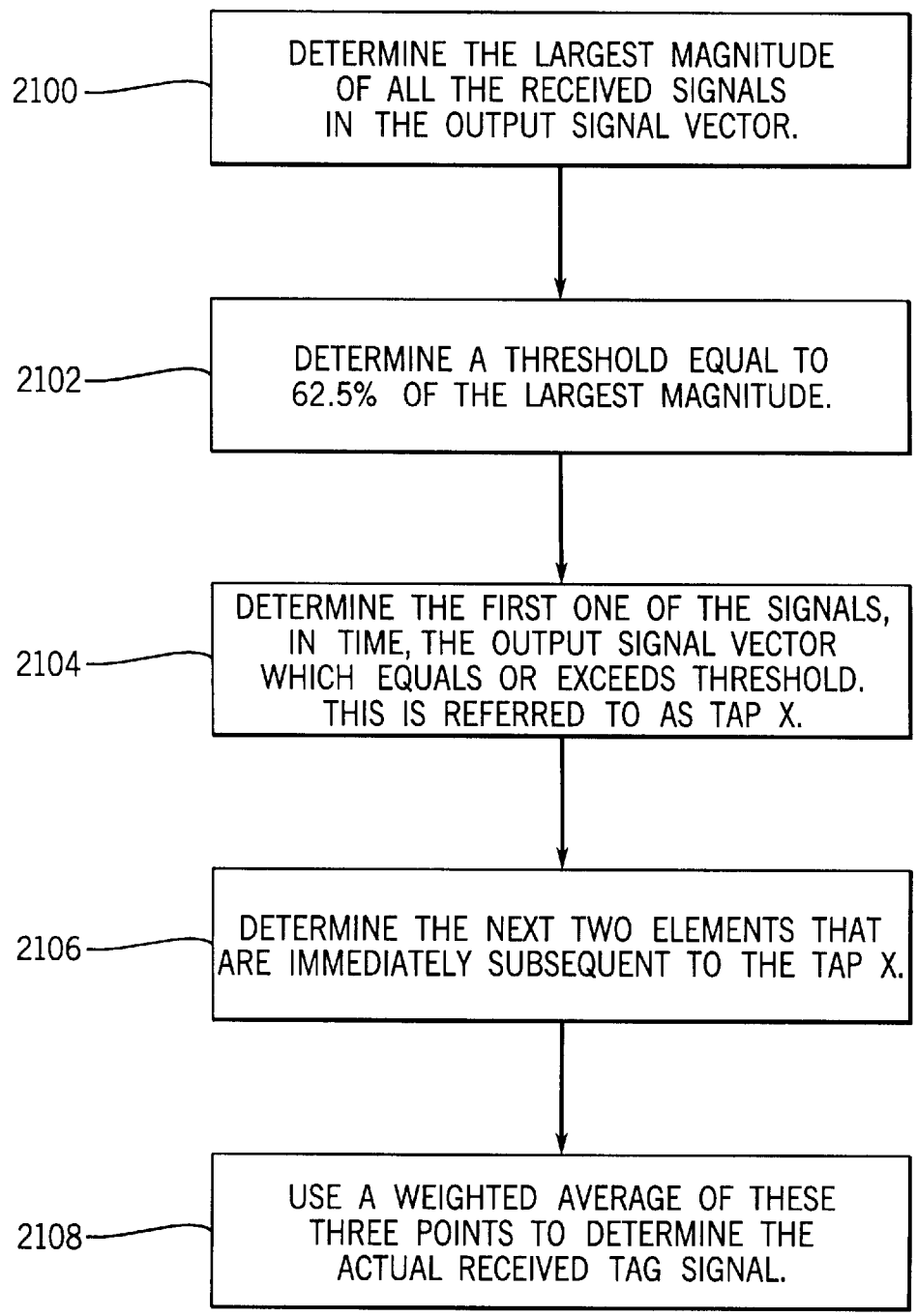
FIG. 20 is a flowchart depicting method steps of one embodiment of approximating a peak of the filtered tag signal.

Referring now to FIG. 20, shown are example steps of a method for approximating the peak corresponding to the filtered receive tag signal using the values included in the output signal vector produced as a result of step 2014. The method steps shown in FIG. 20 are more detailed steps of the method step previously described for step 2014 of FIG. 15. For all of the magnitudes of the signals included in the output signal vector, determine the largest magnitude, as in step 2100. It should be noted that in one embodiment, if the first or last element of the vector has the largest magnitude, then an assumption is made that the received signal cannot reliably be determined, and the method stops execution.

Subsequently, in step 2102, a threshold value is determined which, in one embodiment is equal to 62.5 percent of this largest magnitude previously determined in step 2100. At step 2104, it is then determined which element in the output signal vector is first in time to exceed the threshold value. This signal determined to be first in time to exceed the established threshold is referred to as the X. It should be noted that in one preferred embodiment, if the "$X+1^{th}$" element of the vector is smaller than the magnitude of the "$X^{th}$" element, then the "$X-1^{st}$" element is used rather than the "Xth" element.

At step 2106, other elements of the vector are selected to be used in subsequent processing steps to determine the actual received signal. In one embodiment, two other elements are generally chosen. These are the vector elements denoted by the indices "X+1" and "X+2". It should be noted that the element indicated by the index value "X+2" is not used if the "Xth" element is the second to last vector element. In step 2108, using a weighted average formula of these 3 points, the actual received tag signal is determined based on the expected shape of the received signal as being a correlated signal with a triangular peak. One embodiment calculates or estimates the received tag signal as indicated in the pseudo-code type description below. It should be noted that the description below generally summarizes that which is set forth and previously described in conjunction with the method steps of FIG. 20.

```
Total = 0
FOR each element in the vector, v, DO
{
Determine the weight of current vector element, denoted by index=j, as:
      weight v[j] = MAX(0, magnitude(vector element j) –
                        (largest magnitude of all vector elements/4))
Total = total + weight v[j]
}
Received signal = X+1 – (weightv[X]/Total) + (weight v[X+2]/Total)
   or
Received signal = [X+1 – (weightv[X]/Total) /** if element X+2 is not
                                used and is the second to last
                                element of the vector**/
```

The following points are worth noting regarding the previously described embodiments of the signal processing hardware 1004 and previously described method steps of FIG. 15B. In one of the previously described embodiments of the signal processing hardware which includes only the correlator 1800, method steps 2008–2014 of FIG. 15B are not performed. Rather, only method steps 2000–2006, and 2016 of FIG. 15B are performed. Specifically, in this embodiment the autocorrelation (step 2004) is performed by the correlator 1800. The approximation produced as a result of using the heuristics at step 2006 is considered to be the received tag signal. A first heurisitic, as used in step 2006, determines the received tag signal to be the signal in the first range with the maximum magnitude of all the signals in the first range. A second or alternate heurisitic that may be included in an embodiment (at step 2006) is to choose a threshold value. The first signal included in the first range having a magnitude equal to or exceeding this magnitude is determined to be the received tag signal. The method for choosing the threshold value may vary with environmental and other factors particular to each implementation. Generally, this threshold value is selected in accordance with trial test runs of particular implementations to allow for "tuning" the threshold value. Using either heuristic, this received tag signal is then used (step 2016) in determining the tag distance.

Other embodiments of the signal processing hardware 1004 may include other hardware components in accordance with the particular digital signal processing requirements in a particular embodiment. Each particular embodiment may be implemented in using a variety of combinations of hardware components, including, but not limited to, gate arrays and read-only-memory. Additionally, other embodiments of the signal processing hardware may be implemented as some combination of hardware and software in which the machine executable code may be executed on a computer system, such as the microprocessor 1001 or the host computer 105 or yet another computer component included in the signal processing hardware 1004 as a dedicated processing unit. The components may vary with application and design choices associated with a particular implementation.

Another embodiment of the signal processing hardware includes hardware and/or software in addition to the correlator. This embodiment may perform, for example, all the method steps of FIG. 15B, rather than only some of the steps of FIG. 15B, as in the embodiment with signal processing hardware that includes only the correlator.

The foregoing description sets forth a technique using an RLS method that affords a flexible and efficient way of filtering noise from a received signal as used in an article tracking system. Both multipath noise and tonal frequencies may be taken into consideration as factors when using the foregoing techniques in various environments within which an article tracking system as described herein may operate.

The foregoing technique for filtering a received signal is scalable for use in applications with both large and small sample sets in a variety of different environments each having different "noise" considerations while generally providing a high degree of accuracy in locating objects as required in article tracking systems as described herein.

Other embodiments are within the scope of the following claims. For example, the order of performing steps of the invention may be changed by those practiced in the field and still achieve desirable results.

An alternative embodiment includes modifications to the previously described cell controller and tag that are described in paragraphs that follow.

Chassis General RF Description

The chassis RF subsystem consists of three of the five major cell controller components: the cell controller transmitter module, cell controller receive module and the single-pole, 4 throw switch modules. The digital section and the controller section are described elsewhere. This description outlines the operation of all three elements and presents performance data.

The function of the cell controller transmitter is to modulate the digital baseband spreading signals onto the transmitter carrier to generate the direct-sequence spread-spectrum RF signal. This transmitted signal must comply with the FCC Part 15 regulations, specifically with sections 15.247, 15.209 and 15.205. The transmitted RF signal power level must be digitally adjustable over a range commensurate with the variation in path loss of the transmitted signal to the tag (about 32 dB at 2.44 GHz over 125 feet). The final radiated signal should have an effective isotropic radiated power level of about 30 dBm (1 watt).

The function of the cell controller receiver is to convert the received signal delivered by the antenna to an intermediate frequency, demodulate the spread-spectrum signal from the tag and deliver a filtered baseband signal to the analog to digital converter. The receiver also implements automatic gain control over a 50 dB range at the intermediate frequency. The function of the single-pole, four throw switch module is to properly route the combined transmit/receive/DC signals to the correct antenna.

The cell controller RF elements have some common features that are digitally controlled by signals from the microprocessor. The transmit and receive local oscillators (which control upconversion and downconversion carriers) are set digitally. The transmit power control is set with digital signals so that the total received signal SNR can be maximized over the entire path traverse of a tag (from right on top of a particular cell controller antenna to maximum distance from that antenna). The receiver gain level is digitally measured and delivered to the baseband signal processor. Finally, the transmit and receive signals are combined onto one wire (which includes DC power) and this combined signal is switched from antenna to antenna by digital control from the microprocessor. Up to sixteen antennas may be installed on each cell controller.

Cell Controller RF Description

General Description

Figure 21:
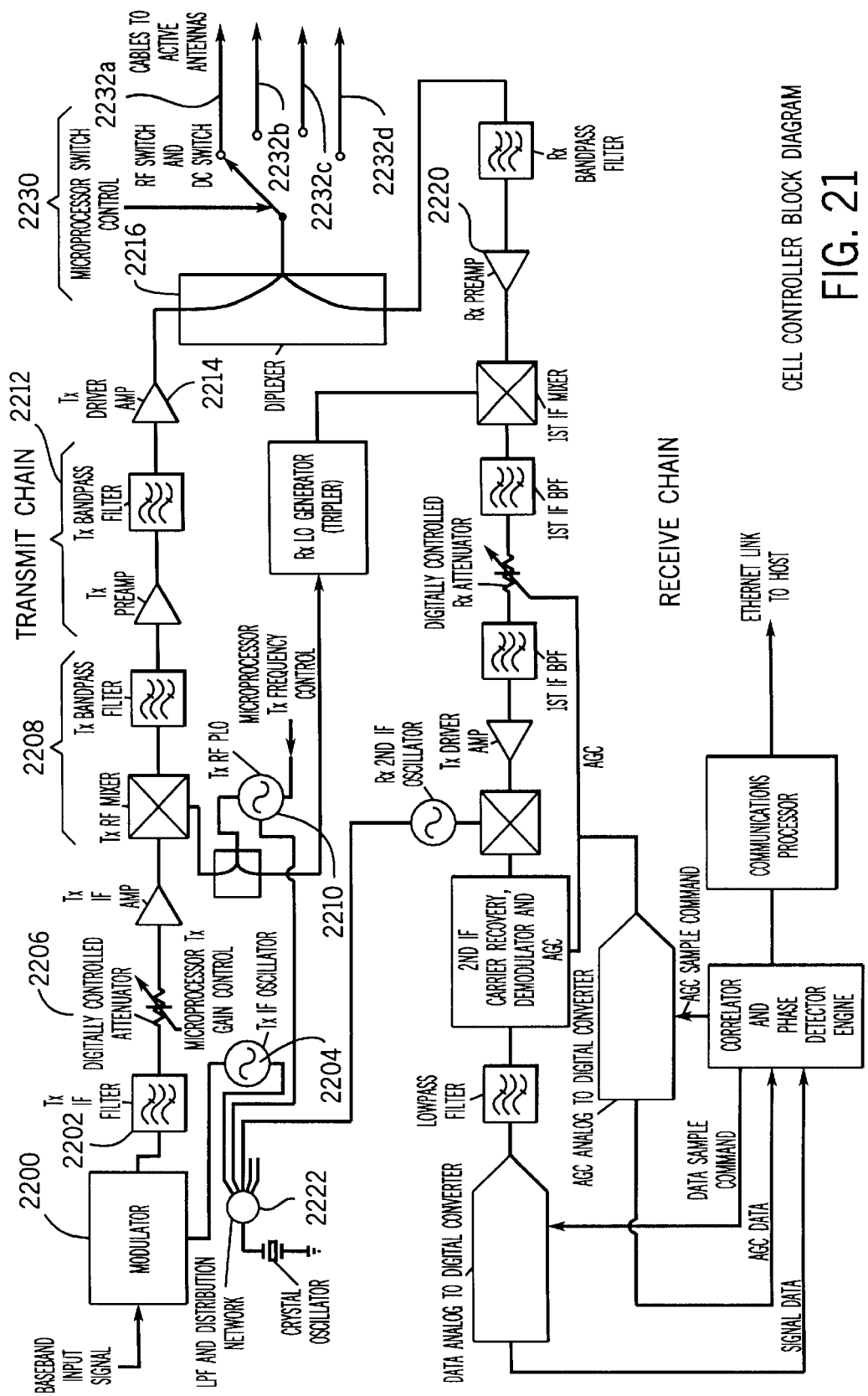
FIG. 21 is an example of an embodiment of a block diagram of a cell controller.

Referring now to FIG. 21, shown is a block diagram of an embodiment of a cell controller. The cell controller RF elements can best be understood by referring first to the block diagram of FIG. 21. The first item to note is the cell controller RF elements include active components in the antenna. This is because the signals sent up to the antenna are low in level and widely spaced in frequency. The RF cable transports the low-level Tx signal at 2442 MHz to the antenna as well as the low-level Rx signal at 5800 MHz from the antenna to the receive module in the cell controller. The cable also supplies DC power to the antenna from the chassis. Note that the transmitter module provides the first stage of RF switching to the antennas: it incorporates the "bank" switches that select which of the four SP4T (Single Pole, Four Throw) switch modules are to be used. Additionally, it incorporates the diplexer that separates transmitted signals from received signals and also a stage of Rx signal amplification.

The cell controller receive module will be briefly presented to show the frequency plan and signal flow. Also, the operation of the active antenna will be presented in detail.

Transmitter Module

In one embodiment, the transmitter module may be included in a card that fits into the main backplane of a 3DID chassis and provides the necessary transmitter signals. It receives DC to power from the backplane. It uses input signals from the digital module and provides signals to the receive module and the digital module. It provides transmitted signals to the active antennas through SP4T switch modules installed in the chassis.

Modulator 2200

The digital baseband signal that represents spread data is an input to the transmit module. It modulates a 360 MHz signal (provided by the 360 MHz LO synthesizer module) in the biphase modulator consisting of a driver and a mixer. This modulator generates a classic Sin(x)/x spectrum at 360 MHz and provides a signal level of about −7 dBm to the next stage.

IF Local Oscillator 2204

The intermediate frequency (360 MHz) local oscillator provides a carrier for the modulator. It consists of a commercial voltage-controlled oscillator, a buffer amplifier, a programmable synthesizer and a lowpass filter. The synthesizer is programmed by the microprocessor and returns its lock-detect status. The nominal output level for this LO is +6 dBm.

SAW Bandpass Filter 2202

The function of the surface acoustic wave bandpass filter is to pass through only the main lobe of the modulated signals and to remove any sideband signals. This device is a passive filter and is used unmatched. This filter provides most of the suppression of out-of-band signals needed to comply with the Part 16 regulations.

Transmit Level Control Attenuator 2206

The function of the transmit level control is to set the final antenna radiated output power to the desired level. This can be done antenna by antenna and can be tailored to the installation site. The microcontroller allows the installer to adjust each antenna's output power and stores these settings in a configuration table. As the cell controller operates each antenna in turn, it sets the transmit attenuator to the configuration value determined at installation. The transmit level control is implemented with a digitally controlled attenuator that has a 31 dB range in 1 dB steps. The attenuator is followed with a buffer amplifier.

Transmit Mixer and Bandpass Filter 2208

The transmitter intermediate frequency signal is upconverted from the intermediate frequency to the final RF frequency in the transmit mixer. This mixer uses a local oscillator signal at 2082 MHz to convert the 360 MHz transmit IF signal to 2442 MHz, the final RF frequency. The nominal LO level is +9 dBm and the mixer suffers about 6 dB of conversion loss. The mixer is followed by a 3-pole ceramic bandpass filter that serves to pass only the desired upper sideband and to reject the lower sideband and spurious signals.

RF Transmit Local Oscillator 2210

The RF local oscillator operates at 2082 MHz and provides a carrier for the transmit mixer. It consists of a commercial voltage-controlled oscillator, a buffer amplifier, a programmable synthesizer and a power divider. The synthesizer is programmed by the microprocessor and returns its lock-detect status. The nominal output level for this LO is +9 dBm. This synthesizer also provides the input tone for the receive module downconverter local oscillator (hence the power divider).

Transmit Preamplifier and Bandpass Filter 2212

The preamplifier and bandpass filter serve to boost the RF transmit signal to a level sufficient to drive the final transmit amplifier without compromising signal linearity. The bandpass filter serves to help clean up mixer spurious and to help remove harmonics. The preamplifier consists of two stages that have a total gain of about 33 dB. The amplifiers used in the preamp are identical to the buffer amplifier used in 1 the transmit local oscillator. The bandpass filter is identical to the filter following the transmit mixer.

Transmit Final Amplifier 2214

The final transmit amplifier serves to boost the transmitted RF signal to prepare for the ride through the various switches and the RF cable on its way to the active antenna. It consists of a pair of amplifiers in a balanced amplifier configuration using hybrid couplers. The gain of this stage is about 17 dB and this amplifier provides a signal of about +10 dBm (at the maximum Tx level setting). The 1 dB compression point of this amplifier is about +19 dBm. The amplifier is implemented with devices identical to the Tx preamp and the LO buffer. The hybrid couplers are implemented with the same power divider used in the local oscillator.

Diplexer 2216

The function of the diplexer is to provide separate paths for the transmit and receive signals so they can be combined onto one coaxial cable. The diplexer is implemented with microstrip technology as a lowpass-high pass filter set with a common feedpoint. The isolation requirement of each branch of the diplexer is eased by the extensive use of other bandpass filters in the transmit, receive and antenna modules. This filter is fabricated on the printed circuit board.

Single Pole, Four Throw Bank Switch

The circuitry in this section 2230 serves to route the combined Rx/Tx signals to one of four switch banks. This switch is implemented as a cascade of three GaAs singlepole, double-throw RF switches that are controlled by digital signals from another cell controller module (digital module).

Single Pole, Four Throw Switch Module

The SP4T module is a separate plug-in unit that fits into a small backplane in the 3DID chassis. One module is required for the chassis, enabling 4 antennas to be connected 2232a–d to the system. Up to 4 SP4T modules may be installed in the chassis, providing service for up to 16 antennas. The switch module RF configuration is identical to the single-pole, four throw bank switch described above. Additionally, the SP4T module implements switching to impose DC on the output ports after the RF signal has been routed. Bias tee circuitry is used to isolate the DC switches from the RF circuitry (to prevent unnecessary RF loading). Note that the number of these modules varies in accordance with the number of antennae in a particular embodiment.

Receive Preamplifier 2220

The transmit module contains the first receive preamplifier following the diplexer. This architecture was chosen because the receive signal needs to leave the diplexer and go to the receiver module through a cable, so some signal stabilization was needed. This preamplifier is implemented as a balanced amplifier with GaAs units. It has a gain of about 19 dB and the balanced configuration guarantees a good impedance to the diplexer. The hybrids for this amplifier are implemented as traces on the printed circuit board.

10 lMHz Reference Generator 2222

Each of the phase-locked local oscillators used in the 3D/D chassis requires a high-stability reference signal. This section provides a reference signal for the 360MHz IF LO, for the 2082 MHz LO and for synthesizers in the receive module. This reference generator is implemented with a commercial, high-stability crystal oscillator at 110 MHz followed by buffer amplifiers, a bandpass filter and a four-way power divider. The nominal output level on each of the four ports is 0 dBm.

Antenna Module 2300

Figure 22:
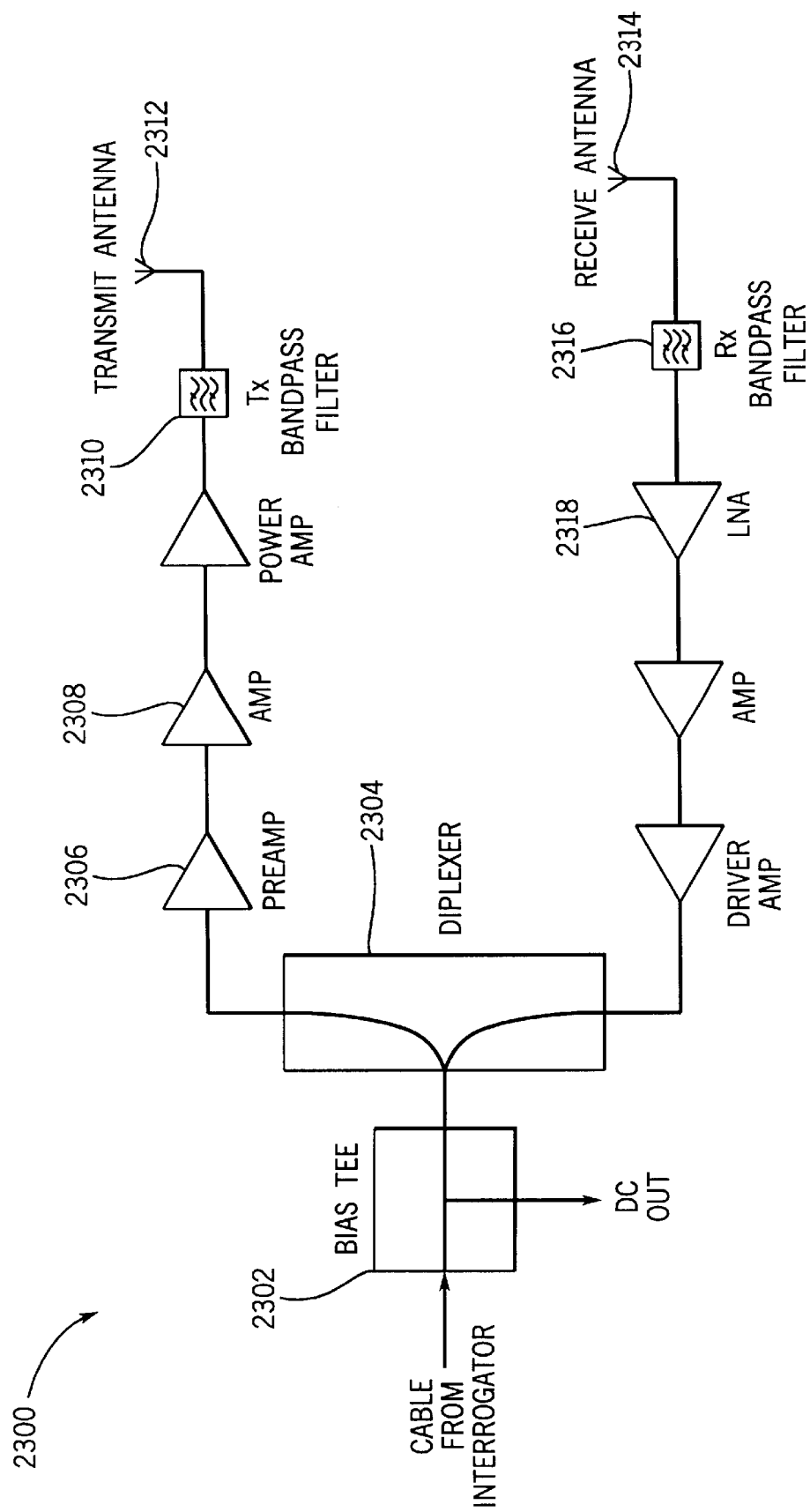
FIG. 22 is an example of an embodiment of a block diagram of a cell controller active antenna radio frequency block diagram.

Referring now to FIG. 22, shown is a block diagram of an embodiment of an antenna module. The antenna module 2300 includes a unit that mounts on the wall or the ceiling to provide the necessary radiated transmit and receive signals for a 3D/D tag. In addition to the radiating antenna arrays, the module has amplifiers and filters mounted on a printed circuit board that also provides the ground plane for the antenna arrays. All inputs and outputs for this module arrive on a 0.25" coaxial RF cable. The printed circuit board is mounted on an aluminum backing plate and has a thermoplastic radome over the antenna arrays.

Antenna Bias Tee 2302

The bias tee extracts the DC current from the coaxial cable to power the active components on the antenna module. It provides a nominal 12 volts to the regulators on the antenna module that in turn provide 8 volts and 5 volts to the appropriate amplifiers.

Antenna Diplexer 2304

The diplexer is identical to the diplexer used in the transmit module.

Antenna Transmit Preamplifier 2306

The transmit preamplifier serves to boost the low-level transmitter signal delivered by the coaxial cable to a level sufficient to properly drive the antenna final transmit amplifier. The preamp is implemented as two amplifiers that are identical to the LQ buffer amplifier in the transmit module.

Antenna Transmit Final Amplifier 2308

The antenna transmit final amplifier is implemented as a balanced amplifier using a topology and components identical to the transmit module final amplifier described above.

Antenna Transmit Final Bandpass Filter 2310

The antenna transmit final bandpass filter is a 5-pole ceramic bandpass filter centered at 5780 MHz with a passband bandwidth of about 100 MHz. The combination of the responses of this filter and the filters in the transmitter module ensure that the radiated transmitted RF signal conforms to the requirements of Part 15.247 and 15.209, especially at the allocated band edges.

Antenna Transmit Antenna Array 2312

The transmit radiating elements of the antenna module are a series-fed patch array (2 elements) whose center frequency is 2440 MHz. The 3DiD tag uses a low-cost, linearly polarized patch antenna. To prevent tag signal loss due to antenna cross-polarization for tags that are not aligned with the active antenna, the radiating elements here are circularly polarized. This choice of antenna polarization results in an additional 3 dB of effective path loss between the active antenna and the tag antenna. The gain of the transmit antenna array is about 11 dBic.

Antenna Receive Antenna Array 2314

The receive radiating elements of the antenna module are a series-fed patch array (3 elements) whose center frequency is 5770 MHz. The 3DID tag uses a low-cost, linearly polarized patch antenna. To prevent tag signal loss due to antenna cross-polarization for tags that are not aligned with the active antenna, the radiating elements here are circularly polarized. This choice of antenna polarization results in an additional 3 dB of effective path loss between the active antenna and the tag antenna The gain of the receive antenna array is about 12 dBic.

Antenna Receive Bandpass Filter 2316

The antenna receive bandpass filter is a 3-pole ceramic bandpass filter centered at 5770 MHz with a passband bandwidth of about 100 MHz. This filter serves primarily to ensure that only the desired tag signals are brought into the receive chain.

Antenna Receive Low Noise Amplifier (LNA) 2318

The antenna receive low noise amplifier is identical to the receive preamplifier described above. It is implemented as a balanced amplifier to present a good impedance to the Rx bandpass filter. The hybrids for this amplifier are implemented as traces on the printed circuit board.

Antenna Receive Buffer Amplifier

The antenna receive buffer amplifier provides enough gain to compensate for the loss of the coaxial cable that ferries the received signal to the receiver module in the cell controller. It is implemented with two stages, each having an active device identical to the one used in the low-noise amplifier. The final stage has an impedance good enough to drive the diplexer without mismatch.

Receiver Module

The receiver module is a card that fits into the main backplane of a 3DiD chassis. It receives DC power from the backplane. It uses input signals from the digital module and the transmit module. It provides signals demodulated baseband signals to the digital module for correlation.

Receive Final RF Amplifier

The receive final RF amplifier recovers the signal level lost over the RF coaxial cable between the antenna and the chassis. It is preceded by a 5800 MHz bandpass filter that is printed on the circuit board; its purpose is to remove any unwanted signals before the receive signal is demodulated. A lowpass filter follows the amplifier to remove any harmonic spurious from the demodulation chain; this filter 1 s also printed on the circuit board. The active device used here is the same as the active devices in the Rx chain on the antenna.

Receive First Mixer and LO Tripler

The amplified receive signal is downconverted to an intermediate frequency of 446 MHz in the first mixer. The mixer is driven by an LO signal at a level of about +9 dBm. The lower sideband output from the mixer is then filtered and sent on to the first IF AGC amplifier chain.

Receive First LO

The first LO signal is generated by amplifying the third harmonic of the transmitter LO signal, sent by coaxial cable from the transmitter module. The transmitter LO frequency at 2082 MHz is bandpass filtered and amplified and the third harmonic is picked off by the bandpass filter (at 6246 MHz) following the tripler. This signal is then amplified and filtered.

Receive AGC Amplifier and Gain Chain

The first IF AGC amplifier is controlled by the magnitude of the baseband signal sent on to the analog to digital converter. The purpose of the AGC signal is to keep the baseband signal at a level of about 800 mV into the ADC. This function is implemented with a cascade of two amplifiers driven by the same control voltage. The ADC amplifier is followed by a bandpass filter and gain block to ensure enough signal is present in the demodulator chain.

Receive Second Mixer

The first IF amplified signal is downconverted to the second IF in the receive second mixer. This mixer is driven by an LO signal at 616 MHz at a level of about +7 dBm. The lower sideband of the resulting signal is filtered and sent to the second IF demodulator chain.

Receive Second LO

The receive second LO at 616 MHz provides a carrier for the downconversion of the receive signal to the second IF at 170 MHz. It consists of a commercial voltage-controlled oscillator, a buffer amplifier and a programmable synthesizer. The synthesizer is programmed by the microprocessor and returns its lock-detect status. The nominal output level for this LO is +7 dBm.

Receiver Carrier Recovery

The receiver demodulator implements a data-directed carrier recovery loop that is ultimately used in the baseband downconverter. This loop performs two basic functions: it tracks the phase transitions generated in the tag and it also tracks the variation in phase of the received signal due to tag movement and tag crystal offset relative to, the cell controller reference signal.

Receive Baseband Downconverter

The second IF signal is downconverted to baseband at the baseband mixer. The LO for this mixer is derived from the receiver carrier recovery section and is at 170 MHz at a level of about 0 dBm.

Receive Baseband AGC Signal Conditioner

The baseband signal is amplified and sent off to the digital board to be digitized in the analog to digital converter. A replica of this signal is averaged and used to set the gain of the AGC amplifiers in the first IF section. This signal is also sampled by another analog to digital converter (on command from the digital module) and sent to the digital module.

3D-1D Tag (T20 Edition)

General

Figure 23:
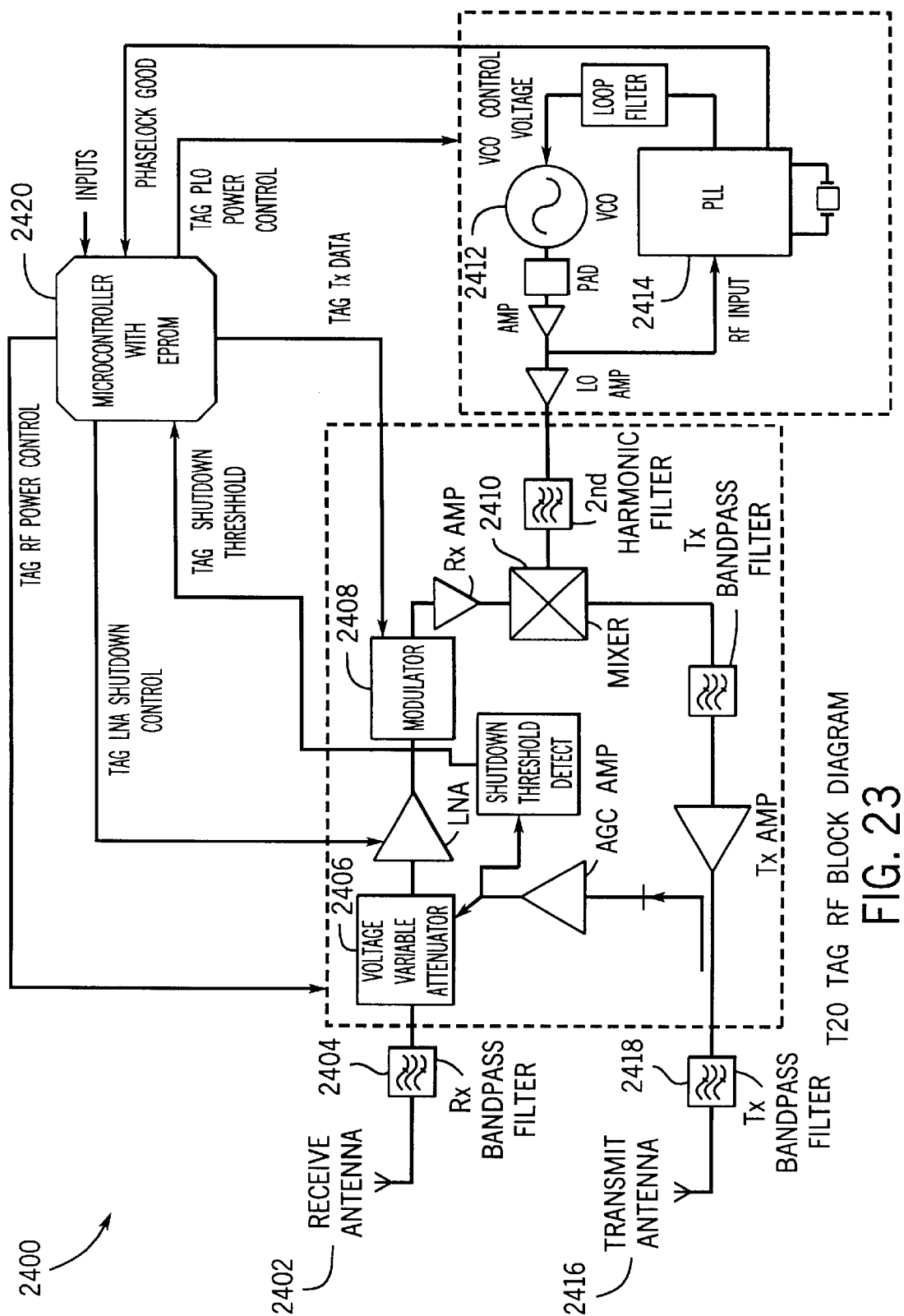
FIG. 23 is an example of an embodiment of a block diagram of a tag.

Referring now to FIG. 23, shown is an embodiment of a tag that may operate in the system of FIG. 1 and FIG. 25, that will be described further in paragraphs that follow. The tag is a low cost RF device which transponds radio signals from the cell controller transmit antenna to the cell controller receive antenna. Additionally, it modulates tag information such as the tag ID onto the signal sent to the cell controller receive antenna. The tag has three important design parameters: cost, battery life and size. Low tag cost is achieved by making the tag RIF and digital design as simple as possible while using off the shelf components. Battery life is achieved with low-current RF and digital designs and by utilizing a small duty cycle. Size is achieved by a combination of surface-mount technology and careful antenna design. The tag is compliant with FCC Part 15.249 regulations. FIG. 23 is a block diagram of the tag, showing all the major elements of the tag. FIG. 24 is an overall specification of the RF elements of one embodiment of the tag of FIG. 23. The following sections will describe the various elements of the tag in detail.

RF Input Section

The RF input section consists of four basic structures: an antenna 2402, an input bandpass filter 2404, a voltage variable attenuator 2406 and amplifier structures. The antenna element is external to the tag circuitry and for the T20 edition of the tag is a single patch having a gain of about 4.5 dB. The input bandpass filter passes RF signals over a bandwidth of 80 MHz centered at 2440 MHz with a loss of less than 2 dB and a delay nonlinearity of less than 4 nsec peak to valley. This filter is nominally a three-pole response with at least 40 dB of rejection in the tag output band of 5725–5815 MHz. The amplifier structure consists of two gain stages, each having about 18 dB of gain at 2442 MHz.

Modulator and Mixer Section

This section consists of two basic structures: the biphase modulator 2408 and the mixer 2410. In the T20 edition of the tag, the biphase modulator is implemented with a pair of single-pole, double throw switches and transmission lines that differ in phase by 1800. The mixer is implemented as a double-balanced diode quad. The sum and difference signals are present at the mixer output. The low frequency result (difference) is rejected at a highpass filter, so only the high frequency (sum) products are sent to the output amplifier.

Local Oscillator Section

This section consists of two basic structures: the phase-locked oscillator operating at half the desired frequency and the doubler. The phase-locked oscillator (at 1679 MHz) consists of a VCO 2412 centered at the output frequency, a buffer amplifier, a standard fixed frequency PLL chip 2414, a passive loop filter and a fixed crystal. The PLL chip implements a ÷512 prescaler, a phase-frequency detector and a charge pump in a single package. The doubler is implemented as an amplifier followed by a filter.

RF Output Section

The RF output section is implemented with three basic structures: an amplifier, output filters and the transmit antenna 2416. The antenna element is external to the tag circuitry and for the T20 edition of the tag is a single patch having a gain of about 3 dB. The output bandpass filter 2418 passes RF signals over a bandwidth of 100 MHz centered at 5800 MHz with a loss of less than 3 dB and a delay nonlinearity of less than 4 nsec peak to valley. This filter is nominally a three-pole response with ay least 40 dB of rejection in the tag input band of 2400–2484 MHz. The amplifier structure consists of a single gain stage having about 18 dB of gain U at 5800 MHz.

Microcontroller and Power Control Section

This section consists of two major elements: the microcontroller 2420 and the power control circuitry. The tag protocol requires the microcontroller to turn on the local oscillator section: long enough for it to stabilize fully and then to turn on the RF section. The loop bandwidth of the local oscillator is wide enough that the LO lock-time is a maximum of 0.75 msec. There is also time required for the crystal oscillator in the PLL chip to stabilize: the sum of the lock-time and the crystal stabilization time is about 3.5 msec. Once the LO is stable, during transmit the protocol requires that the microcontroller turn on the RF section and proceed to phase modulate the transmitted signal according to the requirements of the tag protocol. This protocol requires a tag bit time of about 19 $\mu$sec and an overall tag transmit time of about 2.3 msec.

In the on state, the microcontroller samples the tag low battery indicator and latches this onto the tag housekeeping data bits. These bits form part of the tag datagram sent during transmit. After the tag ID, tag data bits and checksum have been modulated onto the transmit signal, the microcontroller then shuts off the RIF section followed by the LO section. Finally, the microcontroller determines the off time (typically 5 seconds), loads the off time counter and puts itself into a very low-power state in which it simply counts down the off time counter. When the counter expires, the microcontroller wakes up and repeats the on cycle.

Tag RF System Description

This section describes in detail the operation of the RF elements of the tag, following the general outline given above. It consists of detailed descriptions of the RF input section, the modulator and mixer section, the local oscillator section' and the RF output section.

RF Input Section

The RF input section describes all the elements from the antenna to the modulator. This section consists of the Rx antenna, the input bandpass filter (Rx BPF), the voltage-variable attenuator and the low-noise amplifier (LNA). All of the elements of this system have a nominal impedance of 50 ohms and are connected to one another with 50 ohm transmission lines. The purpose of the input section is to make sure the incoming signal (nominally a spread-spectrum-signal centered at 2.442 GHz) provides enough drive for the mixer and RF output sections without driving them into non-linearity that would violate the requirements of 15.249.

To this end, the nominal tag gain of 35 dB is adjusted in the RF input section to provide a constant, linear level using a hardware implementation of automatic gain control. The AGC is implemented with a detector diode at the RF output stage, which provides a DC voltage that is proportional to the RF output power. This DC voltage is amplified and smoothed in the AGC amplifier and then delivered to a combination of two voltage-variable attenuators: one GaAs MMIC in front of the LNA and a PIN diode attenuator, following the LNA. This combination is designed to give 35–40 dB of attenuation range. This range is designed to allow tag linear operation from about 1 meter away from a cell controller antenna to the maximum range.

For tag ranges inside the 1 meter from a cell controller antenna, the circuitry associated with the LNA shutdown, controller monitors the AGC voltage. When this voltage reaches a value corresponding to the tag RF output of about 3 dB below the point where the spectral re-growth of the desired spread-spectrum signal reaches the limits of 15.249 at the band edges, the amplifier output transitions, signaling the microcontroller that the low-noise amplifier needs to be shut down. This signal generates an interrupt in the microcontroller that forces the assertion of the OFF line to a switch, which removes power from the LNA bias line. This effectively adds 40 dB of signal attenuation into the RF input chain. The hardware AGC then readjusts the voltage-variable attenuators to provide the best tag RF output level possible consistent with linear operation (now is back at the bottom end of the hardware AGC range).

Rx Antenna

The function of tole receive antenna is to capture radiated signals at the desired input frequency over a spatial range as close to half-plane omnidirectional as possible. The receive antenna is a low-cost quarter-wave shorted patch antenna constructed of sheet metal. The antenna structure uses air as a dielectric and operates over the ground plane on the backside of the tag printed circuit board. The antenna makes connection to the rest of the RIF input section with a simple RIF feedthrough pin. The antenna has a midband gain of 4.6 dBi and is linearly polarized.

Rx Input Bandpass Filter

The function of the input bandpass filter is to pass only the input signals of interest and to suppress signals that are not part of the MD system. The input receive bandpass filter is a 3-pole monolithic ceramic dielectric resonator bandpass filter. It has a nominal insertion loss of 2.3 dB and a nominal 3 dB bandwidth of 100~MHz.

Voltage-Variable Attenuator

The function of the WA is to implement the AGC scheme described above. The voltage-variable attenuator is implemented as a combination of two elements: a monolithic microwave integrated circuit and a shunt PIN diode attenuator. The first element is placed in front of the LNA and has an effective dynamic range of about 33 dB. The second element is placed after the LNA and has an effective dynamic range of about 7 dB. The combination of the two on either side of the LNA results in a control range of about 40 dB.

Low-Noise Amplifier

The low-noise amplifier is a GaAs monolithic amplifier. It exhibits about 20 dB of gain with a noise figure of about 3 dB. It serves to set the tag noise figure and to provide enough gain at maximum range for suitable tag operation.

Modulator and Mixer Section

The modulator and mixer section provides two of the essential system functions for a 3D/D tag: the ability to identify a tag and the conversion of the input frequency to the output frequency. The modulator input comes from the microcontroller and is the digital representation of the tag datagram that the tag sends to the cell controller. The mixer inputs come from the RF input section and from the LO section and its output goes to the RF output section. Each of the elements of this system has a nominal impedance of 50 ohms and is connected to one another with 50 ohm transmission lines.

Modulator

The function of the modulator is to change the representation of the tag datagram from a digital signal to a biphase modulated RF signal. The modulator is implemented as a pair of GaAs non-reflective, single-pole, double throw switches that switch between two transmission lines whose difference in length at the tag receive center frequency (2.442 GHz) is 180°. The particular switches chosen require differential drive, so a CMOS inverter is used to derive a pair of differential drive signals from a single digital control from the microcontroller.

Mixer

The function of the mixer is to translate the incoming 2.442 GHz signal to the proper output center frequency (5.800 GHz). The mixer is implemented a commercial double-balanced mixer. The input local oscillator signal to the mixer is at 3.358 GHz and a filter in the RF output section passes only the sum signals and suppresses the difference signals from the mixer.

Local Oscillator Section

The local oscillator simply supplies the single tone used in the mixer to upconvert the incoming 2.442 GHz signal to a 5.800 GHz frequency. The oscillator is implemented as a phase-locked oscillator derived from the output of a voltage-controlled oscillator stabilized by a phase-locked loop. The final output of the local oscillator is 3.358 GHz. This is obtained by filtering the second harmonic of the phase-locked oscillator that is running at 1.679 GHz. The phase-locked loop is implemented in a standard CMOS RF chip and the loop filter is implemented as a 4-pole passive filter. The reference signal for the PLL comes from an onchip oscillator that uses an external crystal at 6.5 MHz.

The VCO output level is at about −5 dBm for the fundamental signal. An amplifier whose gain is about 13 dB and whose output feeds both the PLL chip and the next amplifier stage buffers this output signal. The final amplifier stage is tuned to reject the fundamental signal and amplify the second harmonic at 3.358 GHz to about −8 dBm. A bandpass filter to remove everything but the desired second harmonic follows the final amplifier.

RF Output Section

The RF output section simply provides the proper radiated output signal for proper tag operation. The output section consists of a cleanup bandpass filter following the mixer, an amplifier, a final bandpass filter and the Tx antenna Tx Bandpass Filters The bandpass filters are identical 3-pole hairpin filters having about 3 dB of insertion loss and a 3 dB bandwidth of about 300 MHz centered on 5.8 GHz. The filters are implemented directly on the printed circuit substrate.

Tx Final Amplifier

The amplifier is a single monolithic microwave integrated circuit having a gain of about 18 dB and a third-order intercept point of about +15 dBm so that the output signal can be as linear as possible at the desired nominal output level of −7 dBm.

Tx Antenna

The function of the transmit antenna is to emit radiated signals at the desired output frequency over a spatial range as close to half-plane omnidirectional as possible. The transmit antenna is a low-cost quarter-wave shorted patch antenna constructed of sheet metal. The antenna structure uses air as a dielectric and operates over the ground plane on the backside of the tag printed circuit board. The antenna makes connection to the rest of the RF input section with a simple RF feedthrough pin. The antenna has a midband gain of 3.0 dBi and is linearly polarized.

Microcontroller Section

The microcontroller section operates the protocol for the tag. It accepts any user combines this with information about the tag state (such as battery voltage is low). The microcontroller then provides this digital stream to the biphase modulator. The microcontroller also monitors the state of the AGC shutdown input and commands the LNA bias off at the properties. It also directs the sequence of RIF element power at the beginning of a datagram (LO on first, check for phaselock, then RF on) and controls the off-time under software direction. The processor controls DC power with FET switches.

Microcontroller

The microcontroller is a PIC16F84 CMOS low-power, general purpose digital processor. This processor derives all timing from a 4 MHz ceramic resonator that establishes the internal clock stream. The internal clock is derived from the ceramic resonator frequency by dividing it by 4: thus, the internal clock operates at 1 MHz.

DC switches

The switches accept logic inputs from the microcontroller and turn DC power on and off to various system elements. One controls DC power to the LO section and to the majority of the RIF elements. Another controls DC power to the LNA section, implementing level 2 AGC.

Hybrid System

The foregoing embodiments of an active tag may be modified as described in following paragraphs to have a passive tag that may be used in the same embodiment of a system with the active tag. Generally, this single RFID system supports two types of tags, active and passive. The active RFID may be read at relatively long distances, such as 50 feet or more. A passive RFID tag that may be less expensive than the active tag, may be read when in proximity to a wireless source of power. Once powered, the passive tag can be read at relatively long distances, through the same infrastructure which reads the short-range tags.

Figure 25:
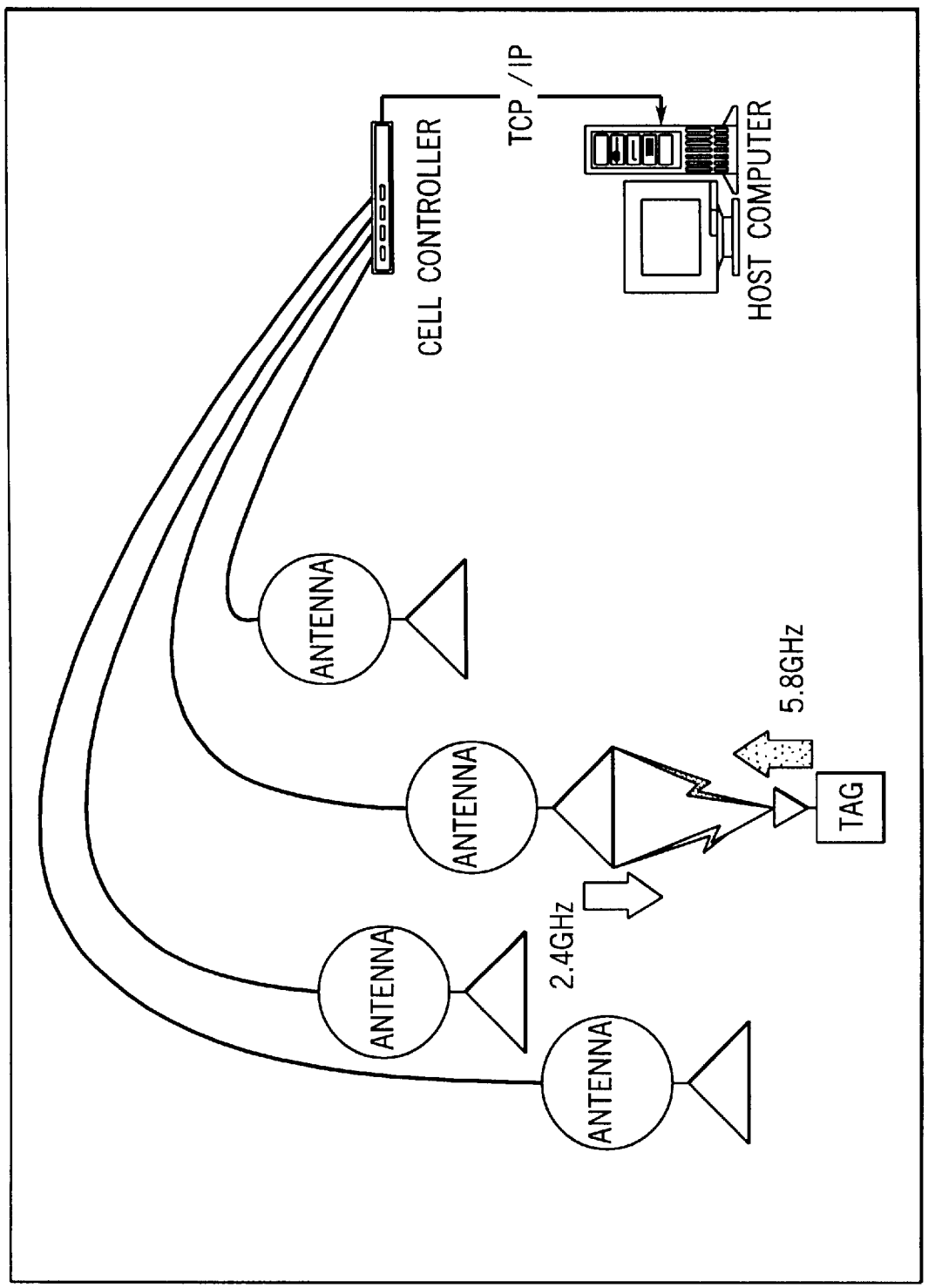
FIG. 25 is an example of an embodiment of a system that includes the invention.

As in previously described embodiments included herein, an example embodiment of a single RFID system embodiment is shown in FIG. 25, which is similar to FIG. 1. FIG. 25 shows a 3D-ID Cell Controller, which is a sophisticated digital radio that controls a set of antennas that cover a cell within a building. In an open indoor environment, each cell may be configured to cover about 10,000 square meters.

Like GPS satellites, 3D-ID Cell Controllers emit direct sequence spread spectrum signals that are received by the tags. Unlike GPS, 3D-ID tags do not include sophisticated circuitry and software to decode this signal; instead, they simply change the signal's frequency and transpond it back to the Cell Controller. Tag ID information is phase modulated onto the return signal. The Cell Controller extracts the Tag ID from this return signal, and also determines the tag's distance from the antenna by measuring the round trip time of flight of the radio signal. Advanced numerical filtering provides approximately one meter distance measurement accuracy.

Up to 16 antennas can be attached to a single Cell Controller via coaxial cable. (For simplicity, 4 antennas are shown in FIG. 25). Both power and radio signals travel through this single cable, so no additional power source is necessary for the antenna. Both the Cell Controller and the tag are carefully designed to comply with FCC Part 15 regulations, so no license is needed for operation of this embodiment.

One version of the active tag emits ½ milliwatt of radio energy, enabling detection of the tag at a distance of 30 meters. This allows a tag about the size of a PCMCIA card to operate for over a year with a small battery. The tag transmits a "los battery" signal well before replacement is required. For applications where battery life isn't critical, higher power tags can support substantially longer range.

The Cell Controller quickly cycles among antennas, determining the distance between all of its antennas and a given tag. Once the distance to 3 antennas is found, the tag's location in space can be estimated. In many situations, it's possible to get a good estimate of tag location from fewer than 3 antennas. For example, in a warehouse an aisle between racks can be covered la by two antennas—one at each end. Most hallways can be similarly covered.

Tags 'wake up' spontaneously, 'chirp' their unique codes, and then go back to 'sleep'. Each chirp takes 5 milliseconds. The chirping interval can vary based on application requirements. For example, tags attached to personnel might chirp every two seconds, while tags attached to inventory might be set to chirp once per minute. For infrequently used physical assets, special tags with motion detectors can be provided, that chirp infrequently when stationary and more frequently when in motion.

The tag data protocol includes a capability to report information provided by a closely integrated device. The types of data that might be reported through a tag are limited only by the creativity of the customer. For example, a specialized tag on a guard could transmit pulse rate, and a "panic button" could also be included. More generally, tag electronics could be used as an inexpensive RF stage for a handheld data collection device. Future versions of the tag will support two-way communication, implementing a low-cost form of "wireless LAN." Thus, this 3D-ID embodiment is not only a system to track people and assets, it also provides a cost-effective infrastructure to collect a wide variety of data throughout the enterprise.

The 3D-ID embodiment was designed with careful attention to minimizing cabling and installation costs of the Cell Controllers. The link from a Cell Controller to its antennas requires the installation of dedicated coaxial cable. Both power and RF signals are transmitted to the antenna across this cable, so no additional power source is necessary. This may be helpful for a situation where no power source is available close to the desired antenna location.

Cell Controllers, and by extension their tags, are designed as network devices, inside the Cell Controller, an embedded version of Unix supports communication with the corporate network via TCP/IP. An open application programming interface (API) enables an application developer to extract data from the cell controllers using a publish/subscribe model via TCP/IP.

The 3D-ID system bring the benefits of GPS indoors, in a package that is accessible to a wide range of businesses. It also provides a cost-effective wireless infrastructure to collect a variety of data throughout the enterprise.

Passive Version of the 3D-ID Tag

Passive 3D-ID tags work the same way as the active tags, except they do not require a battery to operate. In one embodiment, they include circuitry to extract power from a nearby Wireless Power Source (WPS), operating at a frequency such as 125 Khz or 13 MHz. WPS elements are widely used in passive RFID systems, and are well known in the art. In proximity to a WPS, a passive 3D-ID tag's operation is similar to an active 3D-ID tag's operation. The general-purpose Cell Controller is able to read both types of tags.

Unlike conventional RFID "interrogators," a WPS is a single-purpose device, that needs only to send power to the tags. Due to their low costs, WPSs can be freely scattered throughout the facility whenever the passive tags need to be seen. The actual reading of the tags is accomplished by a conventional 3D-ID Cell Controller. In this embodiment, the only differences between active and passive 3D-ID tags is their power sources, and the fact that active tags can be tracked continuously while passive tags will only report their position when they are supplied with power.

In one implementation, several WPS elements can be placed on a single cable, like "Christmas lights," thus allowing them to share a power supply and other electronics. To minimize cross-interference among the elements, small variations in frequency will reduce the number of nulls. Random variations in power levels of individual WPS elements provide additional resilience.

Due to the lower cost objectives of the passive tags, their antennas may be less costly in their design and their power output somewhat restricted. Therefore their range might be engineered in other embodiments, for example, to about 15 meters instead of the normal 40 meter range. (This is in comparison to other passive RFID systems, which can demonstrate ranges of perhaps 2 meters.) Thus, areas needing to support low-cost passive 3D-ID tags may require a somewhat higher density of receive antennas.

This embodiment of the 3D-ID System is designed to support two types of tags with one architecture. Battery-powered "active" tags can be continuously tracked through the complete indoor space in a facility. Simultaneously, very inexpensive "passive" tags can be read at certain points in the process, using the same infrastructure and system design.

Combining the two concepts, yet a third type of tag may include both active and passive powering elements. When in range of a WPS, the passive powering element allows the tag to operate even if the battery wears out. For example, a case folder in an accounting firm may include an active 3D-ID tag to track it through a process. When it is placed in storage, in proximity to a WPS, it would continue to announce its presence periodically for a number of years, long after the battery runs out.

The passive tag, previously described, may be produced by modifying the active tag, also previously described, as will be set forth in paragraphs that follow. Generally, the previously described battery power source of the active tag is replaced with a wireless power source.

Passive Circuit Description

Passive RFID systems have existed in various forms since the 1960s, and many workable circuit designs are know to those skilled in the art, for example, as the one set forth in U.S. Pat. No. 5,287,113. Some RFID products operate at 2.4 GHz and also use the 2.4 GHz energy to power the tag. For the active/passive tag design, one embodiment powers the tag at a different is non-interfering frequency. For regulatory reasons, 125 kHz (inductive) or 13.56 MHz (RF) power sources are preferred; both of these bands are widely available for operation of RFID systems.

Figure 26:
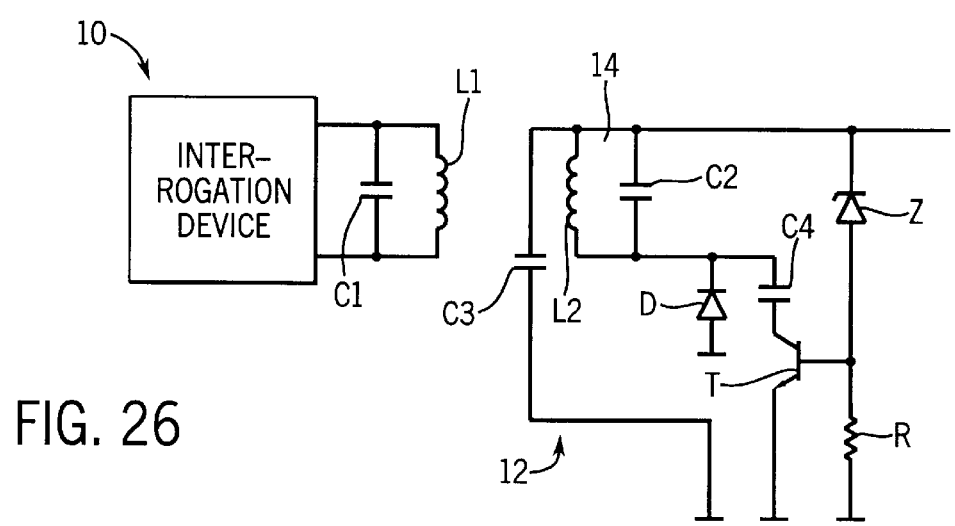
FIG. 26 is an example of an embodiment of a transponder and an external power source.

The passive power circuits all work on the same general principle. The Wireless Power Source (WPS) 10 of FIG. 26 includes a circuit oscillating at the target frequency, which is transmitted over the air as a powering field. The tag power circuit 12 includes a resonant circuit 14 including a capacitor C3 and a coil L2, with the resonance frequency equal to that of the WPS. When the tag is in proximity to the WPS 10, the tag's power circuit resonates, and the oscillation is rectified with a diode. Energy is stored in a capacitor that is large enough to provide DC power for one complete tag transmission. For example, in one embodiment of the passive tag, this is about 75 milliamps for 3 milliseconds. Less power (for a faster charge) can be used for limited-range versions of the tag.

It should be understood that the WPS may be separate from the cell controller or tag reader receiving the returned signal from the tag. Alternatively, the WPS may be included as part of the cell controller or tag reader.

In normal operation, the active version of the tag may go into a low power state between chirps. One implementation draws about 25 microamps in this state. This same approach with the same protocol can be used for as long as the tag is within range of a powering element. Alternatively, for a slightly faster recharge, the tag circuitry may shut down entirely until full power is available.

Duty cycle for the tag may need to increase to provide enough time to fully charge a tag, particularly if the tag is relatively far away from a WPS. This adjustment happens automatically because the tag is programmed to not transmit until adequate power is available. A number of WPS units, clustered near each other or installed at intervals along a production line, can inexpensively cover a relatively large area. Tags in the space can then be read from a single reader. This is typically less expensive, and always less complicated, than clustering full RFID readers in the same space.

The WPS is an oscillating circuit as described above. Unlike other RFID readers, it does not need to modulate signals to the tag, does not need to receive signals from the tag, and does not need a microprocessor to control its operation. The only complexity is that two powering elements next to each other might result in dead zones due to destructive interference. For applications where tags are in motion, this can be ignored, as the tags will quickly move through such zones. For applications with stationary tags, even the slightest process variations will cause each WPS to have a slightly different frequency, making such situations transient and operationally irrelevant, especially if the WPS has slight random frequency variations over time.

Described in paragraphs that follow is one application of an RFID system used in a post office environment.

In a postage handling environment, the relatively more expensive and bulkier active tags may be associated with personnel and mobile assets such as computers. In addition, things that carry mail such as bins and bags can be tagged, providing management information about process flows. Bag and bin level tracking can providing invaluable real-time alerts and location of mail that is has been stationary for too long, indicating a process failure. In all of these applications, the tags are not associated with particular parcels, and used for an extended period of time. These tags, which include batteries and high-performance antennas, can be read from long distances, such as 50–100 meters, and cell controllers are arranged so that multiple cell controller antenna modules read every tag, providing data to triangulate on tag location.

Passive tags may be used, for example, for tracking individual items of mail, where the tags need to be relatively smaller and disposable. To save on size and cost, these tags do not include a battery, and instead are powered through the air by inductive or radio means, and therefore operate at somewhat lower power. For further cost and size savings a smaller and lower performance antenna might be used. Such design compromises might result in reduced-range tags with a 10–20 meter read range—still far greater than the 1–2 meter ranges typical of other passive tag designs. These tags can be used to automatically report the location of priority mail as it moves through the postal process. Similarly, such tags can be enclosed in test letters to measure the performance of the postal process, and identify operational bottlenecks.

It should also be noted that there are other embodiments of the dual mode system supporting both active and passive tags. One embodiment may include a tag without a transponder in which the tag responds to an interrogation signal and transmits a return signal, rather than transponding a signal. Another embodiment may include a tag that transmits a signal independent of any received signal. In other words, the signal transmitted by the tag is not in response to an interrogation signal, for example. The signal transmitted by the tag may include, for example, a unique identifier associated with the tag.

Having described preferred embodiments of the invention, it will now become apparent to those of skill in the art that other embodiments incorporating its concepts may be provided. It is felt, therefore, that this invention should not be limited to the disclosed embodiments, but rather should be limited only by the spirit and scope of the appended claims.

What is claimed is:

1. A system for locating an object associated with a tag, comprising:
   a cell controller that includes a receiver for receiving a signal, the receiver having a receiving portion that receives the signal in a wireless form;
   a first tag associated with said object that outputs the signal, said first tag having no active internal power source; and
   an external power source that provides a wireless power source to the first tag, the external power source being physically separated from the receiving portion of the receiver so that the first tag would not be powered by the external power source if the external power source was located at the receiving portion.

2. The system of claim 1, wherein said receiving portion is an antenna.

3. The system of claim 1, wherein the first tag includes a dead battery that formerly provided an internal power source to the first tag.

4. The system of claim 1, wherein the first tag is an active tag having the internal power source removed.

5. The system of claim 1, further comprising at least one active tag associated with another object, the active tag adapted to communicate with the cell controller.

6. The system of claim 1, wherein a unique identifier is associated with said first tag, and said unique identifier is phase modulated onto said signal and used to determine the distance of said first object from a reference point.

7. The system of claim 1, wherein said cell controller includes:
   a quadrature modulator that extracts inphase and quadrature components of said signal; and
   a digitizer that digitizes the inphase and quadrature components for subsequent processing.

8. A method for locating an object, comprising:
   receiving a wireless source of power at a first tag associated with said object, the wireless source of power being emitted from an external power source location;
   sending a wireless signal from the first tag; and
   receiving said wireless signal at a reception location to determine a location of the object, the reception location being separated from the external power source location so that the first tag would not be powered by the wireless source of power if the external power source location was located at the reception location.

9. The method of claim 8, further comprising:
   providing a hybrid active/passive tag as the first tag.

10. The method of claim 8, further comprising:
    providing a passive tag as the first tag.

11. The method of claim 10, further comprising:
    providing an active tag as a second tag associated with a second object, the active tag capable of communication to identify the location of the second object.

12. The method of claim 8, wherein the step of sending the wireless signal comprises transponding a received signal.

13. The method of claim 8, further comprising:
    transmitting a first signal at a transmission location;
    receiving said first signal at an active tag associated with a second object; and
    transponding said first signal by the active tag.

14. The method of claim 8, further comprising:
    associating a unique identifier with said first tag;
    phase modulating said unique identifier onto said wireless signal; and
    determining the distance of said first object by measuring the round trip time associated with a first signal being sent to the first tag and said wireless signal being received.

15. The method claim 8, further comprising:
    extracting inphase and quadrature components of said wireless signal; and
    digitizing the inphase and quadrature components for subsequent processing.

16. A system for monitoring the location of objects, comprising:

at least one cell controller unit connected to at least one transmission antenna for transmitting a cell controller signal modulated onto a carrier signal at a first frequency and at a selected transmission time, and connected to at least one reception antenna for receiving a responding tag signal containing a tag datagram at a second frequency and at a reception time;

at least one tag unit having a translation circuitry for translating each received cell controller signal into the tag signal, said at least one tag unit being a passive tag unit having no active internal power source for signal transmission;

at least one external power source that provides a wireless power source to the at least one tag unit, at least one external power source being physically separated from at least one reception antenna so that a tag unit that is powered by the external power source would not be so powered by the external power source if the external power source was located at the reception antenna that receives a responding tag signal from the tag unit; and at least one calculation unit connected to each cell controller for calculating the location of each tag unit based on the reception time at least one reception antenna.

17. The system of claim 16, further comprising:

at least one active tag unit having an internal power source that is a low power battery, said at least one active tag unit being in a low power state between consecutive transmissions of a received cell controller signal.

18. The system of claim 16, wherein said external power source is a wireless power source that includes one or more capacitors and one or more inductors.

19. The system of claim 16, wherein said tag datagram includes error correction bits.

20. The system of claim 16, wherein said tag datagram includes a validity check.

21. The system of claim 16, wherein said tag datagram includes data derived from an object associated with said at least one tag unit.

22. A system for locating an object, comprising:

a first tag, to be associated with said object, that transmits a first signal at a first frequency, said first tag being adapted to operate as both a passive tag or an active tag, said first tag operating as a passive tag when receiving power from an external power source to transmit said first signal, and said first tag operating as an active tag when using power from an internal power source to transmit said first signal.

23. The system of claim 22, wherein the first tag operates as a passive tag when the internal power source is depleted.

24. The system of claim 22, further comprising a cell controller that transmits an interrogation signal at an input frequency, and said tag responds to said interrogation signal by transmitting said first signal.

25. The system of claim 22, wherein said first tag is a radio frequency identification tag.

26. The system of claim 22, wherein the first tag operates as a passive tag when in sufficient proximity to an external source of wireless power regardless of a depletion state of the internal power source.

27. The system of claim 22, further comprising:

a cell controller that transmits an interrogation signal and includes a receiver for receiving the first signal, the receiver having a receiving portion that receives the first signal in a wireless form; and an external power source that provides a wireless power source to the first tag, the external power source being physically separated from the receiving portion of the receiver so that the first tag would not be powered by the external power source if the external power source was located at the receiving portion.

* * * * *